United States Patent
Kang et al.

(10) Patent No.: US 10,904,737 B2
(45) Date of Patent: Jan. 26, 2021

(54) ELECTRONIC DEVICE AND PROXIMITY DISCOVERY METHOD THEREOF

(71) Applicant: Samsung Electronics Co., Ltd., Gyeonggi-do (KR)

(72) Inventors: Dae-Ho Kang, Gyeonggi-do (KR); Song-Yean Cho, Seoul (KR); Yeun-Woong Kyung, Seoul (KR); Chai-Man Lim, Seoul (KR)

(73) Assignee: Samsung Electronics Co., Ltd.

( * ) Notice: Subject to any disclaimer, the term of this patent is extended or adjusted under 35 U.S.C. 154(b) by 0 days.

(21) Appl. No.: 15/966,925

(22) Filed: Apr. 30, 2018

(65) Prior Publication Data

US 2018/0317079 A1 Nov. 1, 2018

(30) Foreign Application Priority Data

Apr. 28, 2017 (KR) .................. 10-2017-0055542

(51) Int. Cl.
*H04W 8/00* (2009.01)
*H04W 4/70* (2018.01)
(Continued)

(52) U.S. Cl.
CPC ............. *H04W 8/005* (2013.01); *H04W 4/70* (2018.02); *H04W 4/80* (2018.02);
(Continued)

(58) Field of Classification Search
CPC ..................................................... H04W 8/005
See application file for complete search history.

(56) References Cited

U.S. PATENT DOCUMENTS

2010/0169677 A1 7/2010 Madhusoodanan
2010/0306320 A1* 12/2010 Leppanen .............. G06Q 10/10
709/206
(Continued)

FOREIGN PATENT DOCUMENTS

EP          2 755 429        7/2014
WO     WO 2016/079309       5/2016

OTHER PUBLICATIONS

Keuchul Cho, Woojin Park, Moonki Hong, Gisu Park, Wooseong Cho, Jihoon Seo, Kijun Han, "Analysis of Latency Performance of Bluetooth Low Energy (BLE) Networks", Sensors ISSN: 1424-8220, www.mdpi.com/journal/sensors, Received: Oct. 17, 2014/ Accepted: Dec. 2, 2014/Published: Dec. 23, 2014.
(Continued)

*Primary Examiner* — Jason E Mattis
(74) *Attorney, Agent, or Firm* — The Farrell Law Firm, P.C.

(57) ABSTRACT

An electronic device is provided. The electronic device includes a first communication interface, a second communication interface, and a processor electrically connected with the first communication interface and the second communication interface, wherein the processor is configured to transmit first information related to proximity discovery of the electronic device to a first external electronic device or a second external electronic device through the first communication interface and perform proximity discovery with the first external electronic device through the second communication interface based on the first information or second information related to proximity discovery of the first external electronic device corresponding to the first information.

16 Claims, 21 Drawing Sheets

(51) Int. Cl.
*H04W 4/80* (2018.01)
*H04W 76/14* (2018.01)
*H04W 88/06* (2009.01)
*H04W 12/00* (2009.01)
*H04W 12/04* (2009.01)
*H04W 48/16* (2009.01)

(52) U.S. Cl.
CPC ....... *H04W 12/0013* (2019.01); *H04W 12/04* (2013.01); *H04W 76/14* (2018.02); *H04W 88/06* (2013.01); *H04W 48/16* (2013.01)

(56) References Cited

U.S. PATENT DOCUMENTS

| | | | |
|---|---|---|---|
| 2013/0331127 A1 | 12/2013 | Sabatelli et al. | |
| 2014/0057667 A1* | 2/2014 | Blankenship | H04W 48/16 455/500 |
| 2014/0092885 A1* | 4/2014 | Venkatachalam | H04W 76/14 370/338 |
| 2014/0213186 A1* | 7/2014 | Gage | H04W 4/21 455/41.2 |
| 2014/0269558 A1 | 9/2014 | Sartori et al. | |
| 2014/0344578 A1 | 11/2014 | Kim et al. | |
| 2015/0045016 A1 | 2/2015 | Xiong et al. | |
| 2015/0131571 A1 | 5/2015 | Fodor et al. | |
| 2016/0007152 A1* | 1/2016 | Johnsson | H04W 72/042 370/329 |
| 2017/0118749 A1 | 4/2017 | Cai et al. | |

OTHER PUBLICATIONS

Joakim Lindh, Christin Lee, Marie Hernes, "Measuring Bluetooth Low Energy Power Consumption", Texas Instruments, Application Report, SWRA478C—Feb. 2015, Revised Jan. 2017.
International Search Report dated Aug. 3, 2018 issued in counterpart application No. PCT/KR2018/004748, 17 pages.
Intel et al., "Use Case: EPS ProSe Discovery for WLAN Direct Communication", S1-122419, 3GPP TSG-SA WG1 Meeting #59, Jul. 2012, 1 page.
Intel et al., "Updates to the ProSe Communication via WLAN Use Case", S1-122418, 3GPP TSG-SA WG1 Meeting #59, Jul. 2012, 1 page.
Intel et al., EPC Support of ProSe Communication over WLAN Possible Architecture and Required Functionality, S2-130324, Jan. 22, 2013, 33 pages.
European Search Report dated Jan. 8, 2020 issued in counterpart application No. 18790940.3-1214, 10 pages.

* cited by examiner

ELECTRONIC DEVICE AND PROXIMITY DISCOVERY METHOD THEREOF

CROSS-REFERENCE TO RELATED APPLICATION(S)

This application is based on and claims priority under 35 U.S.C. § 119 to Korean Patent Application No. 10-2017-0055542, filed on Apr. 28, 2017, in the Korean Intellectual Property Office, the disclosure of which is incorporated by reference herein in its entirety.

BACKGROUND

1. Field

The present disclosure relates generally to proximity discover among electronic devices, and more particularly, to electronic devices capable of performing direct proximity discovery among the electronic devices over a preset communication network and proximity discovery methods for the same.

2. Description of Related Art

Various ongoing attempts are being made to apply 5G communication systems to Internet-of-Things (IoT) networks. An example is to provide proximity discovery technology in which an electronic device discovers physically adjacent external electronic devices using device-to-device (D2D) communication and notifies whether the external electronic devices are discovered. Proximity discovery technology serves to determine external electronic devices physically positioned close to a user's electronic device, which may expand to various services, such as indicating whether the external electronic devices are positioned close to the user's electronic device to enable the user's electronic device to make contact and share content through direct wireless communication (e.g., D2D) with the adjacent electronic devices.

Proximity discovery technology may encompass server-based proximity discovery schemes—e.g., electronic devices periodically send their current location information to a server, and the server determines whether electronic devices other than the electronic device requesting proximity discovery are adjacent and notifies the requesting electronic device of the results of the determination. Proximity discovery technology also encompasses short-range proximity discovery schemes—e.g., electronic devices exchange their wireless signals through their direct communication using their respective short-range wireless communication interfaces so that the proximity discovery-requesting electronic device determines whether the other electronic devices are positioned nearby.

For server-based proximity discovery schemes, it may be critical for each electronic device to precisely report its location in precisely determining the other electronic devices around the user's electronic device. However, existing positioning technologies are subject to limited positioning accuracy. Since the user's location varies in real-time, the user's electronic device is required to frequently report its current location to the server to achieve greater accuracy, and this may increase battery consumption and data usage.

Short-range wireless communication interface-based proximity discovery schemes have limitations in that the respective short-range wireless communication interfaces of the user electronic device and other electronic devices should remain active. If the communication interfaces remain on to perform short-range wireless communication interface-based proximity discovery, discovery and decrypting for wireless signals should continue, thus causing more battery consumption and overhead. Such power waste and overhead issues may worsen when the user's electronic device is located in a communication traffic congested area or around electronic devices maliciously broadcasting discovery requests.

SUMMARY

An aspect of the present disclosure provides an electronic device and its proximity discovery method in which an electronic device requesting proximity discovery may remotely control a communication interface for proximity discovery of an external electronic device, a target electronic device for proximity discovery, to quickly and precisely perform proximity discovery with the external electronic device, using a pre-established communication network (e.g., a wide area network (WAN)).

According to an embodiment of the present disclosure, an electronic device is provided. The electronic device includes a first communication interface, a second communication interface, and a processor electrically connected with the first communication interface and the second communication interface, wherein the processor is configured to transmit first information related to proximity discovery of the electronic device to a first external electronic device or a second external electronic device through the first communication interface and perform proximity discovery with the first external electronic device through the second communication interface based on the first information or second information related to proximity discovery of the first external electronic device corresponding to the first information.

According to an embodiment of the present disclosure, a non-transitory computer readable recording medium recording a program running on a computer is provided. The program includes executable commands executed by a processor to enable the processor to transmit first information related to proximity discovery of an electronic device to a first external electronic device or a second external electronic device through a first communication interface of the electronic device, and perform proximity discovery with the first external electronic device through a second communication interface of the electronic device based on the first information or second information related to proximity discovery of the first external electronic device corresponding to the first information.

According to an embodiment of the present disclosure, an electronic device is provided. The electronic device includes a communication interface and a processor electrically connected with the communication interface, wherein the processor is configured to receive first information related to proximity discovery of a first external electronic device from the first external electronic device through the communication interface, identify a second external electronic device corresponding to the first information based on subscription information or context information of the second external electronic device, or the first information, and transmit the first information to the identified second external electronic device through the communication interface.

BRIEF DESCRIPTION OF THE DRAWINGS

The above and other aspects, features, and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
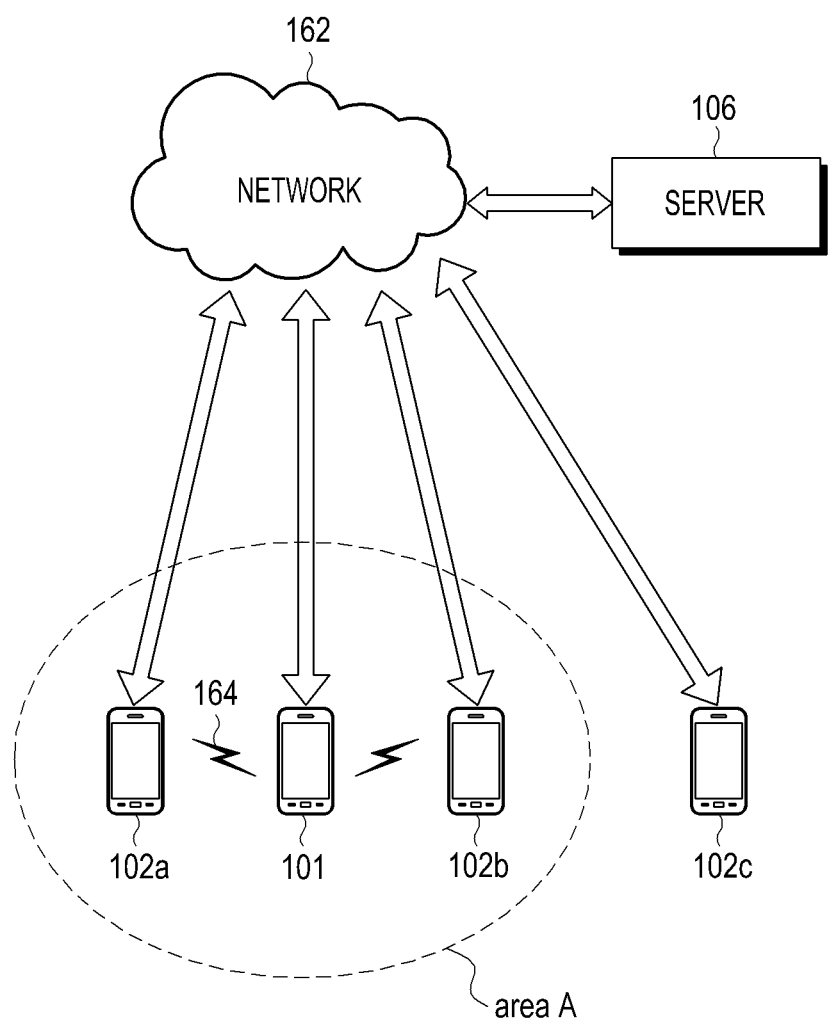
FIG. 1 is an illustration of a system for providing proximity discovery according to an embodiment.

Hereinafter, embodiments of the present disclosure are described with reference to the accompanying drawings. However, it should be appreciated that the present disclosure is not limited to the embodiments and the terminology used herein, and all changes and/or equivalents or replacements thereto may also belong to the scope of the present disclosure as defined by the appended claims and their equivalents. The same or similar reference denotations may be used to refer to the same or similar elements throughout the present disclosure and the accompanying drawings. It is to be understood that the singular forms "a," "an," and "the" include plural references unless the context clearly dictates otherwise. As used herein, the terms "A or B" and "at least one of A or B" may include all possible combinations of A and B. As used herein, the terms "first" and "second" may modify various components regardless of importance and/or order and are used to distinguish a component from another component without limiting the components. It will be understood that when an element (e.g., a first element) is referred to as being (operatively or communicatively) "coupled with/to" or "connected with/to" another element (e.g., a second element), the element may be coupled or connected with/to the other element directly or via a third element.

As used herein, the term "configured to" may be interchangeably used with other terms, such as "suitable for," "capable of," "modified to," "made to," "adapted to," "able to," and "designed to" in hardware or software in the context. The term "configured to" may indicate that a device may perform an operation together with another device or parts. For example, the term "processor configured (or set) to perform A, B, and C" may indicate a general purpose processor (e.g., a central processing unit (CPU) or application processor (AP)) that may perform the operations by executing one or more software programs stored in a memory device or a dedicated processor (e.g., an embedded processor) for performing the operations.

For example, examples of the electronic device according to embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a moving picture experts group audio layer 3 (MP3) player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync®, Apple TV®, or Google TV™), a gaming console (Xbox®, PlayStation®), an electronic dictionary, an electronic key, a camcorder, or an electronic picture frame.

FIG. 1 is an illustration of a system for providing proximity discovery according to an embodiment.

Referring to FIG. 1, a system for providing proximity discovery may include at least one of an electronic device 101 sending a request for proximity paging for proximity discovery, an external electronic device 102a, 102b, or 102c receiving a proximity paging request for proximity discovery, or a network 162.

According to an embodiment of the present disclosure, the system may further include a server (e.g., a proximity paging server (PPS)) 106 that provides a proximity discovery service for the electronic device 101 and the external electronic device 102a, 102b, or 102c.

According to an embodiment of the present disclosure, each of the electronic device 101 and the external electronic device 102a, 102b, or 102c may include a first communication interface for performing communication connection with the network 162 and a second communication interface (e.g., a short-range wireless communication interface) for performing short-range wireless communication 164 between the electronic device 101 and the external electronic device 102a, 102b, or 102c.

According to an embodiment of the present disclosure, the electronic device 101 and the external electronic device 102a, 102b, or 102c may be connected with each other via the network 162 using the first communication interface and perform proximity discovery via the short-range wireless communication 164 using the second communication interface.

According to an embodiment of the present disclosure, the network 162 may be a pre-established communication network and may include, e.g., a WAN (e.g., a public network such as the Internet).

According to an embodiment of the present disclosure, the electronic device 101 may transmit first information related to its proximity discovery to perform proximity discovery to its opposite device (e.g., the external electronic device 102a, 102b, or 102c) that is a target device for discovery, sending a request message for proximity paging to remotely control the settings for proximity discovery of the opposite device (e.g., the external electronic device 102a, 102b, or 102c) corresponding to the first information.

As used herein, discovery performed based on short-range wireless communication between the electronic device 101 and external electronic device 102a, 102b, or 102c is referred to as proximity discovery, and a series of processes to require all wireless signals or operations generated from the electronic device 101 or the opposite device for the electronic device 101 to discover its opposite device, which is a target device for proximity discovery, and to control the settings related to the proximity discovery of the opposite device are referred to as proximity paging.

According to an embodiment of the present disclosure, the electronic device 101 may transmit the request message for proximity paging to the external electronic device 102a, 102b, or 102c using the network 162 connected through the first communication interface. The electronic device 101 may remotely control the settings related to the proximity discovery of the external electronic device 102a, 102b, or 102c through the network 162 (e.g., a WAN).

According to an embodiment of the present disclosure, the external electronic device 102a, 102b, or 102c may set up a function related to the proximity discovery of the external electronic device 102a, 102b, or 102c based on the first information related to the proximity discovery of the electronic device 101 which is contained in the request message. For example, the external electronic device 102a, 102b, or 102c may activate or set up a second communication interface corresponding to the first information among at least one second communication interfaces connected to the short-range wireless communication 164 to be used for proximity discovery with the electronic device 101 based on the first information related to the proximity discovery of the electronic device 101. The external electronic device 102a, 102b, or 102c may transmit, to the electronic device 101, a response message containing second information related to the proximity discovery of the external electronic device 102a, 102b, or 102c activated or set up. For example, the external electronic device 102a, 102b, or 102c may transmit the response message to the electronic device 101 through the network 162 (e.g., a WAN) connected by the first communication interface (not shown).

According to an embodiment of the present disclosure, the electronic device 101 may activate the second communication interface to be used for the proximity discovery based on the first information or the second information received from the external electronic device 102a, 102b, or 102c. According to an embodiment of the present disclosure, the electronic device 101 may activate the second communication interface to be used for the proximity discovery with the external electronic device 102a, 102b, or 102c based on the first information before transmitting the first information to the external electronic device 102a, 102b, or 102c. According to an embodiment of the present disclosure, after receiving the second information, the electronic device 101 may activate the second communication interface to be used for the proximity discovery with the external electronic device 102a, 102b, or 102c based on the second information. According to an embodiment of the present disclosure, after receiving the second information, the electronic device 101 may activate the second communication interface to be used for the proximity discovery with the external electronic device 102a, 102b, or 102c based on the first information and the second information.

According to an embodiment of the present disclosure, the electronic device 101 and the external electronic device 102a, 102b, or 102c may perform the proximity discovery through their respective activated second communication interfaces. For example, the electronic device 101 and the external electronic device 102a, 102b, or 102c may exchange the request message or response message through their respective first communication interfaces connected to the network 162 (e.g., a WAN) and then perform the proximity discovery through their respective activated second communication interfaces.

According to an embodiment of the present disclosure, as a result of the proximity discovery, the electronic device 101 may discover, as a proximate device, an external electronic device (e.g., the external electronic device 102a or 102b) that is within a short-range wireless communication range (e.g., area A) corresponding to the activated second communication interface from the electronic device 101.

According to an embodiment of the present disclosure, as a result of the proximity discovery, the electronic device 101 may not discover an external electronic device (e.g., the external electronic device 102c) that is outside the short-range wireless communication range (e.g., area A) corresponding to the activated second communication interface from the electronic device 101.

According to an embodiment of the present disclosure, where the electronic device 101 receives response messages authorized for the proximity discovery from a plurality of external electronic devices 102a, 102b, or 102c, the electronic device 101 may sequentially perform the proximity discovery on the plurality of external electronic devices 102a, 102b, or 102c based on a time division scheme.

Figure 2:
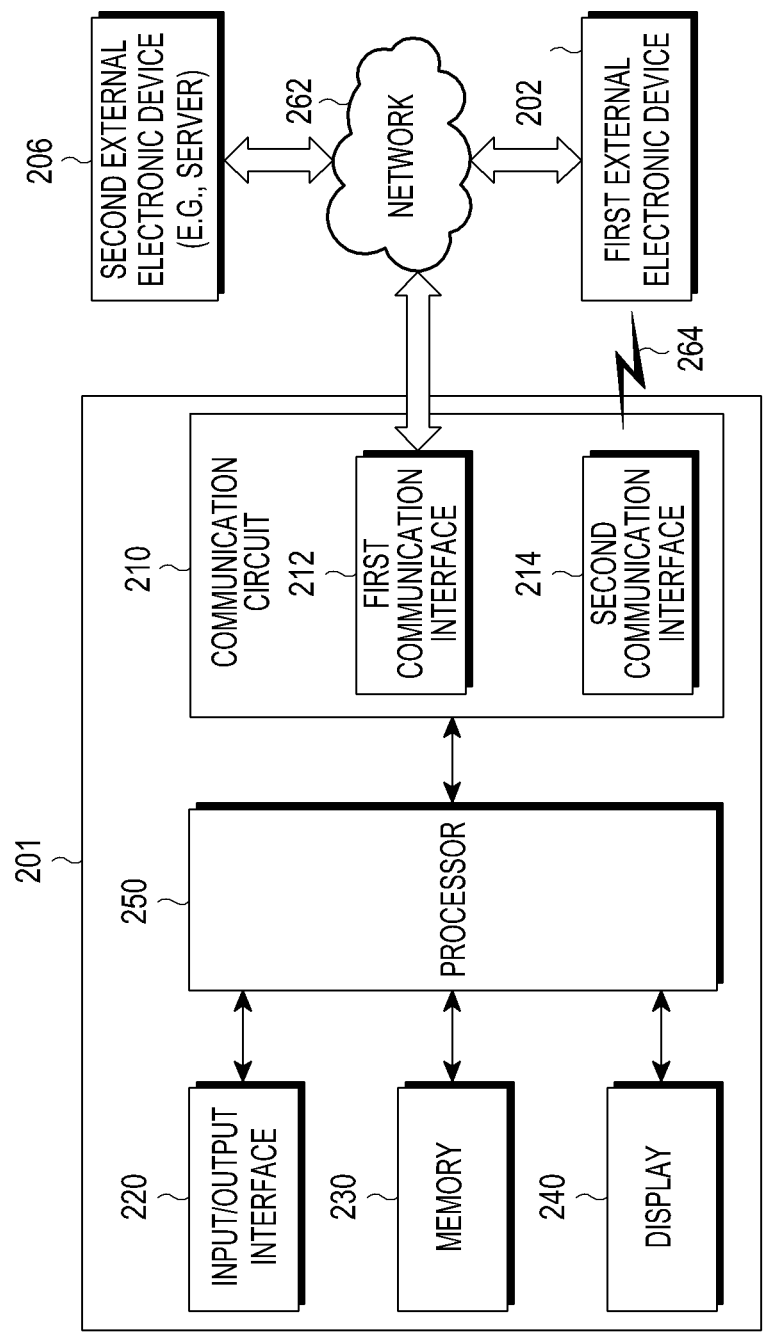
FIG. 2 is a block diagram of an electronic device according to an embodiment.

FIG. 2 is a block diagram of an electronic device 201 according to an embodiment of the present disclosure.

Referring to FIG. 2, the electronic device 201 may include at least one of a communication circuit 210, an input/output interface 220, a memory 230, a display 240, or a processor 250. The electronic device 201 may play a role as both a device for transmitting a proximity paging request for proximity discovery and a device for receiving a proximity paging request for proximity discovery.

An example is described below in which the electronic device 201 is a device for transmitting a proximity paging request for proximity discovery. In this case, it is assumed that a first external electronic device 202 is a device for receiving a proximity paging request for proximity discovery, which is a target device to be discovered by the proximity discovery, and a second external electronic device 206 is a server (e.g., a PPS) to which the electronic device 201 and the first external electronic device 202 subscribe and which provides a proximity discovery service. The electronic device 201 may include all or some of the components of the electronic device 101. The first external electronic device 202 may include all or some of the components of the external electronic device 102a, 102b, or 102c, and the second external electronic device 206 may include all or some of the components of the server 106 (e.g., a PPS).

According to an embodiment of the present disclosure, the communication circuit 210 may establish communication between the electronic device 201 and the first external electronic device 202 or the server 206. For example, the communication circuit 210 may be connected to the network 262 through wireless communication or wired communication to communicate with the first external electronic device 202 or the second external electronic device 206 (e.g., a server, such as a PPS).

According to an embodiment of the present disclosure, the wireless communication may include cellular communication which uses at least one of, e.g., long term evolution (LTE), LTE advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless-fidelity (WiFi), light-fidelity (Li-Fi), bluetooth, bluetooth low power (BLE), zigbee, near-field communication (NFC), magnetic secure transmission (MST), radio frequency (RF), or body area network (BAN) as denoted with element 264 of FIG. 2. According to an embodiment of the present disclosure, the wireless communication may include global navigation satellite system (GNSS). The GNSS may be, e.g., global positioning system (GPS), global navigation satellite system (Glonass), Beidou navigation satellite system (Beidou) or the European global satellite-based navigation system (Galileo). Hereinafter, the terms "GPS" and "GNSS" may be used interchangeably.

According to an embodiment of the present disclosure, the wired connection may include at least one of, e.g., universal serial bus (USB), high definition multimedia interface (HDMI), recommended standard (RS)-232, power line communication (PLC), or plain old telephone service (POTS). The network 262 may include at least one of telecommunication networks, e.g., a computer network (e.g., a local area network (LAN) or a WAN), the Internet, or a telephone network.

According to an embodiment of the present disclosure, the communication circuit 210 may establish a communication connection with the first external electronic device 202 or the second external electronic device 206 and may transmit or receive predetermined information (e.g., proximity discovery-related information) to/from the first external electronic device 202 or the second external electronic device 206. The communication circuit 210 may include a plurality of communication circuits. The communication circuit 210 may be referred to as a communication unit or communication module, may include a communication unit or communication module as a part thereof, or may configure a communication unit or communication module.

According to an embodiment of the present disclosure, the communication circuit 210 may include a first communication interface 212 and a second communication interface 214.

According to an embodiment of the present disclosure, the first communication interface 212 may include at least one of communication interfaces capable of offering packet data (or Internet protocol (IP)) or circuit-based services. For example, the communication interfaces capable of offering packet data (or IP) or circuit-based services may include at least one of mobile communication networks (e.g., LTE, LTE-A, CDMA, WCDMA, UMTS, WiBro or GSM), computer networks (e.g., a LAN or a WAN), internet, or telephony networks.

According to an embodiment of the present disclosure, the first communication interface 212 may establish a communication connection with a pre-established communication network 262. Upon performing the proximity discovery of the electronic device 101, the processor 250 may transmit or receive proximity discovery-related information with the first external electronic device 202 through the first communication interface 212. The processor 250 may transmit or receive information related to the proximity discovery of the first external electronic device 202 or the electronic device 201 through the second external electronic device 206 (e.g., a server, such as a PPS). According to an embodiment of the present disclosure, the pre-established communication network 262 may include a WAN (e.g., a public network such as the Internet).

According to an embodiment of the present disclosure, the second communication interface 214 may include a communication interface capable of providing short-range communication-based data. For example, the communication interface capable of providing short-range communication-based data may include at least one of WiFi, bluetooth, NFC, zigbee, z-wave, or GNSS.

According to an embodiment of the present disclosure, the second communication interface 214 may transmit or receive a proximity check message for performing proximity discovery with the first external electronic device 202 or a proximity check acknowledgement message responding to the proximity check message through at least one short-range wireless communication interface.

According to an embodiment of the present disclosure, for example, the input/output interface 220 may transfer commands or data input from a user or another external device to other component(s) of the electronic device 201 or may output commands or data received from other component(s) of the electronic device 201 to the user or other external devices.

According to an embodiment of the present disclosure, the memory 230 may include a volatile or non-volatile memory. For example, the memory 230 may store commands or data related to at least one other component of, e.g., the electronic device 201. According to an embodiment of the present disclosure, the memory 230 may store software or a program.

According to an embodiment of the present disclosure, the memory 230 may store, e.g., identification information (e.g., a network address information (e.g., an IP address, a media access control (MAC) address, or a uniform resource locator (URL) address or identification code temporarily assigned) about the first external electronic device 202 or contact information (e.g., a phone number or an email address). The memory 230 may store the first information related to the proximity discovery of the electronic device 201 to perform the proximity discovery between the electronic device 201 and the first external electronic device 202. The memory 230 may store second information related to the proximity discovery of the first external electronic device 202 corresponding to the first information received from the first external electronic device 202 or the second external electronic device 206 (e.g., a server, such as a PPS).

According to an embodiment of the present disclosure, the first information may include the identification information, contact information, location information, information about the second communication interface 214 to be used for the proximity discovery, transmission/reception setting information, security information, or a combination thereof of electronic device 201.

According to an embodiment of the present disclosure, the identification information of the electronic device 201 may include the network address information (e.g., an IP address, an MAC address, or a URL address) or identification code temporarily assigned of the electronic device 201.

According to an embodiment of the present disclosure, the location information may include the latitude and longitude of the electronic device 201 at the time that the proximity paging for the proximity discovery is requested, identification information of the cellular base station around the electronic device 201, or identification information (e.g., a basic service set identifier (BSSID) of a WiFi access point) about the wireless LAN around the electronic device 201.

According to an embodiment of the present disclosure, the information about the second communication interface 214 to be used for the proximity discovery may include type, channel, or channel hopping sequence information of the second communication interface 214. According to an embodiment of the present disclosure, the type information about the second communication interface 214 to be used for the proximity discovery of the electronic device 201 may include WiFi (e.g., ad hoc, direct or aware), bluetooth (e.g., enhanced data rate (EDR)), or BLE. According to an embodiment of the present disclosure, the channel information may include discovery channel information (e.g., 2.4 GHz, 5 GHz, or exact channel number) or advertising channel information.

According to an embodiment of the present disclosure, the transmission/reception setting information may include setting information about the transmission/reception role to set the electronic device 201 as one of a transmitting device to transmit a proximity check message to determine whether the electronic device 201 and the first external electronic device 202 are located proximate to each other when the proximity discovery is performed or a receiving device to receive the proximity check message.

According to an embodiment of the present disclosure, the security information may include first security information or second security information. The first security information may include a first encryption key for encrypting a response message responsive to the request message, as security information to protect the response message for security purposes, when the first external electronic device 202 receiving the first information through the first communication interface 212 transmits the response message to the electronic device 201 before performing the proximity discovery. The second security information may include a second encryption key for encrypting, e.g., the proximity check message or proximity check acknowledgement message, as security information to protect the proximity check message or proximity check acknowledgement message for security purposes, when the first external electronic device 202 transmits the proximity check message or proximity check acknowledgement message to the electronic device 201 upon performing proximity discovery through the second communication interface 214. According to an embodiment of the present disclosure, the processor 250 may generate the first encryption key and a first decryption key corresponding to the first encryption key. The processor 250 may generate the second encryption key and a second decryption key corresponding to the second encryption key.

According to an embodiment of the present disclosure, the processor 250 may include the generated first encryption key or second encryption key in the security information inside the request message and send the same through the first communication interface 212 to the first external electronic device 202 or the second external electronic device 206 (e.g., a server, such as a PPS) and may store the first or second decryption key in the memory 230.

According to an embodiment of the present disclosure, the second information may include identification information or contact information of the electronic device 201, identification information or contact information of the first external electronic device 202, information about a second communication interface of the first external electronic device 202 to be used for proximity discovery of the first external electronic device 202 activated based on the information about the second communication interface 214 to be used for the proximity discovery of the electronic device 201, transmission/reception setting information, or a combination thereof.

According to an embodiment of the present disclosure, the display 240 may include, e.g., a liquid crystal display (LCD), a light emitting diode (LED) display, an organic LED (OLED) display, or a microelectromechanical systems (MEMS) display, or an electronic paper display. The display 240 may display, e.g., various contents (e.g., text, images, videos, icons, or symbols) to the user. The display 240 may include a touchscreen and may receive, e.g., a touch, a gesture, a proximity or a hovering input using an electronic pen or a part of a user's body. The display 240 may be disposed between a first surface (e.g., a front surface of the electronic device 201) that faces in a first direction of the electronic device 201 and a second surface (e.g., a rear surface of the electronic device 201) that faces in a second direction which is an opposite direction of the first direction. The top of the display 240 may be displayed through the first surface. The display 240 may be large enough to take up a majority of the first surface of the electronic device 201.

According to an embodiment of the present disclosure, the display 240 may include a panel such as an LCD or an active matrix OLED (AMOLED) and may display various operational states of the electronic device 201 and various images as per the execution and/or services of applications. For example, the display 240 may display the first external electronic device 202 discovered as a result of the proximity discovery performed through the communication circuit 210. Where the proximity discovery is performed manually, the display 240 may display a UI for the user to select, set, or designate a type of communication interface (e.g., the second communication interface 214) to be used for proximity discovery. The UI displayed on the display 240 in relation to the proximity discovery is described below in greater detail with reference to FIGS. 21, 22A, 22B, and 22C.

According to an embodiment of the present disclosure, the processor 250 may include one or more of a CPU, an application processor (AP), or a communication processor (CP). The processor 250 may perform control on at least one of the other components of the electronic device 201 or perform an operation or data processing relating to communication. The processor 250 may control multiple hardware and software components connected to the processor 250 by running, e.g., an operating system or application programs, and the processor 210 may process and compute various data. The processor 250 may be implemented in, e.g., a system on chip (SoC). The processor 250 may include at least some (e.g., the communication circuit 210) of the components shown in FIG. 2. The processor 250 may load a command or data received from at least one of the other components (e.g., the communication circuit 210, the memory 230, or the input/output interface 220) on a volatile memory, process the command or data, and store various data in the non-volatile memory. The processor 250 may control the electronic device 201.

According to an embodiment of the present disclosure, the processor 250 may transmit first information related to proximity discovery of the electronic device 201 to a first external electronic device 202 or a second external electronic device 206 (e.g., a server, such as a PPS) through the first communication interface 212 and perform proximity discovery with the first external electronic device 202 through the second communication interface 214 based on the first information or second information related to proximity discovery of the first external electronic device 202 corresponding to the first information.

According to an embodiment of the present disclosure, when an input or application related to performing proximity discovery is selected, the processor 250 may use the second communication interface 214 for the proximity discovery. According to an embodiment of the present disclosure, the processor 250 may activate the second communication interface 214 to be used for the proximity discovery based on information about the second communication interface 214 available for the proximity discovery or communication state information. According to an embodiment of the present disclosure, the processor 250 may discover at least one communication channel of the second communication interface 214 available for the proximity discovery and activate the second communication interface 214, or the communication channel of the second communication interface 214, which is least congested.

According to an embodiment of the present disclosure, the second communication interface 214 to be used for the proximity discovery may be selected automatically and activated by the electronic device 201. For example, when the input or application related to performing the proximity discovery is selected, the electronic device 201 may automatically select and activate the least congested second communication interface 214 among types of second communication interfaces 214 available for the proximity discovery. For example, at least one communication channel (e.g., a communication channel A, a communication channel B, and a communication channel C) supported by the WiFi communication interface of the second communication interfaces 214 or at least one communication channel (e.g., a communication channel D, a communication channel E, and a communication channel F) supported by the bluetooth communication interface may be discovered. The electronic device 201 may automatically select and activate the least congested second communication interface type or communication channel based on the communication state of at least one communication channel (e.g., communication channels A to F) discovered.

According to an embodiment of the present disclosure, the second communication interface 214 to be used for the proximity discovery may be activated by a user input. For example, upon entry of a request for proximity discovery, the electronic device 201 may display types of second communication interfaces 214 to be used for the proximity discovery on the display 240, and the user may select one of the types of second communication interfaces 214 displayed. The electronic device 201 may turn on and activate the second communication interface 214 selected by the user.

According to an embodiment of the present disclosure, the processor 250 may generate a request message including information about the activated second communication interface 214. For example, the processor 250 may generate the request message including capability information or setting information of the activated second communication interface 214.

According to an embodiment of the present disclosure, the information about the activated second communication interface 214 may include type information, channel information, channel hopping sequence information about the second communication interface 214, or a combination thereof. For example, where communication channel A of the WiFi communication interface is activated as the second communication interface 214 to be used for the proximity discovery, the electronic device 201 may include the WiFi communication interface and communication channel A in the type information and channel information, respectively, in the information about the activated second communication interface 214. The electronic device 201 may include the information about the activated second communication interface 214 in the request message.

According to an embodiment of the present disclosure, the processor 250 may include in the request message information about at least one second communication interface candidate to be used for the proximity discovery as well as the information about the activated second communication interface 214. For example, the information about at least one second communication interface candidate may include information about the second communication interface candidate, which includes the priorities of candidates set in the order of the least congestion for the second communication interfaces or communication channels based on the communication state of at least one communication channel (e.g., communication channels A to F) discovered. For example, the processor 250 may include, in the information about the second communication interface candidate, information about at least one second communication interface and corresponding candidate communication channel according to the priority of candidate among the discovered communication channels based on a preset communication quality or a preset number of second communication interface candidates.

According to an embodiment of the present disclosure, the processor 250 may designate a first external electronic device 202 that is a target for the proximity discovery. For example, the processor 250 may designate the first external electronic device 202 based on contact information (e.g., a phone number or an email address) stored in the electronic device 201. For example, the processor 250 may designate a device corresponding to all or a selected one of the users in the contact information as the first external electronic device 202. According to an embodiment of the present disclosure, the contact information may include a parameter indicating whether the proximity discovery is agreed on, and the processor 250 may designate a device corresponding to the contact information about the user who has agreed on the proximity discovery as the first external electronic device 202 to which the request message is to be transmitted, based on the parameter.

According to an embodiment of the present disclosure, the processor 250 may determine whether the first external electronic device 202 to which the request message is to be transmitted is designated. According to the determination, the processor 250 may transmit the request message to the designated first external electronic device 202 or the second external electronic device 206 (e.g., a server, such as a PPS).

According to an embodiment of the present disclosure, where the first external electronic device 202 to which the request message is to be transmitted is designated, if an input or application related to performing the proximity discovery is selected through the input/output interface 220 or display 240 of the electronic device 201, the processor 250 may transmit the generated request message through the first communication interface 212 to the designated first external electronic device 202.

According to an embodiment of the present disclosure, the processor 250 may transmit the request message through the first communication interface 212 to the designated first external electronic device 202 based on the network address information (e.g., an IP address, an MAC address, or a URL address) contained in the identification information or identification code temporarily assigned of the designated first external electronic device 202.

According to an embodiment of the present disclosure, the processor 250 may transmit the request message through the first communication interface 212 to the designated first external electronic device 202, in the form of a text message (e.g., a short message service (SMS), a long message service (LMA), a multimedia message service (MMS), an instant message (IM), an email, or an IP multimedia service (IMS) message) or a pre-defined application layer message, based on the contact information (e.g., a phone number or an email address) about the designated first external electronic device 202. According to an embodiment of the present disclosure, the request message may be transmitted to the first external electronic device 202 in a unicasting or multicasting manner.

According to an embodiment of the present disclosure, the request message may include an identifier indicating that the request message is a message for requesting proximity paging for proximity discovery. For example, the identifier may be included in the header of the data structure of the request message. The processor 250 may distinguish the general text message from the message for requesting proximity paging for proximity discovery through the identifier.

According to an embodiment of the present disclosure, unless the first external electronic device 202 to which the request message is to be transmitted is designated, the processor 250 may transmit the request message through the first communication interface 212 to the second external electronic device 206 (e.g., a server, such as a PPS). For example, unless the first external electronic device 202 to which the request message is to be transmitted is designated, if an input or application related to performing the proximity discovery is selected through the input/output interface 220 or display 240 of the electronic device 201, the processor 250 may transmit the generated request message through the first communication interface 212 to the second external electronic device 206. The request message transmitted to the second external electronic device 206 may be transmitted to the at least one selected first external electronic device 202 according to the determination of the second external electronic device 206 (e.g., a server, such as a PPS). For example, if the processor 250 transmits the request message through the first communication interface 212 to the second external electronic device 206, the second external electronic device 206 may select the first external electronic device 202 to which to send the request message based on the context information (e.g., location information) or subscription information (e.g., identification information or contact information) about at least one device (e.g., the first external electronic device 202) stored in the second external electronic device 206 and may transmit the request message to the selected first external electronic device 202 through a communication interface connected with the network 262 (e.g., WAN). According to an embodiment of the present disclosure, upon selecting the first external electronic device to which to send the request message, the second external electronic device 206 may select all of the first external electronic devices 202 that subscribe to the second external electronic device 206 or select some of the subscribing first external electronic devices 202 based on the parameter information indicating whether to agree to providing a service for the proximity discovery contained in the subscription information, or may select the first external electronic device located proximate to the electronic device 201 among the subscribing first external electronic devices 202 based on the context information. According to an embodiment of the present disclosure, where there is no subscribing first external electronic device, no first external electronic device agreeing to provide a service for the proximity discovery, or no first external electronic device located proximate to the electronic device 201, the second external electronic device 206 may abstain from selecting the first external electronic device to which to send the request message.

According to an embodiment of the present disclosure, the processor 250 may receive second information related to the proximity discovery of the first external electronic device 202 corresponding to the first information from the first external electronic device 202 or the second external electronic device 206 (e.g., a server, such as a PPS) through the first communication interface 212. According to an embodiment of the present disclosure, the processor 250 may receive a response message including the second information from the first external electronic device 202 through the first communication interface 212. According to an embodiment of the present disclosure, where the first external electronic device 202 transmits the response message through the network 262 to the second external electronic device 206, the processor 250 may receive the response message from the second external electronic device 206 through the first communication interface 212.

According to an embodiment of the present disclosure, the second information contained in the response message received from the first external electronic device 202 or the second external electronic device 206 (e.g., a server, such as a PPS) may be information encrypted based on security information (e.g., the first encryption key of the first security information) contained in the first information. Where the second information is encrypted, the processor 250 may decrypt the encrypted response message based on the security information contained in the first information. For example, the processor 250 may decrypt the encrypted second information using the first decryption key that is generated together with the first encryption key included in the security information (e.g., the first security information) in the first information and that is stored in the memory 230 of the electronic device 201.

According to an embodiment of the present disclosure, the response message received from the first external electronic device 202 or the second external electronic device 206 (e.g., a server, such as a PPS) may be included in rejection information to reject the proximity paging request for proximity discovery. For example, the rejection information may include reasons for rejection. According to an embodiment of the present disclosure, the reasons for rejection may include the second communication interface of the first external electronic device 202 corresponding to the second communication interface 214 to be used for the proximity discovery of the electronic device 201 is being used; the first external electronic device 202 does not support the second communication interface type corresponding to the type of the second communication interface 214 to be used for the proximity discovery of the electronic device 214; the proximity discovery of the first external electronic device 102a, 102b, or 102c is explicitly rejected (e.g., the rejection of proximity discovery is entered through the UI); the distance between the electronic device 201 and the first external electronic device 202 falls outside a preset proximate distance; or a combination thereof. According to an embodiment of the present disclosure, the preset proximate distance may be set based on an arrival distance corresponding to the second communication interface 214 to be used for the proximity discovery. For example, where the second communication interface 214, as the second communication interface 214 to be used for the proximity discovery, is a WiFi communication interface, the preset proximate distance may be set based on an arrival distance (e.g., 150 m to 200 m) corresponding to WiFi communication. Where the second communication interface 214, as the second communication interface 214 to be used for the proximity discovery, is a bluetooth communication interface, the preset proximate distance may be set based on an arrival distance (e.g., about 100 m) corresponding to bluetooth communication.

According to an embodiment of the present disclosure, the processor 250 may perform the proximity discovery with the first external electronic device 202 through the second communication interface 214 based on the first information or the second information.

According to an embodiment of the present disclosure, the processor 250 may activate the second communication interface 214 based on information about the second communication interface to be used for the proximity discovery contained in the second information or information about the second communication interface 214 to be used for the proximity discovery contained in the first information. The processor 250 may transmit or receive, to/from the first external electronic device 202, through the activated second communication interface 214 a proximity check message to determine whether the electronic device 201 and the first external electronic device 202 are located proximate to each other based on transmission/reception setting information contained in the first information or transmission/reception setting information contained in the second information. The processor 250 may receive or transmit, from/to the first external electronic device 202, through the activated second communication interface 214, a proximity check acknowledgement message corresponding to the proximity check message.

According to an embodiment of the present disclosure, where the activated second communication interface 214 is a WiFi communication interface, the proximity check message may be a probe request message, and the proximity check acknowledgement message may be a probe response message.

According to an embodiment of the present disclosure, where the activated second communication interface 214 is a bluetooth communication interface, the proximity check message may be a scan request message, and the proximity check acknowledgement message may be an advertising data message.

According to an embodiment of the present disclosure, the processor 250 may set the electronic device 201 as a receiving device to receive the proximity check message, based on transmission/reception role information contained in the first information or transmission/reception role information contained in the second information. When the electronic device 201 is set as the receiving device, the processor 250 may receive the proximity check message from the first external electronic device (e.g., the external electronic device 202) through the activated second communication interface 214. For example, the processor 250 may determine whether the proximity check message is received from the first external electronic device 202 through the activated second communication interface 214 during a designated time. When the proximity check message is received during the designated time, the processor 250 may determine whether the identification information about the device to receive the proximity paging request contained in the proximity check message matches identification information of the first external electronic device 202 contained in the first information or second information. When the identification information of the device to receive the proximity paging request contained in the proximity check message matches the identification information of the first external electronic device 202 contained in the first information or second information, the processor 250 may transmit a proximity check acknowledgement message responsive to the proximity check message through the activated second communication interface 214 to the first external electronic device 202. According to an embodiment of the present disclosure, the processor 250 may include the identification information about the device to receive the proximity paging in the proximity check acknowledgement message and transmit the proximity check acknowledgement message through the activated second communication interface 214 to the first external electronic device 202. For example, the electronic device 201 may include the identification information about the first external electronic device 202 contained in the first information or second information in the proximity check acknowledgement message and transmit the proximity check acknowledgement message to the first external electronic device 202. The processor 250 may generate a proximate device list including the discovered first external electronic device 202 or add the first external electronic device 202 to the proximate device list. For example, when the identification information about the device to receive the proximity paging contained in the received proximity check message matches the identification information about the first external electronic device 202, the processor 250 may determine that the first external electronic device 202 having sent the proximity check message is a device located proximate to the electronic device 201, which is discovered as a result of performing the proximity discovery. The processor 250 may generate a proximate device list including the first external electronic device 202 discovered as a result of the proximity discovery, or where the proximate device list has already been generated, the processor 250 may add the discovered first external electronic device 202 to the proximate device list. When the proximity check message is not received or where the identification information about the device to receive the proximity paging request contained in the proximity check message does not match the identification information about the first external electronic device 202 contained in the first information or second information, the processor 250 may determine whether the designated time expires. When the designated time expires, the processor 250 may terminate the proximity discovery, but when the designated time does not expire, the processor 250 may be operated to re-receive the proximity check message until the designated time expires.

According to an embodiment of the present disclosure, the processor 250 may set the electronic device 201 as a transmitting device to transmit the proximity check message, based on transmission/reception setting information contained in the first information or transmission/reception setting information contained in the second information. When the electronic device 201 is set as the transmitting device, the processor 250 may transmit the proximity check message to the first external electronic device 202 through the activated second communication interface 214. According to an embodiment of the present disclosure, the processor 201 may include the identification information about the device to receive the proximity paging in the proximity check message and transmit the proximity check message through the activated second communication interface 214 to the first external electronic device 202. For example, the processor 250 may include the identification information about the first external electronic device 202 contained in the first information or second information in the proximity check message and transmit the proximity check message to the first external electronic device 202. The processor 250 may determine whether the proximity check acknowledgement message is received from the first external electronic device 202 through the activated second communication interface 214 during a designated time. When the proximity check acknowledgement message is received, the processor 250 may determine whether the identification information about the device to receive the proximity paging contained in the proximity check acknowledgement message matches identification information about the first external electronic device 202 contained in the second information. When the identification information about the device to receive the proximity paging contained in the received proximity confirm check message matches the identification information about the first external electronic device 202 contained in the first information or second information, the processor 250 may determine that the first external electronic device 202 having sent the proximity check acknowledgement message is a device located proximate to the electronic device 201, which is discovered as a result of performing the proximity discovery. The processor 250 may generate a proximate device list including the discovered first external electronic device 202 or add the first external electronic device 202 to the proximate device list. When the proximity check acknowledgement message is not received or where the identification information about the device to receive the proximity paging contained in the proximity check acknowledgement message does not match the identification information about the first external electronic device 202 contained in the first information or second information, the processor 250 may determine whether the transmission of the proximity check message exceeds a designated re-transmission count. When the transmission of the proximity check message exceeds the designated re-transmission count, the processor 250 may terminate the proximity discovery, but when the transmission of the proximity check message does not exceed the designated re-transmission count, the processor 250 may transmit the proximity check message through the second communication interface 214 to the first external electronic device 202 until the transmission exceeds the designated re-transmission count.

According to an embodiment of the present disclosure, the processor 250 may include identification information about the electronic device 201 in the proximity check message and transmit the power consumption to the first external electronic device 202, receive a proximity check acknowledgement message corresponding to the proximity check message from the first external electronic device 202, and determine whether the first external electronic device 202 is located proximate depending on whether the identification information about the device to send the proximity paging request contained in the received proximity check acknowledgement message matches the identification information about the electronic device 201.

According to an embodiment of the present disclosure, the proximity check message or the proximity check acknowledgement message received from the first external electronic device 202 may be information encrypted based on security information (e.g., the second encryption key of the second security information) contained in the first information. Where the proximity check message or proximity check acknowledgement message received from the first external electronic device 202 is encrypted, the processor 250 may decrypt the encrypted power consumption or proximity check acknowledgement message based on the security information contained in the first information. For example, the processor 250 may decrypt the encrypted proximity check message or proximity check acknowledgement message using the second decryption key that is generated together with the second encryption key included in the security information (e.g., the second security information) in the first information and that is stored in the memory 230 of the electronic device 201.

According to an embodiment of the present disclosure, the proximate device list may be stored in the memory 230 of the electronic device 201. The proximate device list may be periodically or aperiodically updated based on a result of the proximity discovery.

Operations of the processor 250 when the electronic device 201 is a device to send a request for proximity discovery are described below in greater detail with reference to FIGS. 4 to 7.

According to an embodiment of the present disclosure, an electronic device 201 may include a first communication interface 212, a second communication interface 214, and a processor 250 electrically connected with the first communication interface 212 and the second communication interface 214. The processor 250 may be configured to transmit first information related to proximity discovery of the electronic device 201 to a first external electronic device 202 or a second external electronic device 206 (e.g., a server, such as a PPS) through the first communication interface 212 and perform proximity discovery with the first external electronic device 202 through the second communication interface 214 based on the first information or second information related to proximity discovery of the first external electronic device 202 corresponding to the first information.

According to an embodiment of the present disclosure, the processor 250 may be configured to receive the second information from the first external electronic device 202 or the second external electronic device 206 through the first communication interface 212.

According to an embodiment of the present disclosure, the first information may include the identification information, contact information, location information, information about the second communication interface 214 to be used for proximity discovery, transmission/reception setting information, security information, or a combination thereof of electronic device.

According to an embodiment of the present disclosure, the second information may include identification information or contact information of the electronic device 201, identification information or contact information of the first external electronic device 202, information about a second communication interface of the first external electronic device 202 to be used for proximity discovery of the first external electronic device 202 activated based on the information about the second communication interface 214 to be used for the proximity discovery of the electronic device 201, transmission/reception setting information, or a combination thereof.

According to an embodiment of the present disclosure, the processor 250 may be configured to, when an input or an application related to performing the proximity discovery is selected, activate the second communication interface 214 to be used for the proximity discovery based on communication state information corresponding to the second communication interface 214, generate a request message for the proximity discovery by including information about the activated second communication interface 214 in the first information, and transmit the generated request message through the first communication interface 212 to the first external electronic device 202.

According to an embodiment of the present disclosure, the processor 250 may be configured to determine whether the first external electronic device 202 to which the request message is to be transmitted is designated, and when the first external electronic device 202 to which the request message is to be transmitted is designated, transmit the request message through the first communication interface 212 to the designated first external electronic device 202 based on network address information contained in identification information of the designated first external electronic device 202.

According to an embodiment of the present disclosure, the processor 250 may be configured to determine whether the first external electronic device 202 to which the request message is to be transmitted is designated, and when the first external electronic device 202 to which the request message is to be transmitted is designated, transmit the request message through the first communication interface 212 to the designated first external electronic device 202 in a form of a text message, an instant message, an email, an IMS or a pre-defined application layer message, based on contact information of the designated first external electronic device 202.

According to an embodiment of the present disclosure, the processor 250 may be configured to determine whether the first external electronic device 202 to which the request message is to be transmitted is designated, and when the first external electronic device 202 to which the request message is to be transmitted is undesignated, transmit the request message through the first communication interface 212 to the second external electronic device 206 (e.g., a server, such as a PPS) configured to provide a proximity discovery service between the electronic device 201 and the first external electronic device 202.

According to an embodiment of the present disclosure, the processor 250 may be configured to transmit or receive a proximity check message to determine whether the electronic device 201 is located proximate to/from the first external electronic device 202 through the activated second communication interface 214, based on transmission/reception setting information of the electronic device 201 contained in the first information or transmission/reception setting information of the first external electronic device 202 contained in the second information, and receive or transmit a proximity check acknowledgement message responsive to the proximity check message from/to the first external electronic device 202 through the activated second communication interface 214.

According to an embodiment of the present disclosure, the second information may be information encrypted based on the security information contained in the first information, and the processor 250 may be configured to decrypt the encrypted second information based on security information of the electronic device 201.

An example is described below in which the electronic device 201 of FIG. 2 is a device to receive a proximity paging request for proximity discovery. In this case, it is assumed that the first external electronic device 202 is a device to send a proximity paging request, and the second external electronic device 206 is a server (e.g., a PPS) to which the electronic device 201 and the first external electronic device 202 subscribe and which provides a proximity discovery service. The electronic device 201 may include all or some of the components of the external electronic device 102a, 102b, or 102c. The first external electronic device 202 may include all or some of the components of the electronic device 101, and the second external electronic device 206 may include all or some of the components of the server 106.

According to an embodiment of the present disclosure, the processor 250 may receive a request message for proximity paging for proximity discovery from the first external electronic device 202 through the first communication interface 212. Upon receipt of the request message, the processor 250 may transmit or receive information related to the proximity discovery between the electronic device 201 and the first external electronic device (e.g., the electronic device 101) through the first communication interface 212.

According to an embodiment of the present disclosure, the memory 230 may store the first information related to the proximity discovery of the first external electronic device 202 received the first external electronic device 202 or the second external electronic device 206 (e.g., a server, such as a PPS) to perform proximity discovery between the electronic device 201 and the first external electronic device 202.

According to an embodiment of the present disclosure, the first information may include the identification information about the first electronic device 202, contact information, location information, information about the second communication interface to be used for the proximity discovery, transmission/reception setting information, security information, or a combination thereof. The first information is the same as the first information described above in connection with the case where the electronic device 201 is operated as a device to send a proximity paging request for proximity discovery, except that the electronic device 201 and the first external electronic device 202 are swapped, and the above description may apply to the first information here.

According to an embodiment of the present disclosure, the memory 230 may store second information related to the proximity discovery of the electronic device 201 corresponding to the first information.

According to an embodiment of the present disclosure, the second information may include identification information or contact information about the first external electronic device 202, identification information or contact information about the electronic device 201, information about the second communication interface 214 to be used for proximity discovery of the electronic device 201 activated based on the information about the second communication interface to be used for the proximity discovery of the first external electronic device 202, transmission/reception setting information, or a combination thereof.

According to an embodiment of the present disclosure, the identification information about the first external electronic device 202 may include the network address information (e.g., an IP address, an MAC address, or a URL address) about the first external electronic device 202 and identification code temporarily assigned. The identification information about the first external electronic device 202 may be identification information contained in the first information inside the request message received by the electronic device 201.

According to an embodiment of the present disclosure, the identification information about the electronic device 201 may include the network address information (e.g., an IP address, an MAC address, or a URL address) and identification code temporarily assigned.

According to an embodiment of the present disclosure, the information about the second communication interface 214 to be used for the proximity discovery of the electronic device 201 may include information about the second communication interface 214 to be used for the proximity discovery in the electronic device 201 based on the information about the second communication interface of the first external electronic device 202 contained in the first information inside the request message. For example, the information about the second communication interface 214 to be used for the proximity discovery of the electronic device 201 may include type information, channel information, or channel hopping sequence information about the second communication interface 214 of the electronic device 201 corresponding to the second communication interface to be used for the proximity discovery of the first external electronic device 202. According to an embodiment of the present disclosure, the type information about the second communication interface 214 to be used for the proximity discovery of the electronic device 201 may include WiFi (e.g., ad hoc, direct or aware), bluetooth (e.g., EDR), or BLE. The channel information may include discovery channel information (e.g., 2.4 GHz, 5 GHz, or exact channel number), advertising channel information, or train information.

According to an embodiment of the present disclosure, the transmission/reception setting information may include setting information about the transmission/reception role to set the electronic device 201 as one of a transmitting device to transmit a proximity check message to determine whether the electronic device 201 and the first external electronic device 202 are located proximate to each other when the proximity discovery is performed or a receiving device to receive the proximity check message.

According to an embodiment of the present disclosure, the transmission/reception setting information about the electronic device 201 may be set based on the transmission/reception setting information about the first external electronic device 202 contained in the first information. According to an embodiment of the present disclosure, where the first information does not contain the transmission/reception setting information, the transmission/reception setting information about the electronic device 201 may be set based on whether the second communication interface 214 to be used for the proximity discovery in the electronic device 201 is available, the state of communication (e.g., a short-range wireless communication) corresponding to the second communication interface 214 available upon performing the proximity discovery, or the degree of degradation of service quality that may arise when the proximity discovery is performed. According to an embodiment of the present disclosure, where the first information does not contain the transmission/reception setting information, the transmission/reception setting information about the electronic device 201 may include information to allow the electronic device 201 to be set as a transmitting device to send the proximity check message to the first external electronic device 202.

According to an embodiment of the present disclosure, the processor 250 may control the electronic device 201.

According to an embodiment of the present disclosure, the processor 250 may receive first information related to proximity discovery of the first external electronic device 202 from the first external electronic device 202 or the second external electronic device 206 (e.g., a server, such as a PPS) through the first communication interface 212 and perform proximity discovery with the first external electronic device 201 through the second communication interface 214 based on the first information or second information related to proximity discovery of the electronic device 201 corresponding to the first information.

For example, upon receipt of the first information from the first external electronic device 202 or the second external electronic device 206 (e.g., a server, such as a PPS) through the first communication interface 212, the processor 250 may activate the second communication interface 214 to be used for the proximity discovery based on the information about the second communication interface to be used for the proximity discovery of the first external electronic device 202 contained in the first information. According to an embodiment of the present disclosure, the processor 250 may discover the second communication interface 214 or at least one communication channel of the second communication interface 214 to be used for the proximity discovery based on the information about the second communication interface to be used for the proximity discovery of the first external electronic device 202 contained in the first information and activate the least congested second communication interface 214 or the communication channel of the corresponding second communication interface 214.

According to an embodiment of the present disclosure, the second communication interface 214 to be used for the proximity discovery may automatically be selected and activated by the electronic device 201. For example, upon receipt of the first information through the first communication interface 212, the electronic device 201 may automatically select and activate the least congested second communication interface 214 among types of second communication interfaces 214 available for the proximity discovery based on the first information. For example, at least one communication channel (e.g., a communication channel A, a communication channel B, and a communication channel C) supported by the WiFi communication interface of the second communication interfaces 214 or at least one communication channel (e.g., a communication channel D, a communication channel E, and a communication channel F) supported by the bluetooth communication interface may be discovered. The electronic device 201 may automatically select and activate the least congested second communication interface 214 type or communication channel based on the communication state of at least one communication channel (e.g., communication channels A to F) discovered.

According to an embodiment of the present disclosure, the second communication interface 214 to be used for the proximity discovery may be activated by a user input. For example, upon receipt of the first information through the first communication interface 212, the electronic device 201 may display types of second communication interfaces 214 to be used for the proximity discovery on the display 240 of the electronic device 201, and the user may select one of the types of second communication interfaces 214 displayed.

The electronic device 201 may turn on and activate the second communication interface 214 selected by the user.

According to an embodiment of the present disclosure, the processor 250 may generate a response message responsive to the request message including information about the activated second communication interface 214. For example, the processor 250 may include the information about the activated second communication interface 214 in the second information, generating the response message.

According to an embodiment of the present disclosure, the information about the activated second communication interface 214 may include type information, channel information, or channel hopping sequence information about the second communication interface 214 or a combination thereof. For example, where communication channel A of the WiFi communication interface is activated as the second communication interface 214 to be used for the proximity discovery, the electronic device 201 may include the WiFi communication interface or communication channel A in the type information or channel information, respectively, in the information about the activated communication interface 214. The electronic device 201 may include the information about the activated second communication interface 214 in the response message.

According to an embodiment of the present disclosure, where the information about the second communication interface activated in the first external electronic device 202 contained in the first information is not available in the electronic device 201 or not supported, the processor 250 may activate the second communication interface 214 based on the information about at least one second communication interface candidate to be used for the proximity discovery contained in the first information. For example, the processor 250 may discover the second communication interface 214 or communication channel to be used for the proximity discovery according to priority of candidate for the information about the second communication interface candidate contained in the first information.

According to an embodiment of the present disclosure, the processor 250 may determine whether the first information contains identification information or contact information about the first external electronic device 202. Where the first information inside the request message contains the identification information or contact information about the first external electronic device 202, the processor 250 may transmit the generated response message through the first communication interface 212 to the first external electronic device 202.

According to an embodiment of the present disclosure, the processor 250 may transmit the response message through the first communication interface 212 to the first external electronic device 202 based on the network address information (e.g., an IP address, an MAC address, or a URL address) contained in the identification information about the designated first external electronic device 202 or identification information temporarily assigned.

According to an embodiment of the present disclosure, the processor 250 may transmit the request message through the first communication interface 212 to the designated first external electronic device 202, in the form of a text message (e.g., an SMS, LMA, or MMS message), an IM, an email, or an IMS message or a pre-defined application layer message, based on the contact information about the first external electronic device 202.

According to an embodiment of the present disclosure, the response message may include an identifier indicating that the response message is a message responsive to the proximity paging request for the proximity discovery. For example, the identifier may be included in the header of the data structure of the response message. The processor 250 may distinguish the general text message from the message responsive to the proximity paging request for proximity discovery through the identifier.

According to an embodiment of the present disclosure, where the first information does not contain the identification information or contact information, the processor 250 may transmit the response message through the first communication interface 212 to the second external electronic device 206 (e.g., a server, such as a PPS). The response message transmitted to the second external electronic device 206 may be transmitted to the at least one selected first external electronic device 202 according to the determination of the second external electronic device 206. For example, if the processor 250 transmits the response message through the first communication interface 212 to the second external electronic device 206, the second external electronic device 206 may select the first external electronic device 202 to which to send the response message based on the context information (e.g., location information) or subscription information (e.g., identification information or contact information) about at least one first external electronic device 202 stored in the second external electronic device 206 and may transmit the response message to the selected first external electronic device 202 through the network 262 (e.g., WAN).

According to an embodiment of the present disclosure, the processor 250 may encrypt the second information based on the security information (e.g., the first encryption key of the first security information) contained in the first information. The processor 250 may transmit the response message containing the encrypted second information through the first communication interface 212 to the first external electronic device 202 or the second external electronic device 206 (e.g., a server, such as a PPS).

According to an embodiment of the present disclosure, the processor 250 may include rejection information to reject the proximity paging request for proximity discovery in the response message. For example, the rejection information may include reasons for rejection. According to an embodiment of the present disclosure, the reasons for rejection may include the second communication interface 214 of the electronic device 201 corresponding to the second communication interface to be used for the proximity discovery of the first external electronic device 202 is being used; the electronic device 201 does not support the second communication interface 214 corresponding to the second communication interface to be used for the proximity discovery of the first external electronic device 202; the proximity discovery of the electronic device is explicitly rejected (e.g., the rejection of proximity discovery is entered through the UI); the distance between the first external electronic device 202 and the electronic device 201 falls outside a preset proximate distance; or a combination thereof. According to an embodiment of the present disclosure, the preset proximate distance may be set based on an arrival distance corresponding to the second communication interface 214 to be used for the proximity discovery. For example, where the second communication interface 214, as the second communication interface 214 to be used for the proximity discovery, is a WiFi communication interface, the preset proximate distance may be set based on an arrival distance (e.g., 150 m to 200 m) corresponding to WiFi communication. Where the second communication interface 214, as the second communication interface 214 to be used for the proximity discovery, is a bluetooth communication interface, the preset proximate distance may be set based on an arrival distance (e.g., about 100 m) corresponding to bluetooth communication.

According to an embodiment of the present disclosure, the processor 250 may perform the proximity discovery with the first external electronic device 202 through the second communication interface 214 based on the first information or the second information related to the proximity discovery of the electronic device 201 corresponding to the first information.

According to an embodiment of the present disclosure, the processor 250 may activate the second communication interface 214 based on information about the second communication interface 214 to be used for the proximity discovery contained in the second information or information about the second communication interface to be used for the proximity discovery contained in the first information. The processor 250 may transmit or receive, to/from the first external electronic device 202, through the activated second communication interface 214 a proximity check message to determine whether the first external electronic device 202 and the electronic device 201 are located proximate to each other based on transmission/reception setting information contained in the first information or transmission/reception setting information contained in the second information. The processor 250 may receive or transmit, from/to the first external electronic device 202, through the activated second communication interface 214, a proximity check acknowledgement message corresponding to the proximity check message.

According to an embodiment of the present disclosure, where the activated second communication interface 214 is a WiFi communication interface, the proximity check message may be a probe request message, and the proximity check acknowledgement message may be a probe response message.

According to an embodiment of the present disclosure, where the activated second communication interface 214 is a bluetooth communication interface, the proximity check message may be a scan request message, and the proximity check acknowledgement message may be an advertising data message.

According to an embodiment of the present disclosure, the processor 250 may set the electronic device 201 as a transmitting device to transmit the proximity check message, based on transmission/reception setting information contained in the first information or transmission/reception setting information contained in the second information. When the electronic device 201 is set as the transmitting device, the processor 250 may transmit the proximity check message to the first external electronic device 202 through the activated second communication interface 214. According to an embodiment of the present disclosure, the processor 250 may include the identification information about the device to receive the proximity paging in the proximity check message and transmit the proximity check message through the activated second communication interface 214 to the first external electronic device 202. For example, the processor 250 may include the identification information about the electronic device 201 in the proximity check message and transmit the proximity check message to the first external electronic device 202. The processor 250 may determine whether the proximity check acknowledgement message is received from the first external electronic device 202 through the activated second communication interface 214 during a designated time. When the proximity check acknowledgement message is received, the processor 250 may determine whether the identification information about the device to receive the proximity paging request contained in the proximity check acknowledgement message matches identification information about the electronic device 201. For example, when the identification information about the device to receive the proximity paging request contained in the proximity check message matches the identification information about the electronic device 201, the processor 250 may determine that the first external electronic device 202 having sent the proximity check message is a device located proximate to the electronic device 201, which is discovered as a result of performing the proximity discovery. The processor 250 may generate a proximate device list including the discovered first external electronic device 202 or add the first external electronic device 202 to the proximate device list. When the proximity check acknowledgement message is not received or where the identification information about the device to receive the proximity paging request contained in the proximity check acknowledgement message does not match the identification information about the electronic device 202, the processor 250 may determine whether the transmission of the proximity check message exceeds a designated re-transmission count. When the transmission of the proximity check message exceeds the designated re-transmission count, the processor 250 may terminate the proximity discovery, but when the transmission of the proximity check message does not exceed the designated re-transmission count, the processor 250 may transmit the proximity check message through the second communication interface 214 to the first external electronic device 202 until the transmission exceeds the designated re-transmission count.

According to an embodiment of the present disclosure, the processor 250 may set the electronic device 201 as a receiving device to receive the proximity check message, based on transmission/reception role information contained in the first information or transmission/reception role information contained in the second information. When the electronic device 201 is set as the receiving device, the processor 250 may receive the proximity check message from the first external electronic device 202 through the activated second communication interface 214. For example, the processor 250 may determine whether the proximity check message is received from the first external electronic device 202 through the activated second communication interface 214 during a designated time. When the proximity check message is received, the processor 250 may determine whether the identification information about the device to receive the proximity paging request contained in the proximity check message matches identification information about the electronic device 201. When the identification information about the device to receive the proximity paging request contained in the proximity check message matches the identification information about the electronic device 201, the processor 250 may transmit a proximity check acknowledgement message responsive to the proximity check message through the activated second communication interface 214 to the first external electronic device 202. According to an embodiment of the present disclosure, the processor 250 may include the identification information about the device to receive the proximity paging request in the proximity check acknowledgement message and transmit the proximity check acknowledgement message through the activated second communication interface 214 to the first external electronic device 202. For example, the electronic device 201 may include the identification information about the electronic device 201 in the proximity check acknowledgement message and transmit the proximity check acknowledgement message to the first external electronic device 202. The processor 250 may generate a proximate device list including the first external electronic device 202 discovered as a result of the proximity discovery or add the discovered first external electronic device 202 to the proximate device list. For example, when the identification information about the device to receive the proximity paging request contained in the proximity check message matches the identification information about the electronic device 201, the processor 250 may determine that the first external electronic device 201 having sent the proximity check message is a device located proximate to the electronic device 201, which is discovered as a result of performing the proximity discovery. The processor 250 may generate a proximate device list including the discovered first external electronic device 201 or where the proximate device list has already been generated, the processor 250 may add the first external electronic device 202 to the proximate device list. When the proximity check message is not received or where the identification information about the device to receive the proximity paging request contained in the proximity check message does not match the identification information about the electronic device 201, the processor 250 may determine whether the designated time expires. When the designated time expires, the processor 250 may terminate the proximity discovery, but when the designated time does not expire, the processor 250 may again receive the proximity check message until the designated time expires. According to an embodiment of the present disclosure, the processor 250 may include identification information about the device requesting proximity discovery in the proximity check message and transmit the power consumption to the first external electronic device 202, receive a proximity check acknowledgement message corresponding to the proximity check message from the first external electronic device 202, and determine whether the first external electronic device 202 is located proximate depending on whether the identification information about the proximity discovery-requesting device contained in the received proximity check acknowledgement message matches the identification information about the first external electronic device 202 contained in the first information.

According to an embodiment of the present disclosure, the proximate device list may be stored in the memory 230 of the electronic device 201. The proximate device list may be updated based on a result of the proximity discovery.

According to an embodiment of the present disclosure, the processor 250 may encrypt the proximity check message or proximity check acknowledgement message received from the first external electronic device 202 based on the security information (e.g., the second encryption key of the second security information) contained in the first information. The processor 250 may transmit the encrypted proximity check message or proximity check acknowledgement message through the second communication interface 214 to the first external electronic device 202.

Operations of the processor 250 when the electronic device 201 is a device to receive a request for proximity discovery are described below in greater detail with reference to FIGS. 8 to 11.

According to an embodiment of the present disclosure, an electronic device 201 may include a first communication interface 212, a second communication interface 214, and a processor 250 electrically connected with the first communication interface 212 and the second communication interface 214. The processor 250 may be configured to receive first information related to proximity discovery of the first external electronic device 202 from a first external electronic device 202 or a second external electronic device 206 (e.g., a server, such as a PPS) through the first communication interface 212 and perform proximity discovery with the first external electronic device 201 through the second communication interface 214 based on the first information or second information related to proximity discovery of the electronic device 201 corresponding to the first information.

According to an embodiment of the present disclosure, the processor 250 may be configured to transmit the second information from the first external electronic device 202 or the second external electronic device 206 (e.g., a server, such as a PPS) through the first communication interface 212.

According to an embodiment of the present disclosure, the first information may include the identification information about the first external electronic device 202, contact information, location information, information about the second communication interface to be used for the proximity discovery, transmission/reception setting information, security information, or a combination thereof.

According to an embodiment of the present disclosure, the second information may include identification information or contact information about the electronic device 201, identification information or contact information about the first external electronic device 202, information about the second communication interface 214 to be used for proximity discovery of the electronic device 201 activated based on the information about the second communication interface to be used for the proximity discovery of the first external electronic device 202, transmission/reception setting information, or a combination thereof.

According to an embodiment of the present disclosure, upon receipt of the first information contained in the request message to request paging for the proximity discovery through the first communication interface 212, the processor 250 may be configured to activate the second communication interface 214 based on the information about the second communication interface contained in the first information, generate a response message responsive to the request message and including the information about the activated second communication interface 214, and transmit the generated response message through the first communication interface 212 to the first external electronic device 202 or the second external electronic device 206 (e.g., a server, such as a PPS).

According to an embodiment of the present disclosure, the processor 250 may be configured to determine whether the first information contains identification information or contact information about the first external electronic device 202, and when the first information contains the identification information or contact information about the first external electronic device 202, transmit the response message through the first communication interface 212 to the first external electronic device 202 based on the network address information contained in the identification information about the first external electronic device 202.

According to an embodiment of the present disclosure, the processor 250 may be configured to determine whether the first information contains identification information or contact information about the first external electronic device 202, and unless the first information contains the identification information or contact information about the first external electronic device 202, transmit the response message through the first communication interface 212 to the second external electronic device 206 (e.g., a server, such as a PPS).

According to an embodiment of the present disclosure, the processor 250 may be configured to encrypt the second information based on the security information contained in the first information and transmit the encrypted second information through the first communication interface 212 to the first external electronic device 202 or the second external electronic device 206 (e.g., a server, such as a PPS). According to an embodiment of the present disclosure, the processor 250 may be configured to transmit or receive a proximity check message to determine whether the electronic device 202 is located proximate to/from the first external electronic device 201 through the activated second communication interface 214, based on transmission/reception setting information about the electronic device 201 contained in the second information or transmission/reception setting information about the first external electronic device 201 contained in the first information and receive or transmit a proximity check acknowledgement message responsive to the proximity check message from/to the first external electronic device 202 through the activated second communication interface 214.

According to an embodiment of the present disclosure, the processor 250 may be configured to encrypt the proximity check message or proximity check acknowledgement message based on the security information contained in the first information and transmit the encrypted proximity check message or proximity check acknowledgement message through the activated second communication interface 214 to the first external electronic device 202.

Figure 3:
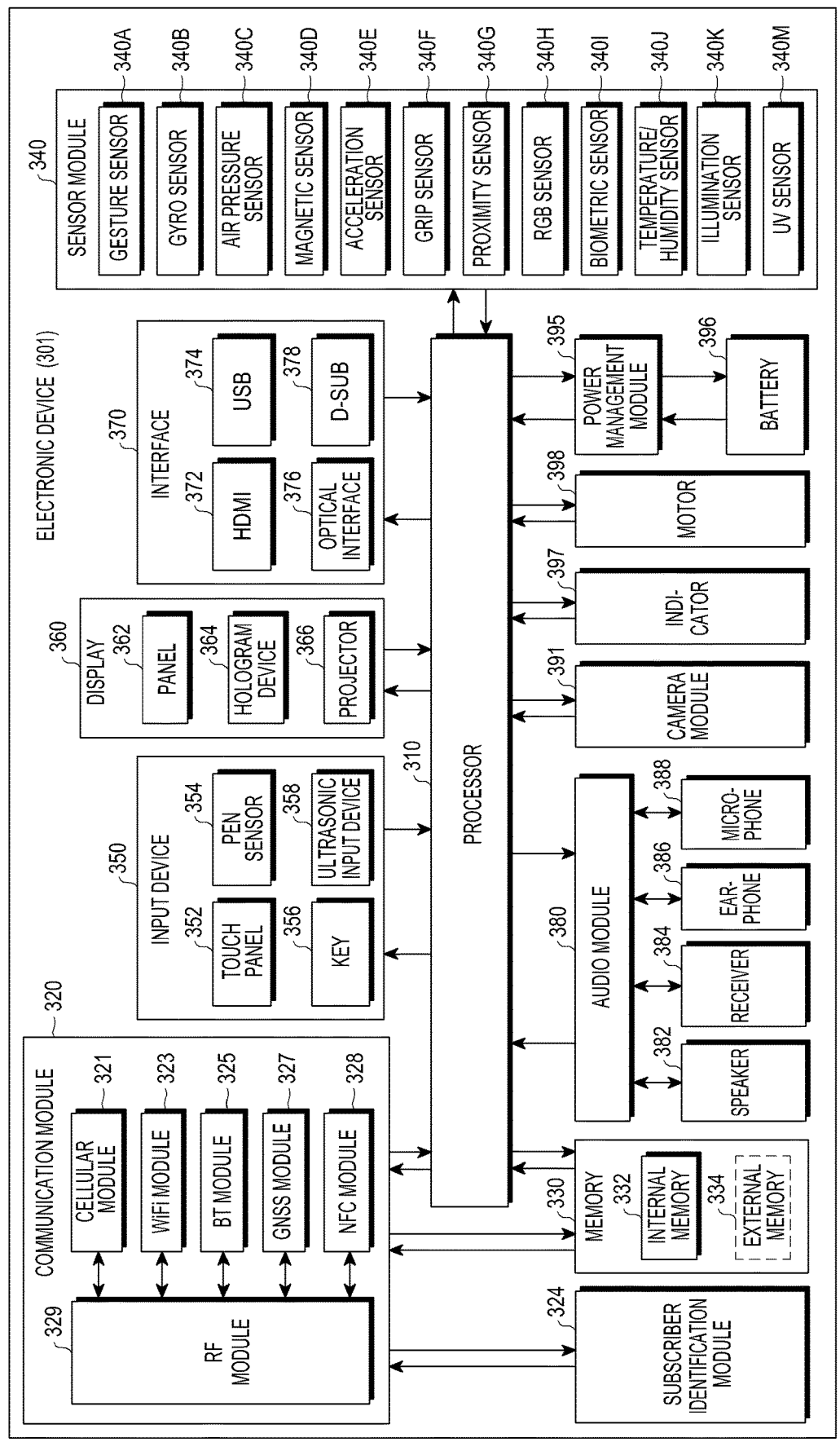
FIG. 3 is a block diagram of an electronic device according to an embodiment.

FIG. 3 is a block diagram of an electronic device 301 according to an embodiment of the present disclosure.

Referring to FIG. 3, the electronic device 301 may include the entire or part of, e.g., the electronic device 201 of FIG. 2. The electronic device 301 may include one or more processors (e.g., APs) 310, a communication module 320, a subscriber identification module (SIM) 324, a memory 330, a sensor module 340, an input device 350, a display 360, an interface 370, an audio module 380, a camera module 391, a power management module 395, a battery 396, an indicator 397, and a motor 398. The processor 310 may include at least some (e.g., the cellular module 321) of the components shown in FIG. 3. The processor 310 may load a command or data received from at least one of the other components (e.g., a non-volatile memory) on a volatile memory, process the command or data, and store resultant data in the non-volatile memory.

The communication module 320 may have the same or a similar configuration as the communication circuit 210. The communication module 320 may include, e.g., the cellular module 321, a WiFi module 323, a bluetooth (BT) module 325, a GNSS module 327, an NFC module 328, and an RF module 329. The cellular module 321 may provide voice call, video call, text, or Internet services through, e.g., a communication network. According to an embodiment of the present disclosure, the cellular module 321 may perform identification or authentication on the electronic device 301 in the communication network using the subscriber identification module 324 (e.g., a SIM card). According to an embodiment of the present disclosure, the cellular module 321 may perform at least some of the functions provided by the processor 310. According to an embodiment of the present disclosure, the cellular module 321 may include a CP. At least some (e.g., two or more) of the cellular module 321, the WiFi module 323, the bluetooth module 325, the GNSS module 327, or the NFC module 328 may be included in a single integrated circuit (IC) or an IC package. The RF module 329 may transmit and receive, e.g., communication signals (e.g., RF signals). The RF module 329 may include, e.g., a transceiver, a power amplifier module (PAM), a frequency filter, a low noise amplifier (LNA), or an antenna. According to an embodiment of the present disclosure, at least one of the cellular module 321, the WiFi module 323, the bluetooth module 325, the GNSS module 327, or the NFC module 328 may communicate RF signals through a separate RF module. The subscription identification module 324 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 330 (e.g., the memory 230) may include, e.g., an internal memory 332 or an external memory 334.

The sensor module 340 may measure a physical quantity or detect a motion state of the electronic device 301 and convert the measured or detected information into an electrical signal. The sensor module 340 may include at least one of, e.g., a gesture sensor 340A, a gyro sensor 340B, an air pressure sensor 340C, a magnetic sensor 340D, an acceleration sensor 340E, a grip sensor 340F, a proximity sensor 340G, a color sensor 340H (e.g., a red-green-blue (RGB) sensor), a biometric sensor 340I, a temperature/humidity sensor 340J, an illumination sensor 340K, or an ultra violet (UV) light sensor 340M.

The input unit 350 may include, e.g., a touch panel 352, a (digital) pen sensor 354, a key 356, or an ultrasonic input device 358. The display 360 (e.g., the display 240) may include a panel 362, a hologram device 364, a projector 366, or a control circuit for controlling the same. The panel 362 may be implemented to be flexible, transparent, or wearable. The panel 362, together with the touch panel 352, may be configured in one or more modules. According to an embodiment of the present disclosure, the panel 362 may include a pressure sensor (or pose sensor) that may measure the strength of a pressure by a user's touch. The pressure sensor may be implemented in a single body with the touch panel 352 or may be implemented in one or more sensors separate from the touch panel 352. The hologram device 364 may make three dimensional (3D) images (holograms) in the air by using light interference. The projector 366 may display an image by projecting light onto a screen. The screen may be, for example, located inside or outside of the electronic device 301. The interface 370 may include e.g., an HDMI 372, a USB 374, an optical interface 376, or a D-subminiature (D-sub) connector 378. The interface 370 may be included in e.g., the communication circuit 210 shown in FIG. 2.

The audio module 380 may convert, e.g., a sound signal into an electrical signal and vice versa. At least a part of the audio module 380 may be included in e.g., the input/output interface 220 as shown in FIG. 2. The audio module 380 may process sound information input or output through e.g., a speaker 382, a receiver 384, an earphone 386, or a microphone 388. For example, the camera module 391 may be a device for capturing still images or videos, and may include, according to an embodiment of the present disclosure, one or more image sensors (e.g., front and back sensors), a lens, an image signal processor (ISP), or a flash such as an LED or xenon lamp. The power manager module 395 may manage power of the electronic device 301, for example. A battery gauge may measure an amount of remaining power of the battery 396, a voltage, a current, or a temperature while the battery 396 is being charged. The battery 396 may include, e.g., a rechargeable battery or a solar battery.

The indicator 397 may indicate a particular state of the electronic device 301 or a part (e.g., the processor 310) of the electronic device 301, including e.g., a booting state, a message state, or a recharging state. The motor 398 may convert an electrical signal to a mechanical vibration and may generate a vibrational or haptic effect.

Figure 4:
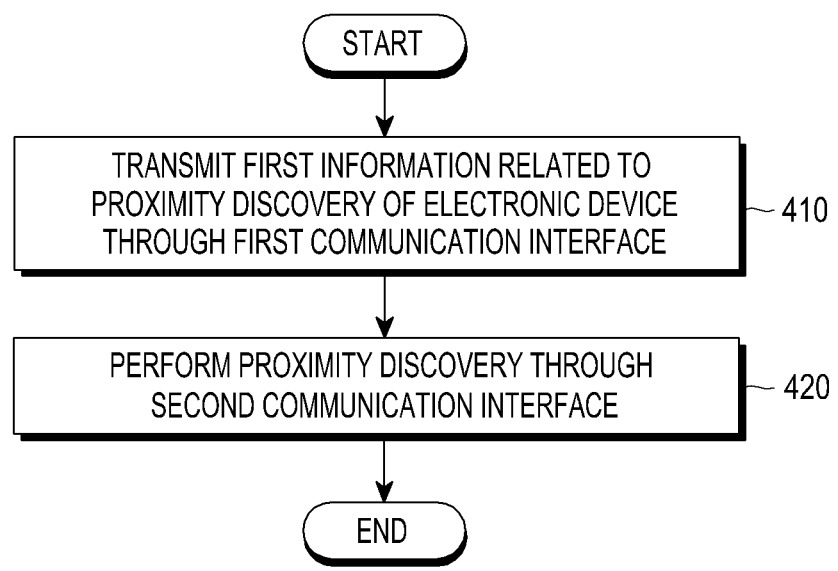
FIG. 4 is a flowchart of a proximity discovery method of an electronic device according to an embodiment.

FIG. 4 is a flowchart of a proximity discovery method of an electronic device 201 according to an embodiment of the present disclosure. The proximity discovery method of the electronic device 201 may include operations 410 and 420. The proximity discovery method of the electronic device 201 may be performed by at least one of an electronic device 201 or a processor 250 of the electronic device 201. For example, the electronic device 201 may be a device requesting proximity paging for proximity discovery, a first external electronic device 202 may be a device to receive a proximity paging request for proximity discovery, which may be a target device to be discovered by the proximity discovery, and a second external electronic device 206 may be a server (e.g., a PPS) to which the electronic device 201 and the first external electronic device 202 subscribe and which provides a proximity discovery service.

Referring to FIG. 4, in operation 410, the electronic device 201 may transmit first information related to the proximity discovery of the electronic device 201 through a first communication interface 212 to the first external electronic device 202 or the second external electronic device 206 (e.g., a server, such as a PPS).

For example, when an input or application related to performing proximity discovery is selected, the electronic device 201 may generate a request message to request proximity paging for proximity discovery including the first information related to the proximity discovery of the electronic device and transmit the generated request message through the first communication interface to the first external electronic device or the second external electronic device.

According to an embodiment of the present disclosure, the first communication interface may be connected to a preset communication network. The preset communication network may be a WAN (e.g., the Internet).

According to an embodiment of the present disclosure, the first information may include identification information about the electronic device 201, contact information, location information, information about the second communication interface to be used for the proximity discovery, transmission/reception setting information, security information, or a combination thereof.

According to an embodiment of the present disclosure, the electronic device 201 may designate the first external electronic device that is a target for the proximity discovery. According to an embodiment of the present disclosure, where the first external electronic device is designated, the electronic device 201 may transmit the generated request message through the first communication interface to the designated first external electronic device based on contact information (e.g., a phone number or an email address) or identification information (e.g., network address information or identification information temporarily assigned) about the designated first external electronic device. According to an embodiment of the present disclosure, the request message may be transmitted to the first external electronic device in a unicasting or multicasting manner.

According to an embodiment of the present disclosure, unless the first external electronic device to which the request message is to be transmitted is designated, the electronic device 201 may transmit the request message through the first communication interface to the second external electronic device (e.g., a server, such as a PPS).

In operation 420, the electronic device 201 may perform proximity discovery with the first external electronic device through a second communication interface (e.g., the second communication interface 214) based on the first information or second information related to proximity discovery of the first external electronic device corresponding to the first information.

According to an embodiment of the present disclosure, the second communication interface may directly communicate with the first external electronic device based on short-range communication.

According to an embodiment of the present disclosure, the electronic device 201 may perform proximity discovery with the first external electronic device through the second communication interface based on the first information. For example, the electronic device 201 may activate the second communication interface of the electronic device 201 based on the information about the second communication interface to be used for the proximity discovery of the electronic device 201 contained in the first information. The electronic device 201 may transmit or receive a proximity check message to determine whether the electronic device 201 and the first external electronic device are located proximate based on transmission/reception setting information about the electronic device 201 contained in the first information through the activated second communication interface to/from the first external electronic device, performing the proximity discovery. The electronic device 201 may receive or transmit, from/to the first external electronic device, through the activated second communication interface, a proximity check acknowledgement message corresponding to the proximity check message, performing the proximity discovery.

According to an embodiment of the present disclosure, the electronic device 201 may perform proximity discovery with the first external electronic device based on the second information. For example, the electronic device 201 may receive second information related to the proximity discovery of the second external electronic device corresponding to the first information from the first external electronic device or the second external electronic device through the first communication interface. For example, where the first external electronic device is designated, the electronic device 201 may receive the response message containing the second information from the first external electronic device through the first communication interface in response to the transmission of the request message. Further, unless the first external electronic device is designated, the electronic device 201 may receive the response message containing the second information from the second external electronic device through the first communication interface in response to the transmission of the request message. For example, the electronic device 201 may receive the response message, which has been transmitted from the first external electronic device to the second external electronic device, from the second external electronic device through the first communication interface.

According to an embodiment of the present disclosure, the second information may include identification information or contact information about the electronic device 201, identification information or contact information about the first external electronic device, information about the second communication interface to be used for proximity discovery of the first external electronic device activated based on information about the second communication interface to be used for the proximity discovery of the electronic device, transmission/reception setting information, or a combination thereof.

According to an embodiment of the present disclosure, the electronic device 201 may activate the second communication interface based on the information about the second communication interface to be used for the proximity discovery of the first external electronic device contained in the second information. The electronic device 201 may transmit or receive a proximity check message to determine whether the electronic device and the first external electronic device are located proximate based on transmission/reception setting information about the first external electronic device contained in the second information through the activated second communication interface to/from the first external electronic device, performing the proximity discovery. The electronic device 201 may receive or transmit, from/to the first external electronic device, through the activated second communication interface, a proximity check acknowledgement message corresponding to the proximity check message, performing the proximity discovery.

According to an embodiment of the present disclosure, the electronic device 201 may perform proximity discovery with the first external electronic device through the second communication interface based on the first information and the second information. For example, the electronic device 201 may activate the second communication interface based on the information about the second communication interface to be used for the proximity discovery of the electronic device contained in the first information and the information about the second communication interface to be used for the proximity discovery of the first external electronic device contained in the second information. The electronic device 201 may transmit or receive a proximity check message to determine whether the electronic device 201 and the first external electronic device are located proximate based on the transmission/reception setting information about the electronic device contained in the first information and transmission/reception setting information about the first external electronic device contained in the second information through the activated second communication interface to/from the first external electronic device, performing the proximity discovery. The electronic device 201 may receive or transmit, from/to the first external electronic device, through the activated second communication interface, a proximity check acknowledgement message corresponding to the proximity check message, performing the proximity discovery.

According to an embodiment of the present disclosure, the electronic device 201 may set the electronic device 201 as a receiving device to receive the proximity check message based on transmission/reception setting information about the first external electronic device contained in the second information or transmission/reception setting information about the electronic device 201 contained in the first information. The electronic device 201 may receive the proximity check message through the activated second communication interface from the first external electronic device, and the electronic device 201 may, in response to the reception of the proximity check message, transmit the proximity check acknowledgement message corresponding to the proximity check message to, at least, the first external electronic device through the activated second communication interface.

According to an embodiment of the present disclosure, the electronic device 201 may set the electronic device 201 as a transmitting device to transmit the proximity check message based on transmission/reception setting information about the first external electronic device contained in the second information or transmission/reception setting information about the electronic device 201 contained in the first information. The electronic device 201 may transmit the proximity check message through the activated second communication interface to the first external electronic device, and the electronic device 201 may, in response to the transmission of the proximity check message, receive the proximity check acknowledgement message corresponding to the proximity check message from the first external electronic device through the activated second communication interface.

According to an embodiment of the present disclosure, the proximity check message transmitted may include identification information about the device to receive the proximity check message. For example, where the device to transmit the proximity check message is set as the electronic device 201, and the device to receive the proximity check message is set as the first external electronic device, the electronic device 201 may include the identification information about the first external electronic device in the proximity check message and send the proximity check message to the first external electronic device. When the identification information contained in the proximity check message matches the identification information that the first external electronic device owns, the first external electronic device may transmit a proximity check acknowledgement message responsive to the proximity check message to the electronic device 201. Upon receipt of the proximity check acknowledgement message, the electronic device 201 may determine that the first external electronic device is a device located proximate to the electronic device 201 and may generate a proximate device list indicating devices discovered by the proximity discovery including the first external electronic device or add the first external electronic device to the generated proximate device list. For example, where the device to transmit the proximity check message is set as the first external electronic device, and the device to receive the proximity check message is set as the electronic device 201, the first external electronic device may include the identification information about the electronic device 201 in the proximity check message and send the proximity check message to the electronic device 201. When the identification information contained in the proximity check message matches the identification information that the electronic device 201 owns, the electronic device 201 may transmit a proximity check acknowledgement message responsive to the proximity check message to the first external electronic device. Upon receipt of the proximity check acknowledgement message containing the identification information matching the identification information that the electronic device 201 owns, the electronic device 201 may determine that the first external electronic device is a device located proximate to the electronic device 201 and may generate a proximate device list indicating devices discovered by the proximity discovery including the first external electronic device or add the first external electronic device to the generated proximate device list.

According to an embodiment of the present disclosure, the proximate device list may be stored in the memory of the electronic device 201. The proximate device list may be updated based on a result of the proximity discovery.

According to an embodiment of the present disclosure, the second information contained in the response message received from the first external electronic device or the second external electronic device may be information encrypted based on security information (e.g., the first encryption key of the first security information) contained in the first information related to the proximity discovery of the electronic device 201. Where the second information is encrypted, the electronic device 201 may decrypt the encrypted response message based on the security information contained in the first information. For example, the electronic device 201 may decrypt the encrypted second information using the first decryption key that is generated together with the first encryption key included in the security information (e.g., the first security information) in the first information and that is stored in the memory of the electronic device 201.

According to an embodiment of the present disclosure, the proximity check message or the proximity check acknowledgement message received from the first external electronic device may be information encrypted based on security information (e.g., the second encryption key of the second security information) contained in the first information. Where the proximity check message or proximity check acknowledgement message received from the first external electronic device is encrypted, the electronic device 201 may decrypt the encrypted power consumption or proximity check acknowledgement message based on the security information contained in the first information. For example, the electronic device 201 may decrypt the encrypted proximity check message or proximity check acknowledgement message using the second decryption key that is generated together with the second encryption key included in the security information (e.g., the second security information) in the first information and that is stored in the memory of the electronic device 201. According to an embodiment of the present disclosure, the response message received from the first external electronic device may further include rejection information to reject the proximity paging request for the proximity discovery. For example, the rejection information may include reasons for rejection. According to an embodiment of the present disclosure, the reasons for rejection may include the second communication interface of the first external electronic device corresponding to the second communication interface to be used for the proximity discovery of the electronic device 201 is being used; the first external electronic device does not support the second communication interface to be used for the proximity discovery of the electronic device 201; the proximity discovery of the first external electronic device is explicitly rejected (e.g., the rejection of proximity discovery is entered through the UI); the distance between the electronic device 201 and the first external electronic device falls outside a preset proximate distance; or a combination thereof. According to an embodiment of the present disclosure, the preset proximate distance may be set based on an arrival distance corresponding to the second communication interface to be used for the proximity discovery.

Figure 5:
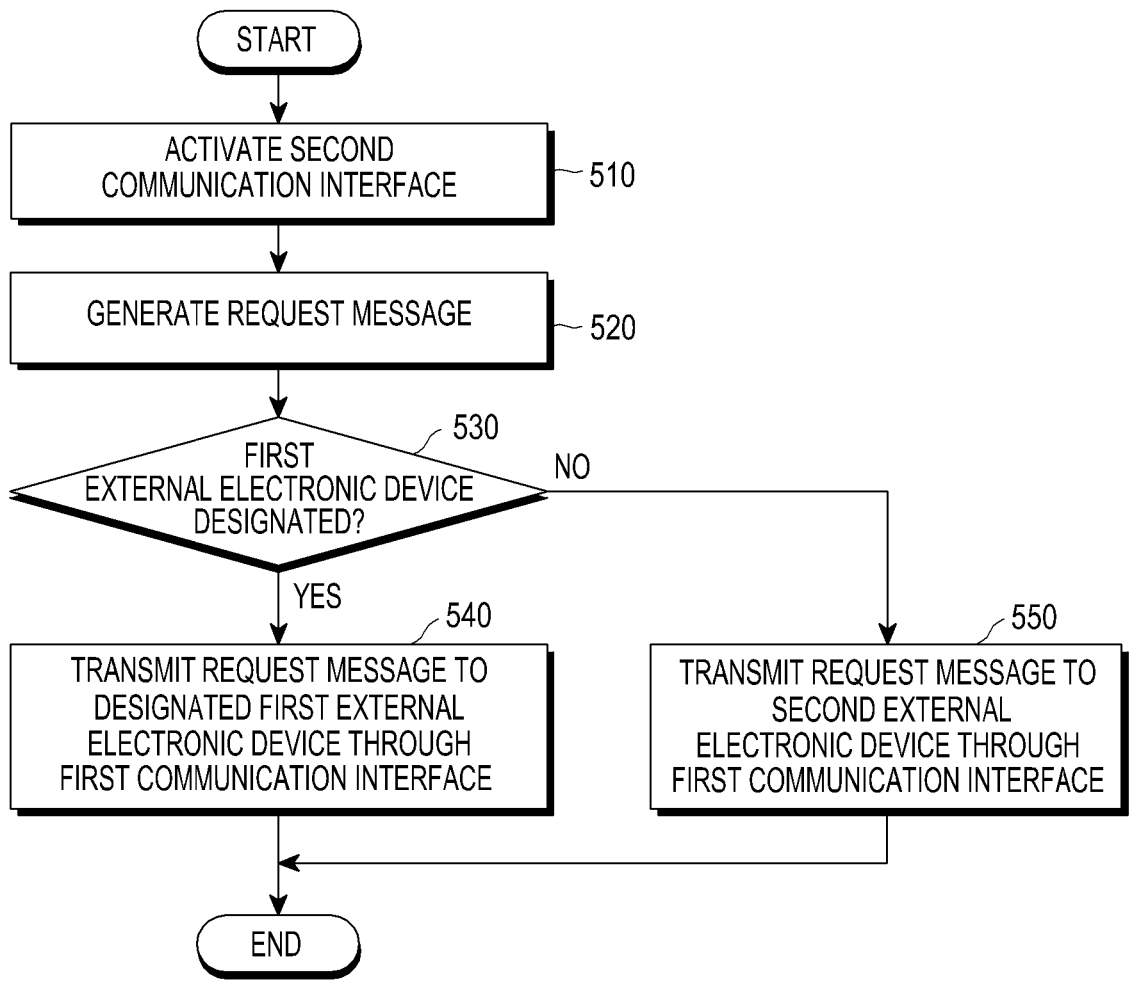
FIG. 5 is a flowchart of a proximity discovery method of an electronic device according to an embodiment.

FIG. 5 is a flowchart of a proximity discovery method of an electronic device 201 according to an embodiment. FIG. 5 illustrates in greater detail the method of transmitting a request message (operation 410) of the proximity discovery method of the electronic device 201 shown in FIG. 4, where the method of FIG. 5 may include operations 510, 520, 530, 540, and 550. The proximity discovery method of the electronic device 201 may be performed by at least one of an electronic device 201 or a processor 250 of the electronic device. The electronic device 201 may be a device requesting proximity paging for proximity discovery, a first external electronic device 202 may be a device to receive a proximity paging request for proximity discovery, which is a target device to be discovered by the proximity discovery, and a second external electronic device 206 may be a server (e.g., a PPS) to which the electronic device 201 and the first external electronic device 202 subscribe and which provides a proximity discovery service.

Referring to FIG. 5, in operation 510, for example, upon entry of a proximity discovery request, the electronic device 201 may activate the second communication interface to be used for the proximity discovery.

For example, when an input or application related to performing proximity discovery is selected through the UI on the display 240 through the input/output interface 220 of the electronic device 201, the electronic device 201 may discover the second communication interface, or at least one communication channel of the second communication interface, to be used for the proximity discovery based on the information about the second communication interface 214 available for the proximity discovery and may activate the least congested second communication interface or communication channel of the corresponding second communication interface.

According to an embodiment of the present disclosure, the second communication interface may include at least one second communication interface type. For example, the second communication interface may include a WiFi communication interface or a bluetooth communication interface.

According to an embodiment of the present disclosure, the second communication interface to be used for the proximity discovery may be automatically selected and activated by the electronic device 201. For example, upon entry of a proximity discovery request, the electronic device 201 may automatically select and activate the least congested communication interface among at least one communication interface of the second communication interface available for the proximity discovery. For example, at least one communication channel (e.g., a communication channel A, a communication channel B, and a communication channel C) supported by the WiFi communication interface or at least one communication channel (e.g., a communication channel D, a communication channel E, and a communication channel F) supported by the bluetooth communication interface may be discovered. The electronic device 201 may automatically select and activate the least congested communication interface or communication channel based on the communication state of at least one communication channel (e.g., communication channels A to F) discovered.

According to an embodiment of the present disclosure, the second communication interface to be used for the proximity discovery may be activated by a user input. For example, upon entry of a request for proximity discovery, the electronic device 201 may display types of second communication interfaces to be used for the proximity discovery on the display 330 of the electronic device 201, and the user may select one of the types of second communication interfaces displayed. The electronic device 201 may turn on and activate the second communication interface selected by the user.

In operation 520, for example, the electronic device 201 may generate a request message including information about the activated second communication interface. For example, the electronic device 201 may generate the request message including the information about the activated second communication interface.

According to an embodiment of the present disclosure, the information about the activated second communication interface may include type information, channel information, or channel hopping sequence information about the second communication interface or a combination thereof. For example, where communication channel A of the WiFi communication interface is activated as the second communication interface to be used for the proximity discovery, the electronic device 201 may include the WiFi communication interface or communication channel A in the type information or channel information, respectively, in the information about the activated second communication interface. The electronic device 201 may include the information about the activated second communication interface in the request message.

According to an embodiment of the present disclosure, the electronic device 201 may include in the request message information about at least one second communication interface candidate to be used for the proximity discovery as well as the information about the activated second communication interface. For example, the information about at least one second communication interface candidate may include information about the second communication interface candidate, which includes the priorities of candidates set in the order of the least congestion for the second communication interface candidates or communication channels based on the communication state of at least one communication channel (e.g., communication channels A to F) discovered in operation 510. For example, the electronic device 201 may include, in the information about the second communication interface candidate, information about at least one second communication interface or corresponding candidate communication channel according to the priority of candidate among the discovered communication channels based on a preset communication quality or a preset number of second communication interface candidates.

In operation 530, for example, the electronic device 201 may determine whether the first external electronic device to which to send the request message is designated. Where the first external electronic device to which to send the request message is designated in operation 530, the electronic device 201 may perform operation 540, and unless the first external electronic device to which to send the request message is designated in operation 530, the electronic device may perform operation 550.

According to an embodiment of the present disclosure, the electronic device 201 may designate the first external electronic device that is a target for the proximity discovery. For example, the electronic device 201 may designate the first external electronic device based on contact information (e.g., a phone number or an email address) stored in the electronic device 201. For example, the electronic device 201 may designate a device corresponding to all or a selected one of the users in the contact information as the first external electronic device. According to an embodiment of the present disclosure, the contact information may include a parameter indicating whether the proximity discovery is agreed on, and the electronic device 201 may designate a device corresponding to the contact information about a user who has agreed on the proximity discovery as the first external electronic device to which the request message is to be transmitted, based on the parameter.

In operation 540, for example, when the first external electronic device to which to send the request message is designated, the electronic device 201 may transmit the generated request message through a first communication interface (e.g., the first communication interface 212) connected to a preset communication network (e.g., the network 262 (e.g., WAN)) to the designated first external electronic device.

According to an embodiment of the present disclosure, when the first external electronic device to which the request message is to be transmitted is designated, if an input or application related to performing the proximity discovery is selected through the input/output interface 220 of the electronic device 201 or display 240 of the electronic device 201, the electronic device 201 may transmit the request message through the first communication interface to the designated first external electronic device.

According to an embodiment of the present disclosure, the electronic device 201 may transmit the request message through the first communication interface to the designated first external electronic device based on the network address information (e.g., an IP address, an MAC address, or a URL address) contained in the identification information about the designated first external electronic device.

According to an embodiment of the present disclosure, the electronic device 201 may transmit the request message through the first communication interface to the designated first external electronic device, in the form of a text message (e.g., an SMS, an LMA, or an MMS message), an IM, an email, an IMS message, or a pre-defined application layer message, based on the contact information about the designated first external electronic device.

According to an embodiment of the present disclosure, the request message may include an identifier indicating that the request message is a message for requesting proximity paging for proximity discovery. For example, the identifier may be included in the header of the data structure of the request message. The electronic device 201 may distinguish the general text message from the message for requesting proximity paging for proximity discovery through the identifier.

In operation 550, for example, when the first external electronic device to which the request message is to be transmitted is undesignated, the electronic device 201 may transmit the request message through the first communication interface to the second external electronic device (e.g., a server, such as a PPS).

According to an embodiment of the present disclosure, unless the first external electronic device to which the request message is to be transmitted is designated, if an input or application related to performing the proximity discovery is selected through the input/output interface or display of the electronic device 201, the electronic device 201 may transmit the request message through the first communication interface to the second external electronic device. The request message transmitted to the second external electronic device may be transmitted to at least one selected first external electronic device depending on the determination of the second external electronic device. For example, when the electronic device 201 transmits the request message through the first communication interface to the second external electronic device, the second external electronic device may select the first external electronic device to which to send the request message based on context information (e.g., location information) or subscription information (e.g., identification information or contact information) about the first external electronic device stored in the second external electronic device and may transmit the request message to the selected first external electronic device through the network 262 (e.g., a WAN).

Figure 6:
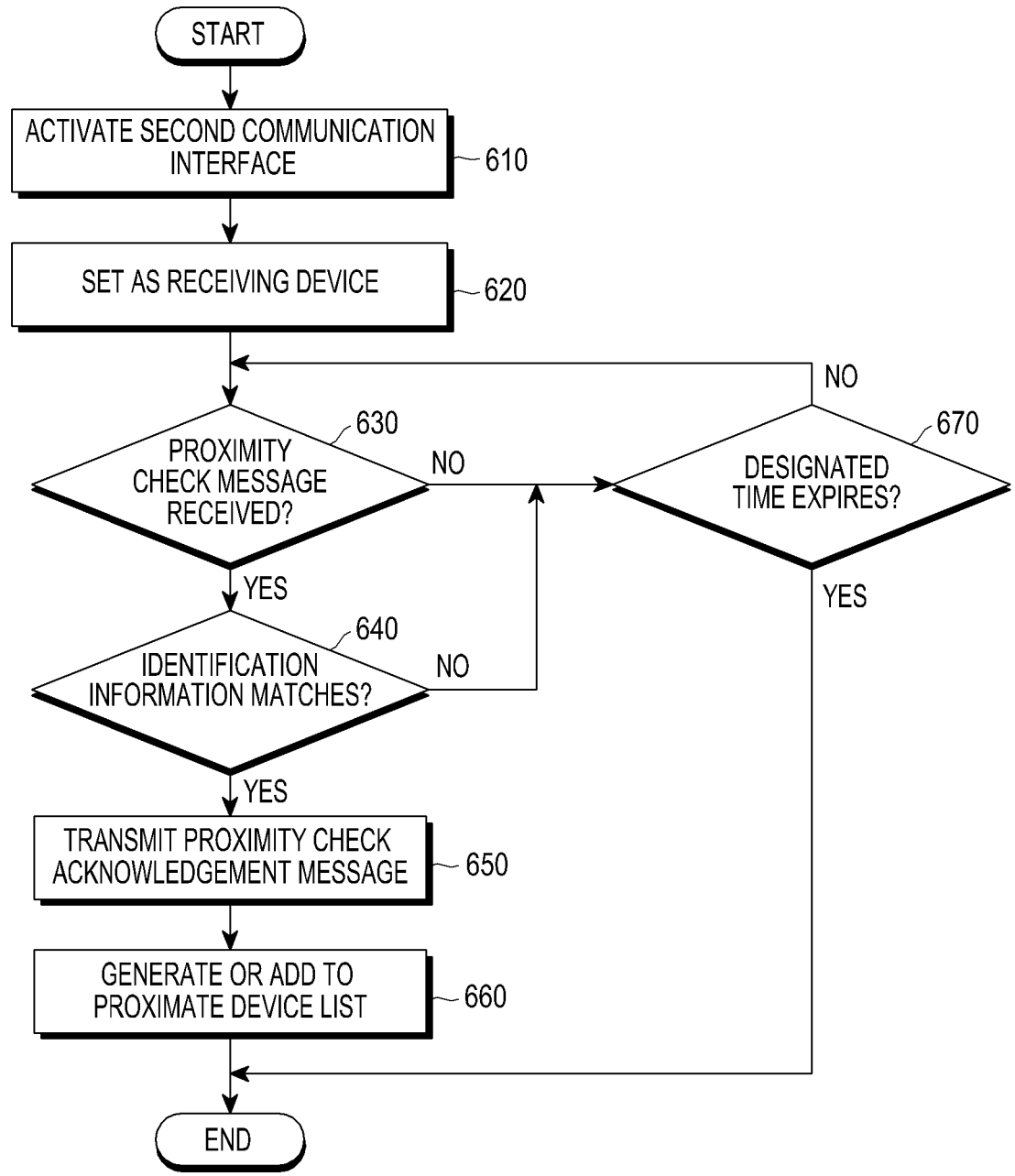
FIG. 6 is a flowchart of a proximity discovery method of an electronic device according to an embodiment.

FIG. 6 is a flowchart of a proximity discovery method of an electronic device 201 according to an embodiment. FIG.

6 illustrates in greater detail the method of performing proximity discovery (operation 420) of the proximity discovery method of the electronic device 201 shown in FIG. 4, and the method of FIG. 6 may include operations 610, 620, 630, 640, 650, 660, and 670. The proximity discovery method of the electronic device 201 may be performed by at least one of an electronic device 201 or a processor 250 of the electronic device. It is assumed in FIG. 6 that the electronic device 201 is a device to transmit a proximity paging request for proximity discovery and the first external electronic device 202 is a device to receive the proximity paging request for proximity discovery.

Referring to FIG. 6, in operation 610, for example, the electronic device 201 may activate the second communication interface 214 to be used for the proximity discovery based on first information related to the proximity discovery of the electronic device 201 or second information related to the proximity discovery of the first external electronic device 202 received corresponding to the first information. For example, the electronic device 201 may activate the second communication interface type or communication channel of the corresponding communication interface to be used for the proximity discovery, based on information about the second communication interface to be used for the proximity discovery contained in the first information or information about the second communication interface to be used for the proximity discovery contained in the second information. Operation 610 is the same as operation 510 of FIG. 5, and thus, the description of operation 510 may apply to operation 610.

In operation 620, for example, the electronic device 201 may set the electronic device 201 as a receiving device upon performing proximity discovery based on the transmission/reception setting information contained in the first information or the transmission/reception setting information contained in the second information.

For example, the electronic device 201 may set the electronic device 201 as the receiving device to receive the proximity check message to determine whether the electronic device 201 and the first external electronic device are located proximate, based on the transmission/reception setting information contained in the first information or the transmission/reception setting information contained in the second information. In this case, the first external electronic device may be set as a transmitting device to transmit the proximity check message.

According to an embodiment of the present disclosure, when the activated second communication interface is a WiFi communication interface, the proximity check message may be a probe request message, and the proximity check acknowledgement message may be a probe response message.

According to an embodiment of the present disclosure, when the activated second communication interface is a bluetooth communication interface, the proximity check message may be a scan request message, and the proximity check acknowledgement message may be an advertising data message.

In operation 630, for example, the electronic device may determine whether the proximity check message is received from the first external electronic device through the activated second communication interface during a designated time. In operation 630, when the proximity check message is received, the electronic device 201 may perform operation 640, and when not, operation 670.

In operation 640, for example, when the proximity check message is received, the electronic device 201 may determine whether the identification information about the device to receive the proximity paging request contained in the proximity check message matches identification information about the first external electronic device contained in the first information or second information. When the identification information about the device to receive the proximity paging request contained in the proximity check message matches the identification information about the first external electronic device in operation 640, the electronic device may perform operation 650, and when the identification information about the device to receive the proximity paging request contained in the proximity check message does not match the identification information about the first external electronic device in operation 640, the electronic device may perform operation 670.

In operation 650, for example, when the identification information about the device to receive the proximity paging request contained in the proximity check message matches the identification information about the first external electronic device, the electronic device 201 may transmit a proximity check acknowledgement message responsive to the proximity check message through the activated second communication interface to the first external electronic device.

According to an embodiment of the present disclosure, the electronic device 201 may include the identification information about the device to receive the proximity paging request in the proximity check acknowledgement message and transmit the proximity check acknowledgement message through the activated second communication interface to the first external electronic device. For example, the electronic device 201 may include the identification information about the first external electronic device in the proximity check acknowledgement message and transmit the proximity check acknowledgement message to the first external electronic device.

In operation 660, for example, the electronic device 201 may generate a proximate device list including the first external electronic device or add the first external electronic device to the proximate device list.

For example, when the identification information about the device to receive the proximity paging request contained in the proximity check message matches the identification information about the first external electronic device, the electronic device 201 may determine that the first external electronic device having sent the proximity check message is a device located proximate to the electronic device 201, which is discovered as a result of performing the proximity discovery. The electronic device 201 may generate a proximate device list including the first external electronic device discovered as a result of the proximity discovery, or where the proximate device list has already been generated, the electronic device 201 may add the first external electronic device to the proximate device list.

Although in the description in connection with FIG. 6 operation 650 is performed earlier than operation 660, embodiments of the present disclosure are not limited thereto. For example, operation 660 may be performed earlier than operation 650.

In operation 670, for example, when the proximity check message is not received or where the identification information about the device to receive the proximity paging request contained in the proximity check message does not match the identification information about the first external electronic device, the electronic device 201 may determine whether the designated time expires. When the designated time expires in operation 670, the electronic device 201 may terminate the proximity discovery, but when the designated time does not expire, the electronic device 201 may again perform operation 630 to receive the proximity check message until the designated time expires.

Figure 7:
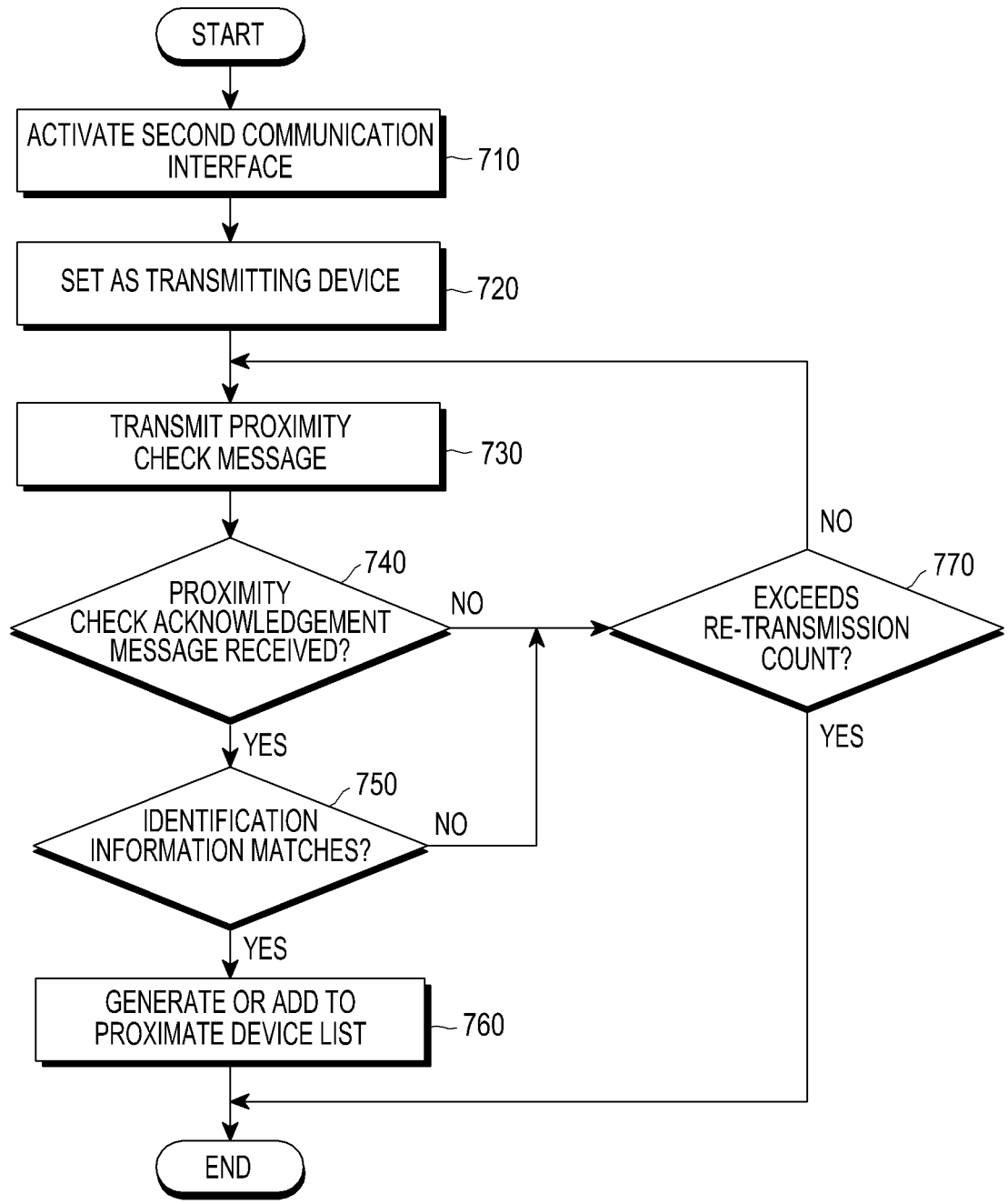
FIG. 7 is a flowchart of a proximity discovery method of an electronic device according to an embodiment.

FIG. 7 is a flowchart of a proximity discovery method of an electronic device 201 according to an embodiment. FIG. 7 illustrates in greater detail the method of performing proximity discovery (operation 420) of the proximity discovery method of the electronic device 201 shown in FIG. 4, and the method of FIG. 7 may include operations 710, 720, 730, 740, 750, 760, and 770. The proximity discovery method of the electronic device 201 may be performed by at least one of an electronic device 201 or a processor 250 of the electronic device. The electronic device 201 may be a device to transmit a proximity paging request for proximity discovery and the first external electronic device 202 may be a device to receive the proximity paging request for proximity discovery.

Referring to FIG. 7, in operation 710, for example, the electronic device 201 may activate the second communication interface 214 to be used for the proximity discovery based on first information related to the proximity discovery of the electronic device 201 or second information related to the proximity discovery of the first external electronic device 202 received corresponding to the first information.

For example, the electronic device 201 may activate the second communication interface type or communication channel of the corresponding communication interface to be used for the proximity discovery, based on information about the second communication interface to be used for the proximity discovery contained in the first information or information about the second communication interface to be used for the proximity discovery contained in the second information. Operation 710 is the same as operation 510 of FIG. 5, and thus, the description of operation 510 may apply to operation 710.

In operation 720, for example, the electronic device 201 may set the electronic device 201 as a transmitting device upon performing proximity discovery based on the transmission/reception setting information contained in the first information or the transmission/reception setting information contained in the second information.

For example, the electronic device 201 may set the electronic device 201 as the transmitting device to transmit the proximity check message to determine whether the electronic device 201 and the first external electronic device are located proximate, based on the transmission/reception setting information about the first external electronic device contained in the first information or the transmission/reception setting information about the electronic device 201 contained in the second information. In this case, the first external electronic device may be set as a receiving device to receive the proximity check message.

According to an embodiment of the present disclosure, where the activated second communication interface is a WiFi communication interface, the proximity check message may be a probe request message, and the proximity check acknowledgement message may be a probe response message.

According to an embodiment of the present disclosure, where the activated second communication interface is a bluetooth communication interface, the proximity check message may be a scan request message, and the proximity check acknowledgement message may be an advertising data message.

In operation 730, for example, the electronic device 201 may transmit the proximity check message through the activated second communication interface to the first external electronic device.

According to an embodiment of the present disclosure, the electronic device 201 may include the identification information about the device to receive the proximity paging in the proximity check message and transmit the proximity check message through the activated second communication interface to the first external electronic device. For example, the electronic device 201 may include the identification information about the first external electronic device in the proximity check message and transmit the proximity check message to the first external electronic device.

In operation 740, for example, the electronic device 201 may determine whether the proximity check acknowledgement message is received from the first external electronic device through the activated second communication interface during a designated time. In operation 740, when the proximity check acknowledgement message is received, the electronic device 201 may perform operation 750, and when not, operation 770 may be performed.

In operation 750, for example, when the proximity check acknowledgement message is received, the electronic device 201 may determine whether the identification information about the device to receive the proximity paging contained in the proximity check acknowledgement message matches identification information about the first external electronic device contained in the first information or second information. When the identification information about the device to receive the proximity paging contained in the proximity check acknowledgement message matches the identification information about the first external electronic device in operation 750, the electronic device 201 may perform operation 760, and when the identification information about the device to receive the proximity paging contained in the proximity check acknowledgement message does not match the identification information about the first external electronic device in operation 750, the electronic device 201 may perform operation 770.

In operation 760, for example, when the identification information about the device to receive the proximity paging request contained in the proximity check acknowledgement message matches the identification information about the first external electronic device, the electronic device 201 may generate a proximate device list including the first external electronic device or add the first external electronic device to the proximate device list.

For example, when the identification information about the device to receive the proximity paging request contained in the proximity check acknowledgement message matches the identification information about the first external electronic device, the electronic device 201 may determine that the first external electronic device having sent the proximity check message is a device located proximate to the electronic device 201, which is discovered as a result of performing the proximity discovery. The electronic device 201 may generate a proximate device list including the first external electronic device discovered as a result of the proximity discovery, or where the proximate device list has already been generated, the electronic device 201 may add the first external electronic device to the proximate device list.

In operation 770, for example, when the proximity check acknowledgement message is not received or where the identification information about the device to receive the proximity paging contained in the proximity check acknowledgement message does not match the identification information about the first external electronic device, the electronic device 201 may determine whether the transmission of the proximity check message exceeds a designated re-transmission count.

When the transmission of the proximity check message exceeds the designated re-transmission count in operation 770, the electronic device 201 may terminate the proximity discovery, but unless exceeding the designated re-transmission count, the electronic device 201 may again perform operation 730 to transmit the proximity check message until the transmission exceeds the designated re-transmission count.

According to an embodiment of the present disclosure, the proximity discovery method of the electronic device 201 may comprise transmitting first information related to proximity discovery of the electronic device 201 to a first external electronic device 202 or a second external electronic device 206 (e.g., a server, such as a PPS) through the first communication interface 212 and performing proximity discovery with the first external electronic device 202 through the second communication interface 214 based on the first information or second information related to proximity discovery of the first external electronic device 202 corresponding to the first information.

According to an embodiment of the present disclosure, the proximity discovery method of the electronic device 201 may further comprise receiving the second information from the first external electronic device 202 or the second external electronic device 206 (e.g., a server, such as a PPS) through the first communication interface 212.

According to an embodiment of the present disclosure, performing the proximity discovery may include, when an input or an application related to performing the proximity discovery is selected, activating the second communication interface 214 to be used for the proximity discovery based on communication state information corresponding to the second communication interface 214, generating a request message for the proximity discovery by including information about the activated second communication interface 214 in the first information, and transmitting the generated request message through the first communication interface 212 to the first external electronic device 202.

According to an embodiment of the present disclosure, performing the proximity discovery may include determining whether the first external electronic device 202 to which the request message is to be transmitted is designated, and when the first external electronic device 202 to which the request message is to be transmitted is designated, transmitting the request message through the first communication interface 212 to the designated first external electronic device 202 based on network address information contained in identification information of the designated first external electronic device 202.

According to an embodiment of the present disclosure, performing the proximity discovery may include determining whether the first external electronic device 202 to which the request message is to be transmitted is designated, and when the first external electronic device 202 to which the request message is to be transmitted is designated, transmitting the request message through the first communication interface 212 to the designated first external electronic device 202 in the form of a text message, an instant message, an email, an IMS or a pre-defined application layer message, based on contact information of the designated first external electronic device 202.

According to an embodiment of the present disclosure, performing the proximity discovery may include determining whether the first external electronic device 202 to which the request message is to be transmitted is designated, and when the first external electronic device 202 to which the request message is to be transmitted is undesignated, transmitting the request message through the first communication interface 212 to the second external electronic device 206 (e.g., a server, such as a PPS) configured to provide a proximity discovery service between the electronic device 201 and the first external electronic device 202.

According to an embodiment of the present disclosure, performing the proximity discovery may include transmitting or receiving a proximity check message to determine whether the electronic device 201 is located proximate to/from the first external electronic device 202 through the activated second communication interface 214, based on transmission/reception setting information of the electronic device 201 contained in the first information or transmission/reception setting information about the first external electronic device 202 contained in the second information, and receiving or transmitting a proximity check acknowledgement message responsive to the proximity check message from/to the first external electronic device 202 through the activated second communication interface 214.

According to an embodiment of the present disclosure, the second information may be information encrypted based on the security information contained in the first information. Performing the proximity discovery may further include decrypting the encrypted second information based on security information contained in the first information.

According to an embodiment of the present disclosure, the proximity check message or proximity check acknowledgement message received from the first external electronic device 202 may be information encrypted based on the security information contained in the first information. Performing the proximity discovery may further include decrypting the encrypted proximity check message or proximity check acknowledgement message based on the security information contained in the first information.

According to an embodiment of the present disclosure, there is provided a computer readable recording medium recording a program running on a computer, the program including executable commands executed by a processor 250 to enable the processor 250 to transmit first information related to proximity discovery of an electronic device 201 to a first external electronic device 202 or a second external electronic device 206 (e.g., a server, such as a PPS) through the first communication interface 212 and perform proximity discovery with the first external electronic device 202 through the second communication interface 214 based on the first information or second information related to proximity discovery of the first external electronic device 202 corresponding to the first information.

According to an embodiment of the present disclosure, the program may include executable commands executed by the processor 250 to enable the processor 250 to transmit or receive a proximity check message to determine whether the electronic device 201 is located proximate to/from the first external electronic device 202 through the activated second communication interface 214, based on the transmission/reception setting information about the electronic device 201 contained in the first information or the transmission/reception setting information of the first external electronic device 202 contained in the second information, and receive or transmit a proximity check acknowledgement message responsive to the proximity check message from/to the first external electronic device 202 through the activated second communication interface 214.

According to an embodiment of the present disclosure, the program may include executable commands executed by the processor 250 to enable the processor 250 to set the electronic device 201 as a transmitting device to transmit the proximity check message based on the transmission/reception setting information of the electronic device 201 contained in the first information or the transmission/reception setting information of the first external electronic device 202 contained in the second information, transmit the proximity check message through the activated second communication interface 214 to the first external electronic device 202, and in response to the transmission of the proximity check message, receive the proximity check acknowledgement message from the first external electronic device 202 through the activated second communication interface 214.

According to an embodiment of the present disclosure, the program may include executable commands executed by the processor 250 to enable the processor 250 to set the electronic device 201 as a receiving device to receive the proximity check message based on the transmission/reception setting information about the electronic device 201 contained in the first information or the transmission/reception setting information of the first external electronic device 202 contained in the second information, receive the proximity check message through the activated second communication interface 214 from the first external electronic device 202, and in response to the reception of the proximity check message, transmit the proximity check acknowledgement message to the first external electronic device 202 through the activated second communication interface 214.

Figure 8:
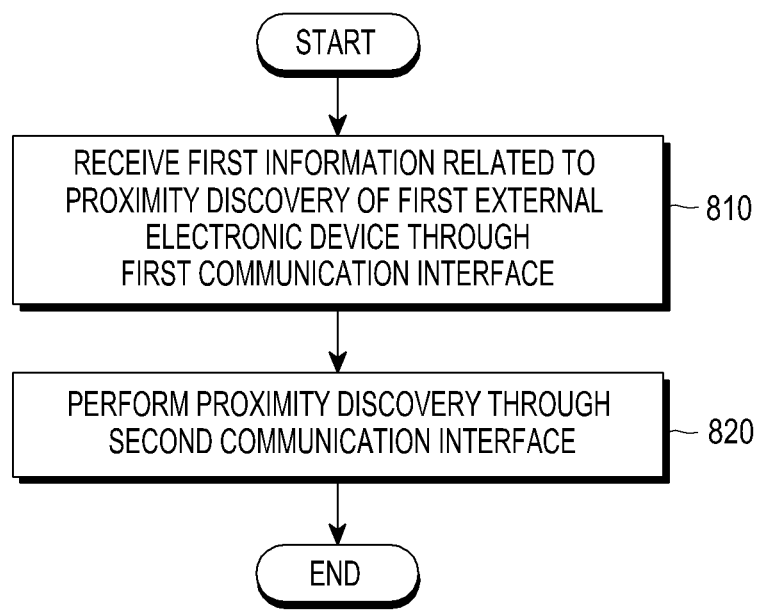
FIG. 8 is a flowchart of a proximity discovery method of an electronic device according to an embodiment.

FIG. 8 is a flowchart of a proximity discovery method of an electronic device 201 according to an embodiment. The proximity discovery method of the electronic device may include operations 810 and 820. The proximity discovery method of the electronic device 201 may be performed by at least one of an electronic device 201 or a processor 250 of the electronic device. The electronic device 201 may be a device to receive a proximity paging request for proximity discovery, as a target device discovered by the proximity discovery, the first external electronic device 202 may be a device to transmit the proximity paging request for proximity discovery, and the second external electronic device 206 may be a server (e.g., a PPS) to which the electronic device 201 and the first external electronic device subscribe and which provides a proximity discovery service.

Referring to FIG. 8, in operation 810, the electronic device 201 may receive first information related to the proximity discovery of the first external electronic device 201 through a first communication interface 212 from the first external electronic device 202 or the second external electronic device 206 (e.g., a server, such as a PPS). According to an embodiment, the electronic device 201 may store the received first information in the memory 230 of the electronic device.

According to an embodiment of the present disclosure, the first communication interface may be connected to a network 262. The network may be a WAN (e.g., the Internet).

According to an embodiment of the present disclosure, the first information may include the identification information about the first external electronic device, contact information, location information, information about the second communication interface to be used for the proximity discovery, transmission/reception setting information, security information, or a combination thereof.

In operation 820, for example, the electronic device may perform proximity discovery with the first external electronic device through a second communication interface 214 based on the first information or second information related to proximity discovery of the electronic device 201 corresponding to the first information.

According to an embodiment of the present disclosure, the second communication interface may directly communicate with the first external electronic device based on short-range communication.

According to an embodiment of the present disclosure, the second information may include identification information or contact information about the first external electronic device, identification information or contact information about the electronic device, information about the second communication interface to be used for proximity discovery of the electronic device 201 activated based on information about the second communication interface to be used for the proximity discovery of the first external electronic device, transmission/reception setting information, or a combination thereof.

According to an embodiment of the present disclosure, the transmission/reception setting information about the electronic device 201 may be set based on the transmission/reception setting information about the first external electronic device 201 contained in the first information. According to an embodiment of the present disclosure, where the first information does not contain the transmission/reception setting information, the transmission/reception setting information about the electronic device 201 may be set based on whether the second communication interface to be used for the proximity discovery in the electronic device 201 is available, the state of communication (e.g., short-range wireless communication) corresponding to the second communication interface available upon performing the proximity discovery, or the degree of degradation of service quality that may arise when the proximity discovery is performed. According to an embodiment of the present disclosure, where the first information does not contain the transmission/reception setting information, the transmission/reception setting information about the electronic device 201 may include transmission/reception setting information to allow the electronic device 201 to be set as a transmitting device to send the proximity check message to the first external electronic device.

According to an embodiment of the present disclosure, the electronic device 201 may perform proximity discovery with the first external electronic device based on the first information. For example, the electronic device 201 may activate the second communication interface of the electronic device 201 based on the information about the second communication interface to be used for the proximity discovery of the first external electronic device contained in the first information. The electronic device 201 may transmit or receive a proximity check message to determine whether the electronic device 201 and the first external electronic device are located proximate based on transmission/reception setting information about the first external electronic device contained in the first information through the activated second communication interface to/from the first external electronic device, performing the proximity discovery. The electronic device 201 may receive or transmit, from/to the first external electronic device, through the activated second communication interface, a proximity check acknowledgement message corresponding to the proximity check message, performing the proximity discovery.

According to an embodiment of the present disclosure, the electronic device 201 may perform proximity discovery with the first external electronic device based on the second information. For example, the electronic device 201 may activate the second communication interface of the electronic device 201 based on the information about the second communication interface to be used for the proximity discovery of the electronic device 201 contained in the second information. The electronic device 201 may transmit or receive a proximity check message to determine whether the electronic device 201 and the first external electronic device are located proximate based on transmission/reception setting information about the electronic device 201 contained in the second information through the activated second communication interface to/from the first external electronic device, performing the proximity discovery. The electronic device 201 may receive or transmit, from/to the first external electronic device, through the activated second communication interface, a proximity check acknowledgement message corresponding to the proximity check message, performing the proximity discovery.

According to an embodiment of the present disclosure, the electronic device 201 may perform proximity discovery with the first external electronic device based on the first information and the second information. For example, the electronic device 201 may activate the second communication interface of the electronic device 201 based on the information about the second communication interface to be used for the proximity discovery of the first external electronic device contained in the first information and the information about the second communication interface to be used for the proximity discovery of the electronic device 201 contained in the second information. The electronic device 201 may transmit or receive a proximity check message to determine whether the electronic device 201 and the first external electronic device are located proximate based on the transmission/reception setting information about the first external electronic device contained in the first information and transmission/reception setting information about the electronic device 201 contained in the second information through the activated second communication interface to/from the first external electronic device, performing the proximity discovery. The electronic device 201 may receive or transmit, from/to the first external electronic device, through the activated second communication interface, a proximity check acknowledgement message corresponding to the proximity check message, performing the proximity discovery.

According to an embodiment of the present disclosure, the electronic device 201 may set the electronic device 201 as a transmitting device to transmit the proximity check message based on transmission/reception setting information about the electronic device 201 contained in the second information or transmission/reception setting information about the first external electronic device contained in the first information. The electronic device 201 may transmit the proximity check message through the activated second communication interface to the first external electronic device, and the electronic device 201 may, in response to the transmission of the proximity check message, receive the proximity check acknowledgement message corresponding to the proximity check message from the first external electronic device through the activated second communication interface.

According to an embodiment of the present disclosure, the electronic device 201 may set the electronic device 201 as a receiving device to receive the proximity check message based on transmission/reception setting information about the electronic device 201 contained in the second information or transmission/reception setting information about the first external electronic device contained in the first information. The electronic device 201 may receive the proximity check message through the activated second communication interface from the first external electronic device, and the electronic device 201 may, in response to the reception of the proximity check message, transmit the proximity check acknowledgement message corresponding to the proximity check message to the first external electronic device through the activated second communication interface.

According to an embodiment of the present disclosure, the proximity check message may include identification information about the device to receive the proximity check message. For example, where the device to transmit the proximity check message is set as the electronic device 201, and the device to receive the proximity check message is set as the first external electronic device, the electronic device 201 may include the identification information about the first external electronic device in the proximity check message and send the proximity check message to the first external electronic device. When the identification information contained in the proximity check message matches the identification information that the first external electronic device owns, the first external electronic device may transmit a proximity check acknowledgement message responsive to the proximity check message to the electronic device 201. Upon receipt of the proximity check acknowledgement message, the electronic device 201 may determine that the first external electronic device is a device located proximate to the electronic device 201 and may generate a proximate device list indicating devices discovered by the proximity discovery including the first external electronic device or add the first external electronic device to the generated proximate device list. For example, where the device to transmit the proximity check message is set as the first external electronic device, and the device to receive the proximity check message is set as the electronic device 201, the first external electronic device may include the identification information about the electronic device 201 in the proximity check message and send the proximity check message to the electronic device 201. When the identification information contained in the proximity check message matches the identification information that the electronic device 201 owns, the electronic device 201 may transmit a proximity check acknowledgement message responsive to the proximity check message to the first external electronic device. Upon receipt, from the first external electronic device, of the proximity check acknowledgement message containing the identification information matching the identification information that the electronic device 201 owns, the electronic device 201 may determine that the first external electronic device is a device located proximate to the electronic device 201 and may generate a proximate device list indicating devices discovered by the proximity discovery including the first external electronic device or add the first external electronic device to the generated proximate device list.

According to an embodiment of the present disclosure, the proximate device list may be stored in the memory of the electronic device 201. The proximate device list may be updated based on a result of the proximity discovery.

The electronic device 201 may encrypt the proximity check message or proximity check acknowledgement message received from the first external electronic device 202 based on the security information (e.g., the second encryption key of the second security information) contained in the first information. The electronic device 201 may transmit the encrypted proximity check message or proximity check acknowledgement message through the second communication interface to the first external electronic device.

According to an embodiment of the present disclosure, the electronic device 201 may also transmit the second information through the first communication interface to the first external electronic device. This is described below in greater detail with reference to FIG. 9.

Figure 9:
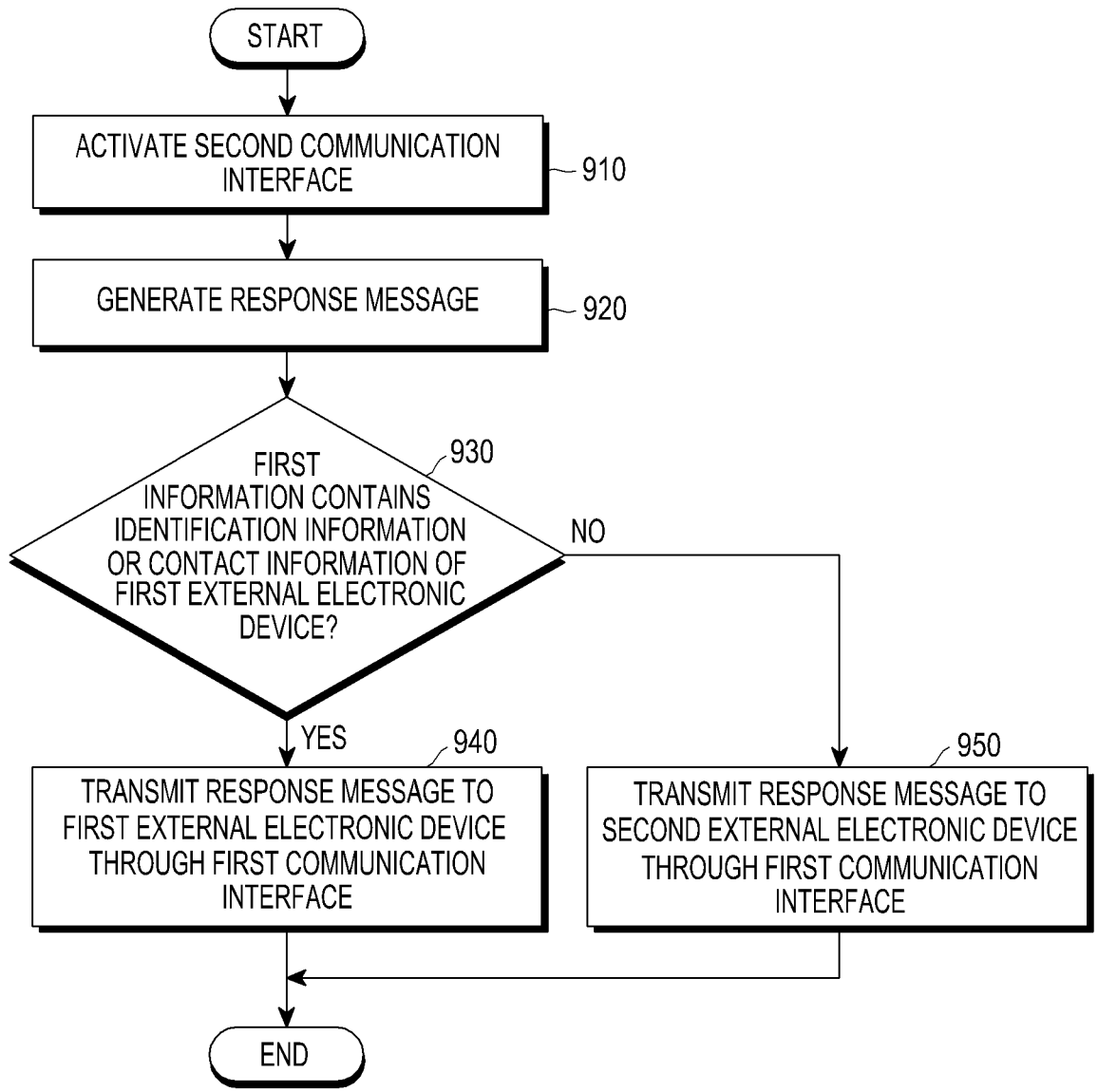
FIG. 9 is a flowchart of a proximity discovery method of an electronic device according to an embodiment.

FIG. 9 is a flowchart of a proximity discovery method of an electronic device 201 according to an embodiment. FIG. 9 illustrates a method for transmitting the second information related to the proximity discovery of the electronic device 201 corresponding to the first information related to the proximity discovery of the first external electronic device. The method of FIG. 9 may include operations 910, 920, 930, 940, and 950. The proximity discovery method of the electronic device 201 may be performed by at least one of an electronic device 201 or a processor 250 of the electronic device. The electronic device 201 may be a device to receive a proximity paging request for proximity discovery, as a target device discovered by the proximity discovery, the first external electronic device 202 may be a device to transmit the proximity paging request for proximity discovery, and the second external electronic device 206 may be a server (e.g., a PPS) to which the electronic device 201 and the first external electronic device 202 subscribe and which provides a proximity discovery service.

Referring to FIG. 9, in operation 910, for example, upon receipt of first information related to the proximity discovery of the first external electronic device 202 through the first communication interface 212, the electronic device 201 may activate the second communication interface 214 to be used for the proximity discovery based on the first information.

For example, the electronic device 201 may discover the second communication interface or at least one communication channel of the second communication interface to be used for the proximity discovery based on the information about the second communication interface to be used for the proximity discovery of the first external electronic device contained in the first information and activate the least congested second communication interface or the communication channel of the corresponding second communication interface.

According to an embodiment of the present disclosure, where the second communication interface of the electronic device 201 corresponding to the second communication interface to be used for the proximity discovery and contained in the first information is not available or supported, the electronic device 201 may activate the second communication interface of the electronic device 201 based on the information about at least one second communication interface candidate to be used for the proximity discovery and contained in the first information. For example, the electronic device 201 may re-discover the second communication interface candidate or corresponding communication channel according to priority of candidate contained in the information about the second communication interface candidates contained in the first information. The electronic device 201 may activate the second communication interface of the electronic device 201 based on the discovered second communication interface or communication channel.

In operation 920, for example, the electronic device 201 may generate a response message including information about the activated second communication interface.

For example, the electronic device 201 may generate the response message by including the information about the activated second communication interface in the second information related to the proximity discovery of the electronic device 201.

According to an embodiment of the present disclosure, the information about the activated communication interface may include type information, channel information, or channel hopping sequence information about the second communication interface or a combination thereof. For example, where communication channel A of the WiFi communication interface is activated as the second communication interface to be used for the proximity discovery, the electronic device 201 may include the WiFi communication interface or communication channel A in the type information or channel information, respectively, in the information about the activated second communication interface. The electronic device 201 may include the information about the activated second communication interface in the response message.

In operation 930, for example, the electronic device 201 may determine whether the first information contains identification information or contact information about the first external electronic device. When the first information contains the identification information or contact information about the first external electronic device 201 in operation 930, the electronic device 201 may perform operation 940, and when the first information does not contain the identification information or contact information about the first external electronic device in operation 930, the electronic device 201 may perform operation 950.

In operation 940, for example, when the first information contains the identification information or contact information about the first external electronic device, the electronic device 201 may transmit the generated response message through the first communication interface to the first external electronic device.

According to an embodiment of the present disclosure, the electronic device 201 may transmit the response message through the first communication interface to the first external electronic device based on the network address information (e.g., an IP address, an MAC address, or a URL address) contained in the identification information about the first external electronic device or identification code temporarily assigned.

According to an embodiment of the present disclosure, the electronic device 201 may transmit the response message through the first communication interface to the first external electronic device, in the form of a text message (e.g., an SMS, LMA, or MMS message), an IM, an email, or an IMS message or a pre-defined application layer message, based on the contact information (e.g., a phone number or an email address) about the first external electronic device.

In operation 950, for example, when the first information does not contain the identification information or contact information about the first external electronic device, the electronic device 201 may transmit the generated response message through the first communication interface to the second external electronic device 206 (e.g., a server, such as a PPS).

According to an embodiment of the present disclosure, the electronic device may encrypt the second information based on the security information (e.g., the first encryption key of the first security information) contained in the first information. The electronic device 201 may transmit the response message including the encrypted second information through the first communication interface to the first external electronic device or the second external electronic device.

According to an embodiment of the present disclosure, the electronic device 201 may include rejection information to reject the proximity paging request for proximity discovery in the response message. For example, the rejection information may include reasons for rejection. According to an embodiment of the present disclosure, the reasons for rejection may include the second communication interface of the electronic device 201 corresponding to the second communication interface to be used for the proximity discovery of the first external electronic device is being used; the electronic device 201 does not support the second communication interface to be used for the proximity discovery of the first external electronic device; the proximity discovery of the electronic device 201 is explicitly rejected (e.g., the rejection of proximity discovery is entered through the UI); the distance between the electronic device 201 and the first external electronic device falls outside a preset proximate distance; or a combination thereof. According to an embodiment of the present disclosure, the preset proximate distance may be set based on an arrival distance corresponding to the second communication interface to be used for the proximity discovery of the electronic device 201. For example, where the second communication interface 214, as the second communication interface 214 to be used for the proximity discovery, is a WiFi communication interface, the preset proximate distance may be set based on an arrival distance (e.g., 150 m to 200 m) corresponding to WiFi communication. Where the second communication interface 214, as the second communication interface 214 to be used for the proximity discovery, is a bluetooth communication interface, the preset proximate distance may be set based on an arrival distance (e.g., about 100 m) corresponding to bluetooth communication.

Figure 10:
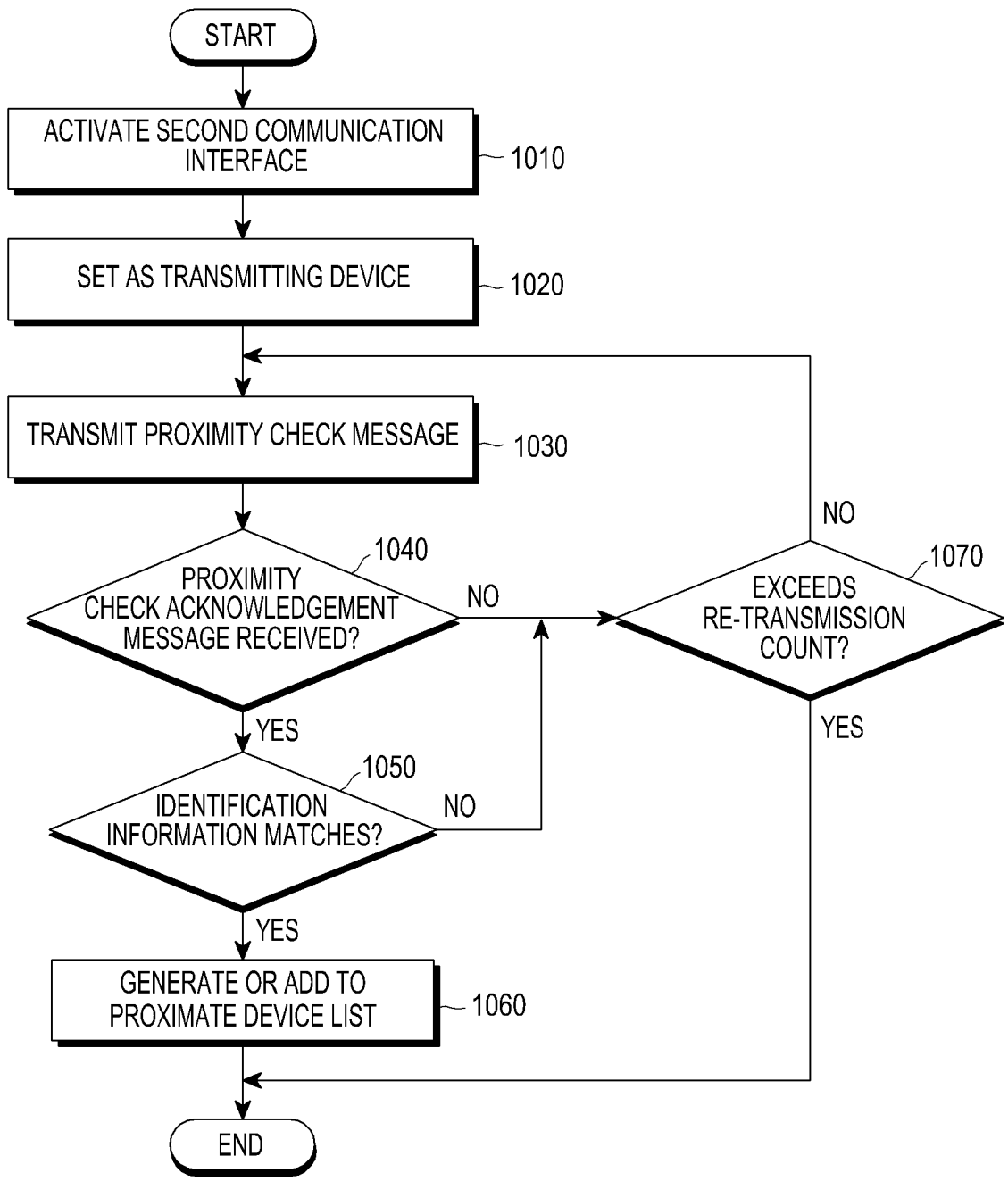
FIG. 10 is a flowchart of a proximity discovery method of an electronic device according to an embodiment.

FIG. 10 is a flowchart of a proximity discovery method of an external electronic device according to an embodiment. FIG. 10 illustrates in greater detail the method of performing proximity discovery (operation 820) of the proximity discovery method of the electronic device 201 shown in FIG. 8, and the method of FIG. 10 may include operations 1010, 1020, 1030, 1040, 1050, 1060, and 1070. The proximity discovery method of the electronic device 201 may be performed by at least one of an electronic device 201 or a processor 250 of the electronic device. The electronic device 201 may be a device to receive a request for proximity discovery, as a target device discovered by the proximity discovery, the first external electronic device 202 is a device to transmit the request for proximity discovery, and the second external electronic device 206 (e.g., a server such as a PPS) is a server to which the electronic device 201 and the first external electronic device 202 subscribe and which provides a proximity discovery service.

Referring to FIG. 10, in operation 1010, for example, the electronic device may activate the second communication interface 214 to be used for the proximity discovery, based on first information related to the proximity discovery of the first external electronic device 202 or security information related to the proximity discovery of the electronic device 201 corresponding to the first information.

For example, the electronic device 201 may activate the second communication interface type of the electronic device, or the communication channel of the corresponding second communication interface, of the electronic device 201 to be used for the proximity discovery, based on the information about the second communication interface to be used for the proximity discovery of the first external electronic device contained in the first information. Operation 1010 is the same as operation 910 of FIG. 9, and thus, the description of operation 910 may apply to operation 1010.

In operation 1020, for example, the electronic device may set the electronic device 201 as a transmitting device based on transmission/reception setting information about the electronic device 201 contained in the second information or transmission/reception setting information about the first external electronic device contained in the first information.

For example, the electronic device 201 may set the electronic device 201 as the transmitting device to transmit the proximity check message to determine whether the electronic device 201 and the first external electronic device are located proximate, based on the transmission/reception setting information about the first external electronic device contained in the first information or the transmission/reception setting information about the electronic device 201 contained in the second information. In this case, the first external electronic device may be set as a receiving device to receive the proximity check message.

According to an embodiment of the present disclosure, where the activated second communication interface is a WiFi communication interface, the proximity check message may be a probe request message, and the proximity check acknowledgement message may be a probe response message.

Where the activated second communication interface is a bluetooth communication interface, the proximity check message may be a scan request message, and the proximity check acknowledgement message may be an advertising data message.

In operation 1030, for example, the electronic device 201 may transmit the proximity check message through the activated second communication interface to the first external electronic device.

In operation 1040, for example, the electronic device 201 may determine whether a proximity check acknowledgement message corresponding to the proximity check message is received through the activated second communication interface in response to the transmission of the proximity check message. When the proximity check acknowledgement message is received in operation 1040, the electronic device 201 may perform operation 1050, and when the proximity check acknowledgement message is not received in operation 1040, the electronic device 201 may perform operation 1070.

In operation 1050, for example, when the proximity check acknowledgement message is received, the electronic device 201 may determine whether the identification information about the device to receive the proximity paging request contained in the proximity check acknowledgement message matches identification information about the electronic device 201 contained in the first information or second information.

When the identification information about the device to receive the proximity paging request contained in the proximity check acknowledgement message matches the identification information about the electronic device 201 in operation 1050, the electronic device 201 may perform operation 1060, and when the identification information about the device to receive the proximity paging request contained in the proximity check acknowledgement message does not match the identification information about the electronic device in operation 1050, the electronic device 201 may perform operation 1070.

In operation 1060, for example, when the identification information about the device to receive the proximity paging request contained in the proximity check acknowledgement message matches the identification information about the electronic device 201, the electronic device 201 may generate a proximate device list including the first external electronic device or add the first external electronic device to the proximate device list.

For example, when the identification information about the device to receive the proximity paging request contained in the proximity check acknowledgement message matches the identification information about the electronic device 201, the electronic device 201 may determine that the first external electronic device having sent the proximity check message is a device located proximate to the electronic device 201, which is discovered as a result of performing the proximity discovery. The electronic device 201 may generate a proximate device list including the first external electronic device discovered as a result of the proximity discovery, or where the proximate device list has already been generated, the electronic device 201 may add the discovered first external electronic device to the proximate device list. In operation 1070, for example, when the proximity check acknowledgement message is not received or where the identification information about the device to receive the proximity paging request contained in the proximity check acknowledgement message does not match the identification information about the electronic device 201, the electronic device 201 may determine whether the transmission of the proximity check message exceeds a preset re-transmission count. When the transmission of the proximity check message exceeds the preset re-transmission count in operation 1070, the electronic device 201 may terminate the proximity discovery, and when the transmission of the proximity check message does not exceed the preset re-transmission count, the electronic device 201 may perform operation 1030.

Figure 11:
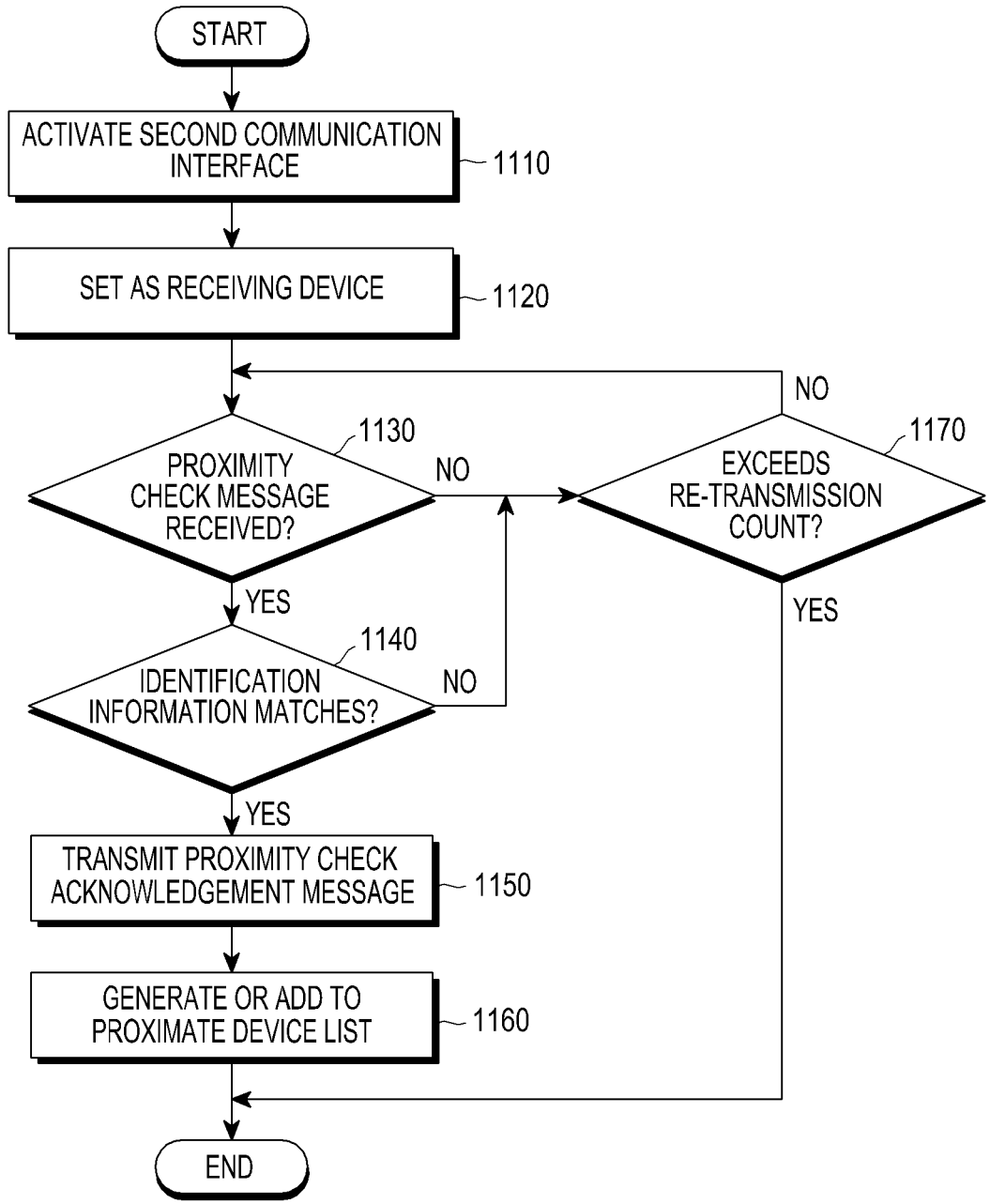
FIG. 11 is a flowchart of a proximity discovery method of an electronic device according to an embodiment.

FIG. 11 is a flowchart of a proximity discovery method of an electronic device 201 according to an embodiment. FIG. 11 illustrates in greater detail the method of performing proximity discovery (operation 820) of the proximity discovery method of the electronic device 201 shown in FIG. 8, and the method of FIG. 11 may include operations 1110, 1120, 1130, 1140, 1150, 1160, and 1170. The proximity discovery method of the electronic device 201 may be performed by at least one of an electronic device 201 or a processor 250 of the electronic device. The electronic device 201 may be a device to receive a proximity paging request for proximity discovery, as a target device discovered by the proximity discovery, the first external electronic device 202 may be a device to transmit the proximity paging request for proximity discovery, and the second external electronic device 206 may be a server (e.g., a PPS) to which the electronic device 201 and the first external electronic device 202 subscribe and which provides a proximity discovery service.

Referring to FIG. 11, in operation 1110, for example, the electronic device 201 may activate the second communication interface 214 to be used for the proximity discovery, based on first information related to the proximity discovery of the first external electronic device 202 or security information related to the proximity discovery of the electronic device 201 corresponding to the first information.

For example, the electronic device 201 may activate the second communication interface type of the electronic device 201, or the communication channel of the corresponding second communication interface, of the electronic device 201 to be used for the proximity discovery, based on the information about the second communication interface to be used for the proximity discovery of the first external electronic device contained in the first information. Operation 1110 is the same as operation 910 of FIG. 9, and thus, the description of operation 910 may apply to operation 1110.

In operation 1120, for example, the electronic device 201 may set the electronic device 201 as a receiving device upon performing proximity discovery based on the transmission/reception setting information contained in the first information or the transmission/reception setting information contained in the second information.

For example, the electronic device 201 may set the electronic device 201 as the receiving device to receive the proximity check message to determine whether the electronic device 201 and the first external electronic device are located proximate, based on the transmission/reception setting information about the first external electronic device contained in the first information or the transmission/reception setting information about the electronic device contained in the second information. In this case, the first external electronic device may be set as a transmitting device to transmit the proximity check message.

According to an embodiment of the present disclosure, where the activated second communication interface is a WiFi communication interface, the proximity check message may be a probe request message, and the proximity check acknowledgement message may be a probe response message.

According to an embodiment of the present disclosure, where the activated second communication interface is a bluetooth communication interface, the proximity check message may be a scan request message, and the proximity check acknowledgement message may be an advertising data message.

In operation 1130, for example, the electronic device 201 may determine whether the proximity check message is received from the first external electronic device through the activated second communication interface during a designated time. In operation 1130, when the proximity check message is received, the electronic device 201 may perform operation 1140, and when not, operation 1170.

In operation 1140, for example, when the proximity check message is received during the designated time, the electronic device 201 may determine whether the identification information about the device to receive the proximity paging request contained in the proximity check message matches identification information about the electronic device 201 contained in the first information or second information. When the identification information about the device to receive the proximity paging request contained in the proximity check message matches the identification information about the electronic device 201 in operation 1140, the electronic device 201 may perform operation 1150, and when the identification information about the device to receive the proximity paging request contained in the proximity check message does not match the identification information about the electronic device 201 in operation 1140, the electronic device may perform operation 1170.

In operation 1150, for example, when the identification information about the device to receive the proximity paging request contained in the proximity check message matches the identification information about the electronic device 201, the electronic device 201 may transmit a proximity check acknowledgement message responsive to the proximity check message through the activated second communication interface to the first external electronic device.

According to an embodiment of the present disclosure, the first external electronic device may include the identification information about the device to receive the proximity paging request in the proximity check acknowledgement message and transmit the proximity check acknowledgement message through the activated second communication interface to the electronic device 201. For example, the first external electronic device may include the identification information about the electronic device 201 in the proximity check acknowledgement message and transmit the proximity check acknowledgement message to the electronic device 201.

In operation 1160, for example, the electronic device may generate a proximate device list including the first external electronic device or add the first external electronic device to the proximate device list.

For example, when the identification information about the device to receive the proximity paging request contained in the proximity check message matches the identification information about the electronic device 201, the electronic device 201 may determine that the first external electronic device having sent the proximity check message is a device located proximate to the electronic device 201, which is discovered as a result of performing the proximity discovery. The electronic device 201 may generate a proximate device list including the first external electronic device discovered as a result of the proximity discovery, or where the proximate device list has already been generated, the electronic device 201 may add the first external electronic device to the proximate device list.

Although in the description in connection with FIG. 11 operation 1150 is performed before operation 1160, embodiments of the present disclosure are not limited thereto. For example, operation 1160 may be performed before operation 1150.

In operation 1170, for example, when the proximity check message is not received or where the identification information about the device to receive the proximity paging request contained in the proximity check message does not match the identification information about the electronic device 201, the electronic device 201 may determine whether the designated time expires. When the designated time expires in operation 1170, the electronic device 201 may terminate the proximity discovery, but when the designated time does not expire, the electronic device 201 may again perform operation 1130 to transmit the proximity check message until the designated time expires.

According to an embodiment of the present disclosure, the proximity discovery method of the electronic device 201 may comprise receiving first information related to proximity discovery of the first external electronic device 202 from a first external electronic device 202 or a second external electronic device 206 (e.g., a server, such as a PPS) through the first communication interface 212 and performing proximity discovery with the first external electronic device through the second communication interface 214 based on the first information or second information related to proximity discovery of the electronic device 201 corresponding to the first information.

According to an embodiment of the present disclosure, the proximity discovery method of the electronic device 201 may further comprise transmitting the second information from the first external electronic device 202 or the second external electronic device 206 (e.g., a server, such as a PPS) through the first communication interface 212.

According to an embodiment of the present disclosure, the first information may include the identification information, contact information, location information, information about the second communication interface 214 to be used for the proximity discovery, transmission/reception setting information, security information, or a combination thereof of the first external electronic device 202.

According to an embodiment of the present disclosure, the second information may include identification information or contact information of the electronic device 201, identification information or contact information of the first external electronic device 202, information of the second communication interface 214 of the electronic device 201 to be used for proximity discovery of the electronic device 201 activated based on the information about a second communication interface to be used for the proximity discovery of the first external electronic device 202, transmission/reception setting information, or a combination thereof.

According to an embodiment of the present disclosure, performing the proximity discovery may include, upon receipt of the first information contained in the request message to request the proximity discovery through the first communication interface 212, activating the second communication interface 214 based on the information about the second communication interface 214 contained in the first information, generating a response message responsive to the request message and including the information about the activated second communication interface 214, and transmitting the generated response message through the first communication interface 212 to the first external electronic device 202 or the second external electronic device 206 (e.g., a server, such as a PPS).

According to an embodiment of the present disclosure, performing the proximity discovery may include determining whether the first information contains identification information or contact information of the first external electronic device 202, and when the first information contains the identification information or contact information of the first external electronic device 202, transmitting the response message through the first communication interface 212 to the first external electronic device 202 based on the network address information contained in the identification information of the first external electronic device 202.

According to an embodiment of the present disclosure, performing the proximity discovery may include determining whether the first information contains identification information or contact information of the first external electronic device 202, and when the first information not contain the identification information or contact information of the first external electronic device 202, transmitting the response message through the first communication interface 212 to the second external electronic device 206 (e.g., a server, such as a PPS).

According to an embodiment of the present disclosure, performing the proximity discovery may include encrypting the second information based on the security information contained in the first information and transmitting the encrypted second information through the first communication interface to the first external electronic device 202 or the second external electronic device 206 (e.g., a server, such as a PPS).

According to an embodiment of the present disclosure, performing the proximity discovery may include transmitting or receiving a proximity check message to determine whether the electronic device 202 is located proximate to/from the first external electronic device 201 through the activated second communication interface 214, based on transmission/reception setting information of the first external electronic device 201 contained in the first information or transmission/reception setting information of the electronic device 202 contained in the second information, and receiving or transmitting a proximity check acknowledgement message responsive to the proximity check message from/to the first external electronic device 202 through the activated second communication interface 214.

According to an embodiment of the present disclosure, performing the proximity discovery may further include encrypting the proximity check message or proximity check acknowledgement message based on the security information contained in the first information and transmitting the encrypted proximity check message or proximity check acknowledgement message through the activated second communication interface 214 to the first external electronic device 202.

According to an embodiment of the present disclosure, there is provided a computer readable recording medium recording a program running on a computer, the program including executable commands executed by a processor 250 of an electronic device 201 to enable the processor 250 to receive first information related to proximity discovery of a first external electronic device 202 from the first external electronic device 202 or a second external electronic device 206 (e.g., a server, such as a PPS) through the first communication interface (e.g., the first communication interface 212) and perform proximity discovery with the first external electronic device 202 through the second communication interface 214 of the electronic device 201 based on the first information or second information related to proximity discovery of the electronic device 201 corresponding to the first information.

Figure 12:
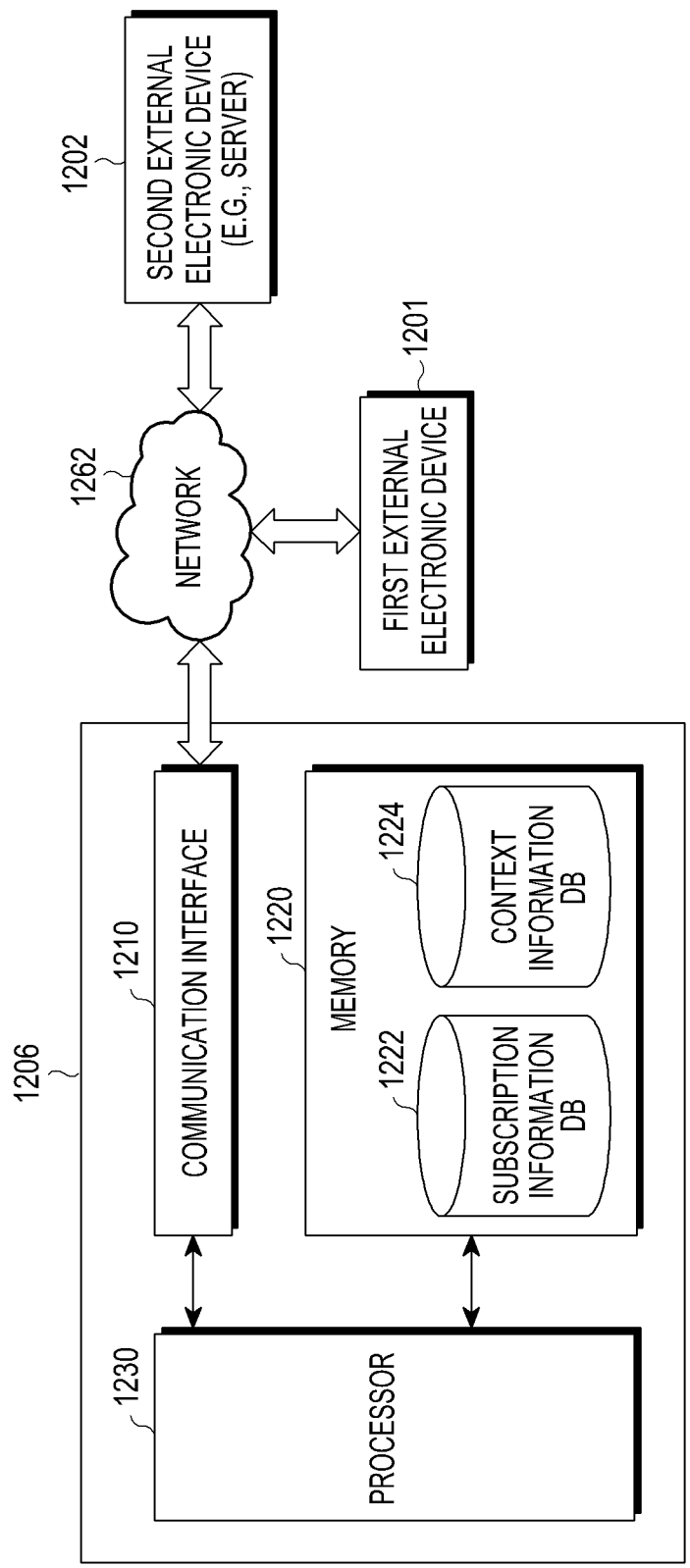
FIG. 12 is a block diagram of an electronic device according to an embodiment.

FIG. 12 is a block diagram of an electronic device 1206 according to an embodiment+.

Referring to FIG. 12, the electronic device 1206 may include at least one of a communication interface 1210, a memory 1220, or a processor 1230. The electronic device 1206 may include all or some of the components of the server 106 of FIG. 1 or the second external electronic device 206 (e.g., a server, such as a PPS) of FIG. 2. The electronic device 1206 may be a server to which a first external electronic device 1201 and a second external electronic device 1202 subscribe and which provides a proximity discovery service, the first external electronic device 1201 may be a device sending a proximity paging request for proximity discovery, and the second external electronic device 1202 may be a device to receive the proximity paging request for proximity discovery, as a target device discoverable by performing the proximity discovery. The first external electronic device 1201 may include all or some of the components of the electronic device 201, as a device to send a proximity paging request for the proximity discovery of FIG. 2. The second external electronic device 1202 may include all or some of the components of the electronic device 201, as a device to receive the proximity paging request for proximity discovery of FIG. 2.

According to an embodiment of the present disclosure, the communication interface 1210 may establish a communication connection with the first external electronic device 1201 or the second external electronic device 1202 through the network 1262, and the electronic device 1206 may transmit or receive predetermined information (e.g., proximity discovery-related information) to/from the first external electronic device 1201 or the second external electronic device 1202. The communication interface 1210 may be referred to as a communication unit or a communication module, may include a communication unit or a communication module as part thereof, or may configure a communication unit or a communication module.

According to an embodiment of the present disclosure, the communication interface 1210 may include at least one of communication interfaces capable of offering packet data (or IP) or circuit-based services. For example, the communication interfaces capable of offering packet data (or IP) or circuit-based services may include at least one of mobile communication networks (e.g., LTE, LTE-A, CDMA, WCDMA, UMTS, WiBro or GSM), computer networks (e.g., a LAN or a WAN), the Internet, or telephony networks.

According to an embodiment of the present disclosure, the communication interface 1210 may establish a communication connection with a pre-established communication network 1262. Upon receipt of a request message to request proximity paging for proximity discovery of the first external electronic device 1201, the processor 1230 may transmit or receive information related to the proximity discovery between the first external electronic device 1201 and the second external electronic device 1202 (e.g., first information related to the proximity discovery of the first external electronic device 1201 or security information related to the proximity discovery of the second external electronic device 1202) through the communication interface 1210. According to an embodiment of the present disclosure, the pre-established communication network 1262 may include a WAN (e.g., a public network such as the Internet).

According to an embodiment of the present disclosure, the memory 1220 may store at least one service (e.g., proximity discovery) that the electronic device 1206 may support. The memory 1220 may store subscription information (or registration information) about the first external electronic device 1201 or the second external electronic device 1202 to receive at least one service (e.g., proximity discovery) by the electronic device 1206. The subscription information may include identification information about each corresponding device, contact information, or parameter information indicating whether to provide a service for proximity discovery. According to an embodiment of the present disclosure, the parameter information may be included in the contact information. The memory 1220 may create a database for the subscription information and may store the subscription information in the subscription information database (DB) 1222. The memory 1220 may further store context information related to the first external electronic device 1201 or the second external electronic device 1202. The memory 1220 may create a database for the context information related to the first external electronic device 1201 or the second external electronic device 1202 and may store the context information in the context information DB 1224. According to an embodiment of the present disclosure, the context information may include location information about each corresponding device (e.g., current location or location of interest) or preset conditions for each corresponding device. According to an embodiment of the present disclosure, the location information may include latitudinal/longitudinal coordinates, geographical location information, or administrative district information about each corresponding device or a combination thereof. According to an embodiment of the present disclosure, the preset conditions for each corresponding device may include an entry or exit to/from the area of interest. The processor 1230 may periodically or aperiodically update the context information DB 1224.

The processor 1230 may control the electronic device 1206.

According to an embodiment of the present disclosure, the processor 1230 may receive first information related to the proximity discovery of the first external electronic device 1201 from the first external electronic device 1201 through the communication interface 1210.

For example, the processor 1230 may receive the first information-containing request message to request proximity paging for proximity discovery from the first external electronic device 1201 through the communication interface 1210.

According to an embodiment of the present disclosure, the first information may include the identification information about the first external electronic device 1201, contact information, location information, information about the second communication interface to be used for the proximity discovery, transmission/reception setting information, security information, or a combination thereof. For devices to request proximity paging for proximity discovery as shown in FIG. 2, the first information may be the same as the first information described above, and a detailed description thereof is omitted here.

According to an embodiment of the present disclosure, the processor 1230 may receive the request message containing the first information through the communication interface 1210 from the first external electronic device 1201, in the form of a text message (e.g., an SMS, an LMA, or an MMS message), an IM, an email, an IMS message, or a pre-defined application layer message.

According to an embodiment of the present disclosure, the request message may include an identifier indicating that the request message is a message for requesting proximity paging for proximity discovery. For example, the identifier may be included in the header of the data structure of the request message. The processor 1230 may distinguish the general text message from the message for requesting proximity paging for proximity discovery through the identifier.

According to an embodiment of the present disclosure, the processor 1230 may select the second external electronic device 1202 corresponding to the first information, based on the first information and the subscription information or context information about the second external electronic device 1202.

According to an embodiment of the present disclosure, the processor 1230 may select the second external electronic device 1202 corresponding to the first information based on the identification information or contact information about the second external electronic device 1202 contained in the subscription information. For example, the processor 1230 may select, as the second external electronic device 1202 corresponding to the first information, the second external electronic device 1202 whose information matches the contact information or identification information about the second external electronic device contained in the first information of the identification information or contact information about at least one second external electronic device in the subscription information stored in the memory 1220 (e.g., the subscription information DB 1222).

According to an embodiment of the present disclosure, the processor 1230 may identify the second external electronic device 1202 corresponding to the first information based on the parameter information indicating whether to provide a service for proximity discovery contained in the first information. For example, the processor 1230 may identify, as the second external electronic device 1202 corresponding to the first information, the second external electronic device 1202 in which the parameter information contains information indicating to agree to provide a service for proximity discovery among at least one second external electronic device in the subscription information stored in the memory 1220 (e.g., the subscription information DB 1222).

According to an embodiment of the present disclosure, the processor 1230 may identify the second external electronic device 1202 corresponding to the first information based on the context information stored in the memory 1220 (e.g., the context information DB 1224) and the location information about the first external electronic device 1201 included in the first information. For example, the processor 1230 may determine whether the distance between the first external electronic device 1201 and the corresponding second external electronic device is less than a preset distance based on the location information about the first external electronic device 1201 contained in the first information and location information about any one 1202 among at least one second external electronic device included in the context information. When the distance between the first external electronic device 1201 and the corresponding second external electronic device is less than the preset distance as a result of the determination, the processor 1230 may determine that the corresponding second external electronic device is located proximate to the first external electronic device 1201, identifying the corresponding second external electronic device as the second external electronic device 1202 corresponding to the first information. According to an embodiment of the present disclosure, the processor 1230 may perform the operation of determining whether the distance from the first external electronic device 1201 is less than the preset distance on all or some of the at least one second external electronic device 1202 included in the subscription information.

According to an embodiment of the present disclosure, where there is no subscribing second external electronic device 1202, no second external electronic device 1202 agreeing to providing a service for the proximity discovery, or no second external electronic device 1202 located proximate to the first external electronic device 1201, the electronic device 1206 (e.g., a server, such as a PPS) may abstain from identifying the second external electronic device 1202 to which to send the request message.

According to an embodiment of the present disclosure, the processor 1230 may transmit the first information to the second external electronic device 1202 through the communication interface 1210 based on the identification information or contact information about the selected second external electronic device 1202.

According to an embodiment of the present disclosure, the processor 1230 may transmit the request message containing the received first information through the communication interface 1210 to the selected second external electronic device 1202 based on the network address information (e.g., an IP address, an MAC address, or a URL address) contained in the identification information about the selected second external electronic device 1202 or identification code temporarily assigned.

According to an embodiment of the present disclosure, the processor 1230 may transmit the request message containing the received first information through the communication interface 1210 to the selected second external electronic device 1202, in the form of a text message (e.g., an SMS, an LMA, or an MMS message), an IM, an email, an IMS message, or a pre-defined application layer message, based on the contact information about the selected second external electronic device 1202. According to an embodiment of the present disclosure, the request message may be transmitted to the second external electronic device 202 in a unicasting or multicasting manner.

According to an embodiment of the present disclosure, the processor 1230 may receive second information related to the proximity discovery of the second external electronic device 1202 corresponding to the first information from the second external electronic device 1202 through the communication interface 1210.

According to an embodiment of the present disclosure, the processor 1230 may receive the response message containing the second information through the communication interface 1210 from the second external electronic device 1202, in the form of a text message (e.g., an SMS, an LMA, or an MMS message), an IM, an email, an IMS message, or a pre-defined application layer message.

According to an embodiment of the present disclosure, the response message may include an identifier indicating that the response message is a message responsive to the proximity paging request for the proximity discovery. For example, the identifier may be included in the header of the data structure of the response message. The processor 1230 may distinguish the general text message from the message responsive to the proximity paging request for proximity discovery through the identifier.

According to an embodiment of the present disclosure, the processor 1230 may transmit the received second information through the communication interface 1210 to the first external electronic device 1201. For example, the processor 1230 may transmit the response message containing the second information through the communication interface 1210 to the first external electronic device 1201 based on the contact information or identification information about the first external electronic device contained in the second information. For example, where the second information does not contain the identification information or contact information about the first external electronic device 1201, the processor 1230 may transmit the response message containing the second information to the first external electronic device 1201 through the communication interface 1210 based on the contact information or identification information about at least one first external electronic device contained in the subscription information.

According to an embodiment of the present disclosure, the processor 1230 may transmit the response message containing the second information through the communication interface 1210 to the first external electronic device 1201, in the form of a text message (e.g., an SMS, an LMA, or an MMS message), an IM, an email, an IMS message, or a pre-defined application layer message.

The operation of the processor 1230 is described below in greater detail with reference to FIGS. 13 and 14.

According to an embodiment of the present disclosure, an electronic device 1206 may include a communication interface 1210 and a processor 1230 electrically connected with the communication interface 1210. The processor 1230 may be configured to receive first information related to proximity discovery of a first external electronic device 1201 from the first external electronic device 1201 through the communication interface, identify a second external electronic device 1202 corresponding to the first information based on subscription information or context information of the second external electronic device 1202, or the first information, and transmit the first information to the identified second external electronic device 1202 through the communication interface 1210.

According to an embodiment of the present disclosure, the subscription information may include identification information, contact information, or parameter information indicating whether to provide a service for proximity discovery of each corresponding device. The context information may include location information or preset conditions of each corresponding device.

According to an embodiment of the present disclosure, the processor 1230 may be configured to identify the second external electronic device 1202 corresponding to the first information based on the identification information or contact information of the second external electronic device 1202 contained in the subscription information of the second external electronic device 1202.

According to an embodiment of the present disclosure, the processor 1230 may be configured to identify the second external electronic device 1202 corresponding to the first information based on the parameter information indicating whether to agree to provide a service for proximity discovery of the second external electronic device 1202 contained in the subscription information of the second external electronic device 1202.

According to an embodiment of the present disclosure, the processor 1230 may be configured to identify the second external electronic device 1201 corresponding to the first information based on the location information of the second external electronic device 1202 contained in the identification information or contact information of the first external electronic device 1201 contained in the first information.

According to an embodiment of the present disclosure, the processor 1230 may be configured to determine whether a distance between the first external electronic device 1201 and the second external electronic device 1202 is less than a preset distance based on the location information of the first external electronic device 1201 contained in the first information or the location information of the second external electronic device 1202 contained in the context information, and when the distance between the first external electronic device 1201 and the second external electronic device 1202 is less than the preset distance, identify the second external electronic device 1202 as the second external electronic device 1202 corresponding to the first information.

According to an embodiment of the present disclosure, the processor 1230 may be configured to receive second information related to the proximity discovery of the second external electronic device 1202 corresponding to the first information from the second external electronic device 1202 through the communication interface 1210 and transmit the received second information through the communication interface 1210 to the first external electronic device 1201.

Figure 13:
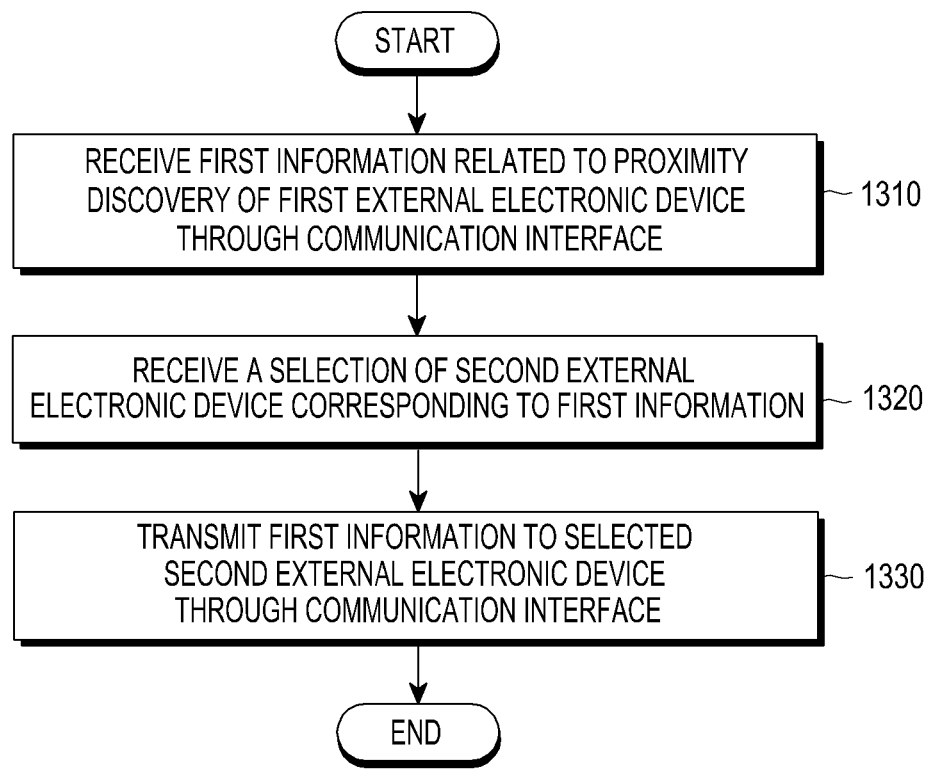
FIG. 13 is a flowchart of a proximity discovery method of an electronic device according to an embodiment.

FIG. 13 is a flowchart of a proximity discovery method of an electronic device according to an embodiment. The proximity discovery method of the electronic device may include operations 1310, 1320, and 1330. The proximity discovery method of the electronic device 1206 may be performed by at least one of an electronic device 201 or a processor 1230 of the electronic device. The electronic device 1206 may be a server (e.g., a PPS) to which the first external electronic device 1201 and the second external electronic device 1202 subscribe and which provides a proximity discovery service, the first external electronic device 1201 may be a device sending a proximity paging request for proximity discovery, and the second external electronic device may be a device to receive the proximity paging request for proximity discovery, as a target device discoverable by performing the proximity discovery.

Referring to FIG. 13, in operation 1310, the electronic device may receive first information related to the proximity discovery of the first external electronic device through the communication interface 1210 from the first external electronic device 1201.

For example, the processor 1230 may receive the first information-containing request message to request proximity paging for proximity discovery from the first external electronic device through the communication interface 1210.

According to an embodiment of the present disclosure, the first information may include the identification information about the first external electronic device, contact information, location information, information about the second communication interface to be used for the proximity discovery, transmission/reception setting information, security information, or a combination thereof. For devices to send a proximity paging request for proximity discovery as shown in FIG. 2, the first information may be the same as the first information described above, and a detailed description thereof is omitted here.

According to an embodiment of the present disclosure, the electronic device may receive the request message containing the first information through the communication interface from the first external electronic device, in the form of a text message (e.g., an SMS, an LMA, or an MMS message), an IM, an email, an IMS message, or a pre-defined application layer message.

According to an embodiment of the present disclosure, the request message may include an identifier indicating that the request message is a message for requesting proximity paging for proximity discovery. For example, the identifier may be included in the header of the data structure of the request message. The electronic device may distinguish the general text message from the message for requesting proximity paging for proximity discovery through the identifier.

In operation 1320, for example, the electronic device may select the second external electronic device corresponding to the first information, based on the first information and the subscription information or context information about the second external electronic device (e.g., the second external electronic device 1202).

According to an embodiment of the present disclosure, the subscription information may include identification information about each corresponding device, contact information, or parameter information indicating whether to provide a service for proximity discovery. The parameter information may be included in the contact information.

According to an embodiment of the present disclosure, the context information may include location information about each corresponding device (e.g., current location or location of interest) or preset conditions for each corresponding device. The location information may include latitudinal/longitudinal coordinates, geographical location information, or administrative district information about each corresponding device or a combination thereof. The preset conditions for each corresponding device may include an entry or exit to/from a preset area of interest.

According to an embodiment of the present disclosure, the electronic device may select the second external electronic device corresponding to the first information, based on the first information and the subscription information or context information about the second external electronic device.

According to an embodiment of the present disclosure, the electronic device may select the second external electronic device corresponding to the first information, based on the identification information or contact information about the second external electronic device contained in the subscription information. For example, the electronic device may select, as the second external electronic device corresponding to the first information, the second external electronic device whose information matches the contact information or identification information about the second external electronic device contained in the first information of the identification information or contact information about the second external electronic device in the subscription information stored in the memory 1220 (e.g., the subscription information DB 1222) of the electronic device.

According to an embodiment of the present disclosure, the electronic device may select the second external electronic device corresponding to the first information based on the parameter information indicating whether to provide a service for proximity discovery of the second external electronic device contained in the first information. For example, the electronic device may select, as the second external electronic device corresponding to the first information, the second external electronic device in which the parameter information contains information indicating to agree to provide a service for proximity discovery among at least one second external electronic device in the subscription information stored in the memory 1220.

According to an embodiment of the present disclosure, the electronic device may select the second external electronic device corresponding to the first information, based on the location information about the first external electronic device contained in the first information and the context information stored in the memory. For example, the electronic device may determine whether the distance between the first external electronic device and the corresponding second external electronic device is less than a preset distance based on the location information about the first external electronic device contained in the first information and location information about any one among at least one second external electronic device included in the context information. When the distance between the first external electronic device and the corresponding second external electronic device is less than the preset distance as a result of the determination, the electronic device may determine that the corresponding second external electronic device is located proximate to the first external electronic device, selecting the corresponding second external electronic device as the second external electronic device corresponding to the first information. The electronic device may perform the operation of determining whether the distance from the first external electronic device is less than the preset distance on all or some of the at least one second external electronic device included in the subscription information.

In operation 1330, for example, the electronic device may transmit the first information to the selected second external electronic device through the communication interface based on the identification information or contact information about the selected second external electronic device.

According to an embodiment of the present disclosure, the electronic device may transmit the request message containing the received first information through the communication interface to the selected second external electronic device based on the network address information (e.g., an IP address, an MAC address, or a URL address) contained in the identification information about the selected second external electronic device.

The electronic device may transmit the request message through the communication interface to the selected first external electronic device, in the form of a text message (e.g., an SMS, an LMA, or an MMS message), an IM, an email, an IMS message, or a pre-defined application layer message, based on the contact information about the selected second external electronic device. According to an embodiment of the present disclosure, the request message may be transmitted to the second external electronic device in a unicasting or multicasting manner.

According to an embodiment of the present disclosure, the electronic device may receive second information related to the proximity discovery of the second external electronic device corresponding to the first information from the second external electronic device through the communication interface.

According to an embodiment of the present disclosure, the second information may include identification information or contact information about the first external electronic device 1201, identification information or contact information about the second external electronic device 1202, information about the second communication interface to be used for proximity discovery of the second external electronic device 1202 activated based on the information about the second communication interface to be used for the proximity discovery of the first external electronic device 1201, transmission/reception setting information, or a combination thereof. For devices to receive a proximity paging request for proximity discovery as shown in FIG. 2, the second information may be the same as the second information described above, and a detailed description thereof is omitted here.

According to an embodiment of the present disclosure, the electronic device may receive the response message containing the second information through the communication interface from the second external electronic device, in the form of a text message (e.g., an SMS, an LMA, or an MMS message), an IM, an email, an IMS message, or a pre-defined application layer message.

According to an embodiment of the present disclosure, the response message may include an identifier indicating that the response message is a message responsive to the proximity paging request for the proximity discovery. For example, the identifier may be included in the header of the data structure of the response message. The electronic device may distinguish the general text message from the message for responding to the proximity paging request for proximity discovery through the identifier.

According to an embodiment of the present disclosure, the electronic device may also transmit the received second information through the communication interface to the first external electronic device.

According to an embodiment of the present disclosure, the electronic device may also transmit the received second information through the communication interface to the first external electronic device. For example, the electronic device may transmit the response message containing the second information through the communication interface to the first external electronic device based on the contact information or identification information about the first external electronic device contained in the second information. For example, where the second information does not contain the identification information or contact information about the first external electronic device, the electronic device may transmit the response message containing the second information to the first external electronic device through the communication interface based on the contact information or identification information about at least one first external electronic device contained in the subscription information.

According to an embodiment of the present disclosure, the electronic device may transmit the response message containing the second information through the communication interface to the first external electronic device, in the form of a text message (e.g., an SMS, an LMA, or an MMS message), an IM, an email, an IMS message, or a pre-defined application layer message.

Figure 14:
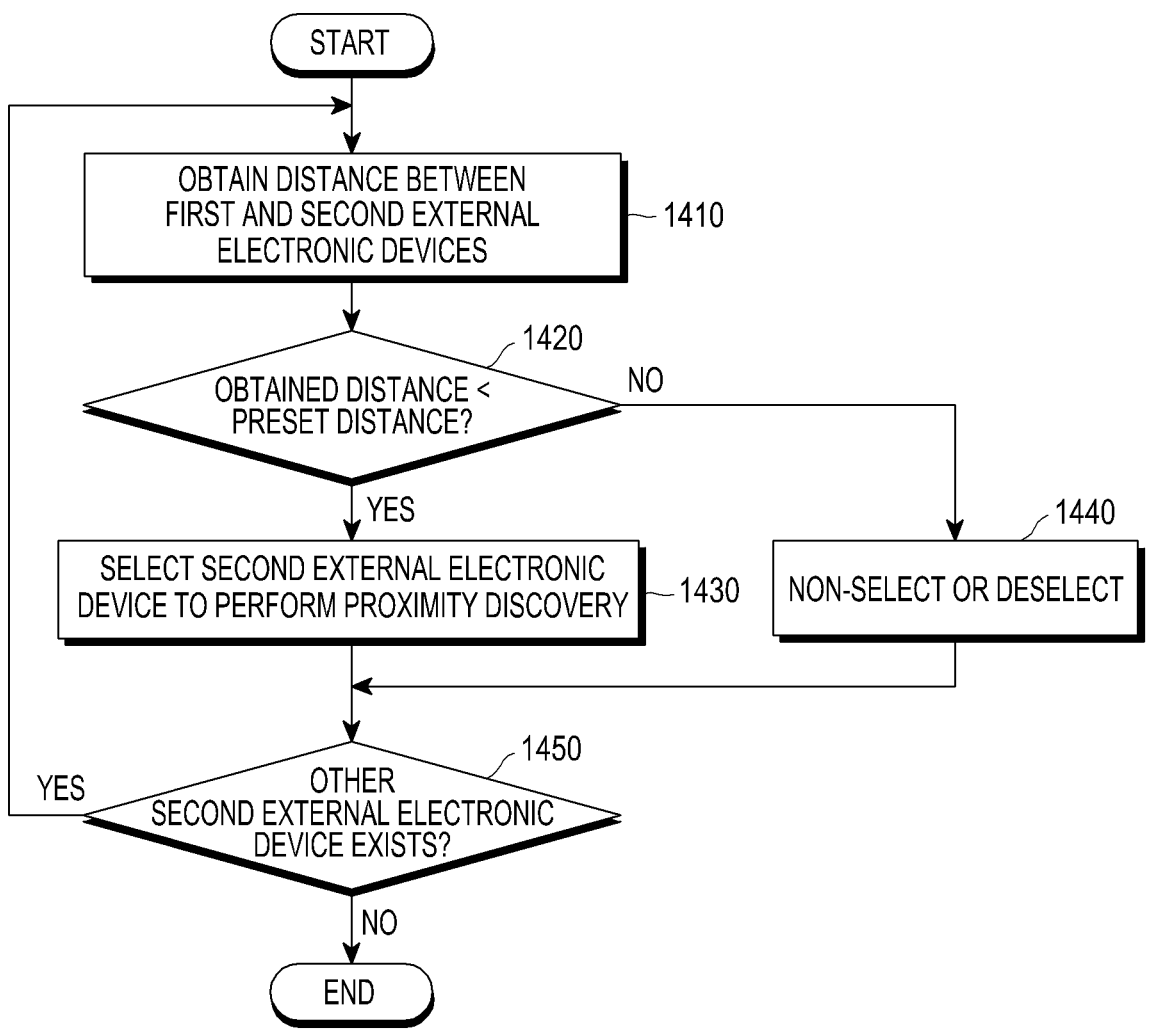
FIG. 14 is a flowchart of a proximity discovery method of an electronic device according to an embodiment.

FIG. 14 is a flowchart of a proximity discovery method of an electronic device according to an embodiment. FIG. 14 illustrates in greater detail the method of selecting the second external electronic device corresponding to the first information (operation 1320) of the proximity discovery method of the electronic device shown in FIG. 13, and the method of FIG. 14 may include operations 1410, 1420, 1430, 1440, and 1450. The proximity discovery method of the electronic device 1206 may be performed by at least one of an electronic device 201 or a processor 1230 of the electronic device. The electronic device may be a server (e.g., a PPS) to which the first external electronic device 1201 and the second external electronic device 1202 subscribe and which provides a proximity discovery service, the first external electronic device 1201 is a device sending a request for proximity discovery, and the second external electronic device is a device to receive the request for proximity discovery, as a target device discoverable by performing the proximity discovery.

Referring to FIG. 14, in operation 1410, for example, the electronic device may obtain a distance between the first external electronic device and the second external electronic device based on the context information and the first information related to the proximity discovery of the first external electronic device 1201.

For example, the electronic device may calculate the distance between the first external electronic device and the second external electronic device using location information about the first external electronic device contained in the first information and location information about the second external electronic device contained in the context information.

In operation 1420, for example, the electronic device may determine whether the obtained distance is less than a preset distance. When the obtained distance is less than the preset distance in operation 1420, the electronic device may perform operation 1430, and when the obtained distance is not less than the preset distance, the electronic device may perform operation 1440.

In operation 1430, for example, when the obtained distance is less than the preset distance, the electronic device may select the second external electronic device as the second external electronic device to perform proximity discovery.

For example, when the obtained distance is less than the preset distance, the electronic device may determine that the second external electronic device is located proximate to the first external electronic device, and select the second external electronic device as the second external electronic device to perform the proximity discovery.

In operation 1440, for example, when the obtained distance is not less than the preset distance, the electronic device may determine that the second external electronic device is not located proximate to the first external electronic device, and abstain from selecting the second external electronic device, or, where the second external electronic device has already been selected, deselect the second external electronic device.

In operation 1450, for example, the electronic device may determine whether there is another second external electronic device subscribing to the electronic device. In operation 1450, where there is another second external electronic device subscribing to the electronic device, the electronic device may go back to operation 1410 and repeat the subsequent operations. Thus, the electronic device may perform a determination of proximity of the first external electronic device to all of the second external electronic devices subscribing to the electronic device, and as a result of the determination, the electronic device may select at least one second external electronic device located proximate to the first external electronic device as the second external electronic device to perform the proximity discovery.

According to an embodiment of the present disclosure, the proximity discovery method of the electronic device 1206 may include receiving first information related to proximity discovery of a first external electronic device 1201 from the first external electronic device 1201 through the communication interface, identifying a second external electronic device 1202 corresponding to the first information based on subscription information or context information of the second external electronic device 1202, or the first information, and transmitting the first information to the identified second external electronic device 1202 through the communication interface 1210.

According to an embodiment of the present disclosure, the subscription information may include identification information, contact information, or parameter information indicating whether to provide a service for proximity discovery of each corresponding device. According to an embodiment of the present disclosure, the context information may include location information or preset conditions of each corresponding device.

According to an embodiment of the present disclosure, identifying the second external electronic device 1202 may include identifying the second external electronic device 1202 corresponding to the first information based on the identification information or contact information of the second external electronic device 1202 contained in the subscription information of the second external electronic device 1202.

According to an embodiment of the present disclosure, selecting the second external electronic device 1202 may include selecting the second external electronic device 1202 corresponding to the first information based on the parameter information indicating whether to provide a service for proximity discovery of the second external electronic device 1202 contained in the subscription information about the second external electronic device 1202.

According to an embodiment of the present disclosure, identifying the second external electronic device 1202 may include identifying the second external electronic device 1201 corresponding to the first information based on the location information of the second external electronic device 1202 contained in the identification information or contact information of the first external electronic device 1201 contained in the first information.

According to an embodiment of the present disclosure, identifying the second external electronic device 1202 may include determining whether a distance between the first external electronic device 1201 and the second external electronic device 1202 is less than a preset distance based on the location information of the first external electronic device 1201 contained in the first information or the location information of the second external electronic device 1202 contained in the context information, and when the distance between the first external electronic device 1201 and the second external electronic device 1202 is less than the preset distance as a result of the determination, identifying the second external electronic device 1202 as the second external electronic device 1202 corresponding to the first information.

According to an embodiment of the present disclosure, the proximity discovery method of the electronic device may further include receiving second information related to the proximity discovery of the second external electronic device 1202 corresponding to the first information from the second external electronic device 1202 through the communication interface 1210 and transmitting the received second information through the communication interface 1210 to the first external electronic device 1201.

According to an embodiment of the present disclosure, there is provided a non-transitory computer readable recording medium recording a program running on a computer, the program including executable commands executed by a processor 1230 of an electronic device 1206 to enable the processor 1230 to receive first information related to proximity discovery of a first external electronic device 1201 from the first external electronic device 1201 through the communication interface, select a second external electronic device 1202 corresponding to the first information based on subscription information or context information of the second external electronic device 1202, or the first information, and transmit the first information to the selected second external electronic device 1202 through the communication interface 1210.

Figure 15:
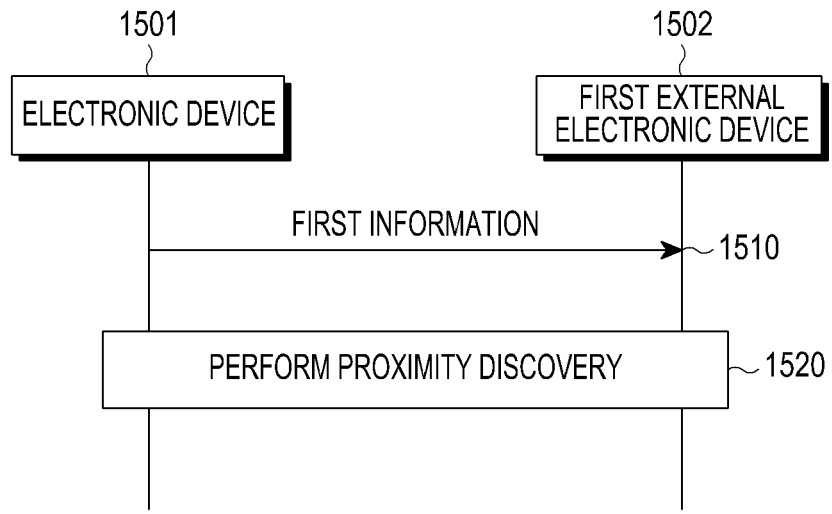
FIG. 15 is a flowchart of a proximity discovery method according to an embodiment.

FIG. 15 is a flowchart of a proximity discovery method according to an embodiment. The proximity discovery method may include operations 1510 and 1520. The electronic device 1501 may be a device to transmit a proximity paging request for proximity discovery and the first external electronic device 1502 may be a device to receive the proximity paging request for proximity discovery, as a target device discoverable by performing the proximity discovery.

Referring to FIG. 15, in operation 1510, the electronic device 1501 may transmit first information related to the proximity discovery of the electronic device 1501 to the first external electronic device 1502 through a first communication interface of the electronic device 1501. For example, where the first external electronic device 1502 is designated, the electronic device 1501 may include the first information in the request message to request the proximity paging for the proximity discovery and transmit the request message through the first communication interface of the electronic device 1501 to the first external electronic device 1502. The first external electronic device 1502 may receive the first information contained in the request message from the electronic device 1501 through a first communication interface of the first external electronic device 1502.

According to an embodiment of the present disclosure, when the first external electronic device 1502 is designated, the electronic device 1501 may transmit the request message through the first communication interface of the electronic device 1501 to the designated first external electronic device 1502, in the form of a text message (e.g., an SMS, an LMA, or an MMS message), an IM, an email, an IMS message, or a pre-defined application layer message, based on the contact information (e.g., a phone number or an email address about the designated first external electronic device 1502.

According to an embodiment of the present disclosure, when the first external electronic device 1502 is designated, the electronic device 1501 may transmit the request message through the first communication interface to the designated first external electronic device 1502 based on the identification information about the designated first external electronic device 1502 (e.g., network address information (e.g., an IP address, an MAC address, or a URL address)). According to an embodiment of the present disclosure, the request message may be transmitted to the first external electronic device 1502 in a unicasting or multicasting manner.

In operation 1520, for example, the electronic device 1501 and the first external electronic device 1502 may perform proximity discovery through their respective second communication interfaces based on the first information.

According to an embodiment of the present disclosure, the electronic device 1501 may activate the second communication interface of the electronic device 1501 based on the information about the second communication interface to be used for the proximity discovery of the electronic device 1501 contained in the first information. The electronic device 1501 may receive or transmit, through the activated second communication interface, from/to the first external electronic device 1502, the proximity check message to determine whether the electronic device 1501 and the first external electronic device 1502 are located proximate based on the transmission/reception setting information about the electronic device 1501 contained in the first information, performing proximity discovery. According to an embodiment of the present disclosure, the electronic device 1501 may transmit or receive, through the activated second communication interface of the electronic device 1501, to/from the first external electronic device 1502, the proximity check acknowledgement message corresponding to the proximity check message, performing the proximity discovery.

According to an embodiment of the present disclosure, the electronic device 1501 may set the electronic device 1501 as the receiving device to receive the proximity check message based on the transmission/reception setting information about the electronic device 1501 contained in the first information. In this case, the transmission/reception setting information contained in the first information may include information to enable the first external electronic device 1502 to be set as the transmitting device to transmit the proximity check message. The first external electronic device 1502 may set the first external electronic device 1502 as the transmitting device to transmit the proximity check message based on the transmission/reception setting information about the electronic device 1501 contained in the first information. The first external electronic device 1502 may activate the second communication interface of the first external electronic device 1502 and transmit the proximity check message through the activated second communication interface to the electronic device 1501. The electronic device 1501 may receive the proximity check message from the first external electronic device 1502 through the activated second communication interface of the electronic device 1501. In response to the receipt of the proximity check message, the electronic device 1501 may transmit a proximity check acknowledgement message corresponding to the proximity check message to the first external electronic device 1502 through the activated second communication interface of the electronic device 1501.

According to an embodiment of the present disclosure, the electronic device 1501 may set the electronic device 1501 as the transmitting device to transmit the proximity check message based on the transmission/reception setting information about the electronic device 1501 contained in the first information. In this case, the transmission/reception setting information contained in the first information may include information to enable the first external electronic device 1502 to be set as the receiving device to receive the proximity check message. The first external electronic device 1502 may set the first external electronic device 1501 as the receiving device to receive the proximity check message based on the transmission/reception setting information about the electronic device 1501 contained in the first information. The electronic device 1501 may transmit the proximity check message to the first external electronic device 1502 through the activated second communication interface of the electronic device 1501. The first external electronic device 1502 may activate the second communication interface of the first external electronic device 1502 and transmit the proximity check acknowledgement message corresponding to the proximity check message through the activated second communication interface to the electronic device 1501. In response to the transmission of the proximity check message, the electronic device 1501 may receive a proximity check acknowledgement message responsive to the proximity check message from the first external electronic device 1502 through the activated second communication interface of the electronic device 1501.

According to an embodiment of the present disclosure, the proximity check message may include identification information about the device to receive the proximity check message. For example, where the device to transmit the proximity check message is set as the electronic device 1501, and the device to receive the proximity check message is set as the first external electronic device 1502, the electronic device 1501 may include the identification information about the first external electronic device 1502 in the proximity check message and send the proximity check message to the first external electronic device 1502. When the identification information contained in the proximity check message matches the identification information that the first external electronic device owns, the first external electronic device 1502 may transmit a proximity check acknowledgement message responsive to the proximity check message to the electronic device 1501. Upon receipt of the proximity check acknowledgement message, the electronic device 1501 may determine that the first external electronic device 1502 is a device located proximate to the electronic device 1501 and may generate a proximate device list indicating devices discovered by the proximity discovery including the first external electronic device 1502 or add the first external electronic device 1502 to the generated proximate device list. For example, where the device to transmit the proximity check message is set as the first external electronic device 1502, and the device to receive the proximity check message is set as the electronic device 1501, the first external electronic device 1502 may include the identification information about the electronic device 1501 in the proximity check message and send the proximity check message to the electronic device 1501. When the identification information contained in the proximity check message received from the first external electronic device 1502 matches the identification information that the electronic device 1501 owns, the electronic device 1501 may transmit a proximity check acknowledgement message responsive to the proximity check message to the first external electronic device 1502. Upon receipt of the proximity check message containing the identification information matching the identification information that the electronic device 1501, or the first external electronic device 1502, owns, the electronic device 1501, or the first external electronic device 1502, may determine that the first external electronic device 1502, or the electronic device 1501, having sent the proximity check message, is a device located proximate to the electronic device 1501, or the first external electronic device

1502, and may generate a proximate device list indicating devices discovered by the proximity discovery including the discovered device or add the discovered device to the generated proximate device list.

According to an embodiment of the present disclosure, the proximate device list may be stored in the memory of the electronic device 1501 or the first external electronic device 1502. The proximate device list may be periodically or aperiodically updated based on a result of the proximity discovery.

Figure 16:
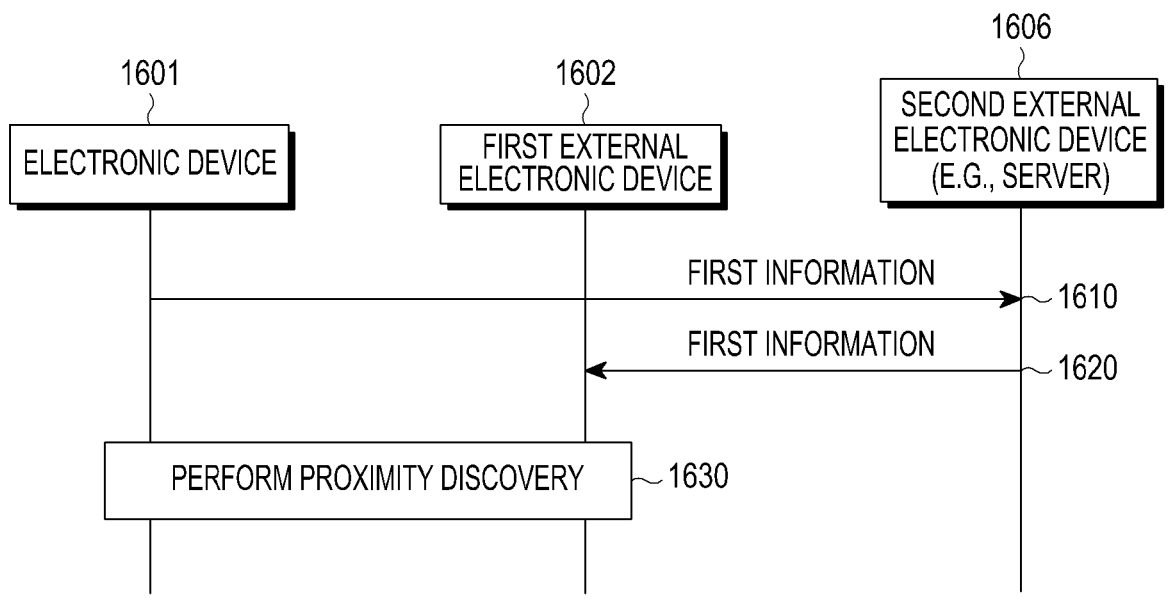
FIG. 16 is a flowchart of a proximity discovery method according to an embodiment.

FIG. 16 is a flowchart of a proximity discovery method according to an embodiment. The proximity discovery method may include operations 1610, 1620, and 1630. The electronic device 1601 may be a device requesting proximity paging for proximity discovery, the first external electronic device 1602 may be a device to receive a proximity paging request for proximity discovery, which is a target device to be discovered by the proximity discovery, and the second external electronic device 1606 may be a server (e.g., a PPS) to which the electronic device 1601 and the first external electronic device 1602 subscribe and which provides a proximity discovery service.

Referring to FIG. 16, in operation 1610, for example, the electronic device 1601 may transmit first information related to the proximity discovery of the electronic device 1601 to the second external electronic device 1606 (e.g., a server, such as a PPS) through a first communication interface of the electronic device 1601. For example, unless the first external electronic device 1602 is designated, if an input or application related to performing the proximity discovery is selected through the input/output interface of the electronic device 1601 or the display of the electronic device 1601, the electronic device 1601 may transmit the first information related to the proximity discovery of the electronic device 1601 through the first communication interface of the electronic device 1601 to the second external electronic device 1606. For example, the electronic device 1601 may include the first information in the request message to request the proximity paging for the proximity discovery and automatically send the request message to the second external electronic device 1606.

In operation 1620, for example, the second external electronic device 1606 (e.g., a server, such as a PPS) may transmit the first information to the first external electronic device 1602 through a predetermined communication interface connecting to a preset communication network (e.g., a WAN (e.g., the Internet)). For example, the second external electronic device 1606 may select the first external electronic device 1602 to which to send the first information based on the subscription information or context information about the devices stored in the second external electronic device 1606 or the first information. The second external electronic device 1606 may transmit the first information to the selected first external electronic device 1602 through the communication interface of the second external electronic device 1606. The first external electronic device 1602 receiving the first information may activate the second communication interface of the first external electronic device 1602 to be used for the proximity discovery based on the first information.

In operation 1630, for example, the electronic device 1601 and the first external electronic device 1602 may perform proximity discovery through their respective second communication interfaces based on the first information.

The operations of the electronic device 1601 and the first external electronic device 1602 in operation 1630 are the same as the operations of the electronic device 1501 and the first external electronic device 1502 in operation 1520 of FIG. 15. Thus, the above description may apply to operation 1630.

Figure 17:
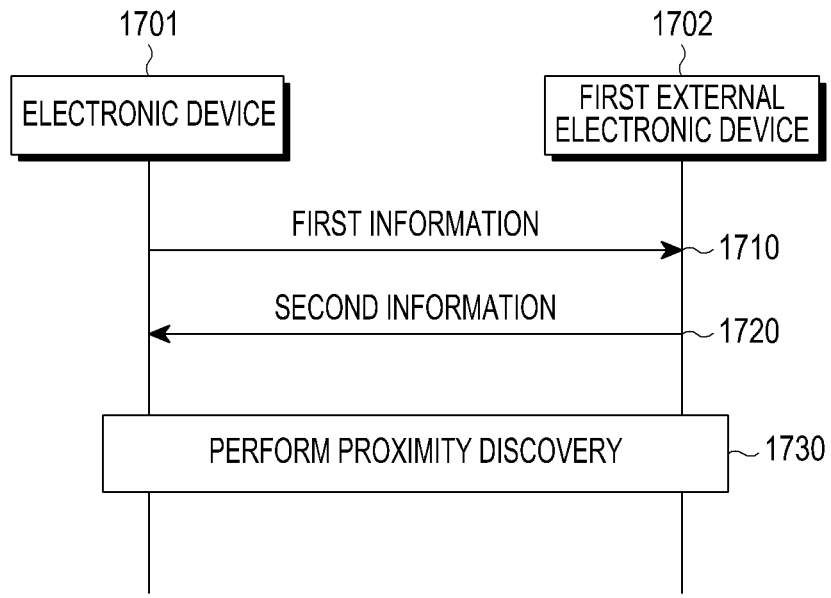
FIG. 17 is a flowchart of a proximity discovery method according to an embodiment.

FIG. 17 is a flowchart of a proximity discovery method according to an embodiment. The proximity discovery method may include operations 1710, 1720, and 1730. The electronic device 1701 may be a device to transmit a proximity paging request for proximity discovery and the first external electronic device 1702 may be a device to receive the proximity paging request for proximity discovery, as a target device discoverable by performing the proximity discovery.

Referring to FIG. 17, in operation 1710, the electronic device 1701 may transmit first information related to the proximity discovery of the electronic device 1701 to the first external electronic device 1702 through a first communication interface of the electronic device 1701. For example, where the first external electronic device 1702 is designated, the electronic device 1701 may include the first information in the request message to request the proximity paging for the proximity discovery and transmit the request message through the first communication interface of the electronic device 1701 to the first external electronic device 1702. The first external electronic device 1702 may receive the first information contained in the request message from the electronic device 1701 through the first communication interface of the first external electronic device 1702.

According to an embodiment of the present disclosure, where the first external electronic device 1702 is designated, the electronic device 1701 may transmit the request message through the first communication interface of the electronic device 1701 to the designated first external electronic device 1702, in the form of a text message (e.g., an SMS, an LMA, or an MMS message), an IM, an email, an IMS message, or a pre-defined application layer message, based on the contact information (e.g., a phone number or an email address about the designated first external electronic device 1702.

According to an embodiment of the present disclosure, where the first external electronic device 1702 is designated, the electronic device 1701 may transmit the request message through the first communication interface to the electronic device 1701 based on the identification information about the designated first external electronic device 1702 (e.g., network address information (e.g., an IP address, an MAC address, or a URL address)).

According to an embodiment of the present disclosure, the request message may be transmitted to the first external electronic device 1702 in a unicasting or multicasting manner.

In operation 1720, for example, the first external electronic device 1702 may transmit second information related to the proximity discovery of the first external electronic device 1702 corresponding to the first information to the electronic device 1701 through the first communication interface of the first external electronic device 1702. For example, in response to the receipt of the request message, the first external electronic device 1702 may transmit a response message containing the second information to the electronic device 1701 through the first communication interface of the first external electronic device 1702. The electronic device 1701 may receive the second information contained in the response message from the first external electronic device 1702 through the first communication interface of the electronic device 1701.

According to an embodiment of the present disclosure, the first external electronic device 1701 may transmit the response message through the first communication interface of the first external electronic device 1702 to the electronic device 1702 based on the contact information (e.g., a phone number or an email address), the identification information, or identification code temporarily assigned, about the electronic device 1701 (e.g., network address information (e.g., an IP address, an MAC address, or a URL address)). The electronic device 1701 may receive the second information contained in the response message from the first external electronic device 1702 through the first communication interface of the electronic device 1701.

According to an embodiment of the present disclosure, the first external electronic device 1702 may transmit the response message through the first communication interface of the electronic device 1701 to the electronic device 1701, in the form of a text message (e.g., an SMS, an LMA, or an MMS message), an IM, an email, an IMS message, or a pre-defined application layer message, based on the contact information (e.g., a phone number or an email address) about the electronic device 1701.

According to an embodiment of the present disclosure, the first external electronic device 1702 may transmit the response message to the electronic device 1701 through the first communication interface of the first external electronic device 1702 based on the identification information (e.g., network address information (e.g., an IP address, an MAC address, or a URL address) or identification code temporarily assigned) about the electronic device 1701 contained in the first information. In operation 1730, for example, the electronic device 1701 and the first external electronic device 1702 may perform the proximity discovery through their respective second communication interfaces based on the first information or the second information.

According to an embodiment of the present disclosure, the electronic device 1701 may perform the proximity discovery with the first external electronic device 1702 through the second communication interface of the electronic device 1701 based on the first information. For example, the electronic device 1701 may activate the second communication interface of the electronic device 1701 based on the information about the second communication interface to be used for the proximity discovery of the electronic device 1701 contained in the first information. The electronic device 1701 may transmit or receive, through the activated second communication interface of the electronic device 1701, to/from the first external electronic device 1702, the proximity check message to determine whether the electronic device 1701 and the first external electronic device 1702 are located proximate based on the transmission/reception setting information about the electronic device 1701 contained in the first information, performing proximity discovery. Further, the electronic device 1701 may receive or transmit, through the activated second communication interface of the electronic device 1701, from/to the first external electronic device 1702, the proximity check acknowledgement message corresponding to the proximity check message, performing the proximity discovery.

According to an embodiment of the present disclosure, the electronic device 1701 may perform the proximity discovery with the first external electronic device 1702 through the second communication interface of the electronic device 1701 based on the second information. For example, the electronic device 1701 may activate the second communication interface of the electronic device 1702 based on the information about the second communication interface to be used for the proximity discovery of the first external electronic device 1702 contained in the second information. The electronic device 1701 may transmit or receive, through the activated second communication interface of the electronic device 1701, to/from the first external electronic device 1702, the proximity check message to determine whether the electronic device 1702 and the first external electronic device 1702 are located proximate based on the transmission/reception setting information about the first external electronic device 1702 contained in the second information, performing proximity discovery. Further, the electronic device 1701 may receive or transmit, through the activated second communication interface of the electronic device 1701, from/to the first external electronic device 1702, the proximity check acknowledgement message corresponding to the proximity check message, performing the proximity discovery.

According to an embodiment of the present disclosure, the electronic device 1701 may perform the proximity discovery with the first external electronic device 1701 through the second communication interface of the electronic device 1701 based on the first information and the second information. For example, the electronic device 1701 may activate the second communication interface of the electronic device 1702 based on the information about the second communication interface to be used for the proximity discovery of the electronic device 1701 contained in the first information and the information about the second communication interface to be used for the proximity discovery of the first external electronic device 1702 contained in the second information. The electronic device 1701 may transmit or receive, through the activated second communication interface of the electronic device 1701, to/from the first external electronic device 1702, the proximity check message to determine whether the electronic device 1702 and the first external electronic device 1702 are located proximate based on the transmission/reception setting information about the electronic device 1701 contained in the first information and the transmission/reception setting information about the first external electronic device 1702 contained in the second information, performing proximity discovery. Further, the electronic device 1701 may receive or transmit, through the activated second communication interface of the electronic device 1701, from/to the first external electronic device 1702, the proximity check acknowledgement message corresponding to the proximity check message, performing the proximity discovery.

According to an embodiment of the present disclosure, the electronic device 1701 may set the electronic device 1701 as the receiving device to receive the proximity check message based on the transmission/reception setting information about the electronic device 1701 contained in the first information or the transmission/reception setting information about the first external electronic device 1702 contained in the security information. The electronic device 1701 may receive the proximity check message from the first external electronic device 1702 through the activated second communication interface of the electronic device 1701. In response to the receipt of the proximity check message, the electronic device 1701 may transmit a proximity check acknowledgement message corresponding to the proximity check message to, at least, the first external electronic device 1702 through the activated second communication interface of the electronic device 1701.

According to an embodiment of the present disclosure, the electronic device 1701 may set the electronic device 1701 as the transmitting device to transmit the proximity check message based on the transmission/reception setting information about the electronic device 1701 contained in the first information or the transmission/reception setting information about the first external electronic device 1702 contained in the security information. The electronic device 1701 may transmit the proximity check message to the first external electronic device 1702 through the activated second communication interface of the electronic device 1701. In response to the transmission of the proximity check message, the electronic device 1701 may receive a proximity check acknowledgement message responsive to the proximity check message from the first external electronic device 1702 through the activated second communication interface of the electronic device 1701.

According to an embodiment of the present disclosure, the proximity check message transmitted may include identification information about the device to receive the proximity check message. For example, where the device to transmit the proximity check message is set as the electronic device 1701, and the device to receive the proximity check message is set as the first external electronic device 1702, the electronic device 1701 may include the identification information about the first external electronic device 1702 in the proximity check message and send the proximity check message to the first external electronic device 1702. When the identification information contained in the proximity check message matches the identification information that the first external electronic device owns, the first external electronic device 1702 may transmit a proximity check acknowledgement message responsive to the proximity check message to the electronic device 1701. Upon receipt of the proximity check acknowledgement message, the electronic device 1701 may determine that the first external electronic device 1702 is a device located proximate to the electronic device 1701 and may generate a proximate device list indicating devices discovered by the proximity discovery including the first external electronic device 1702 or add the discovered first external electronic device 1702 to the previously generated proximate device list. For example, where the device to transmit the proximity check message is set as the first external electronic device 1702, and the device to receive the proximity check message is set as the electronic device 1701, the first external electronic device 1702 may include the identification information about the electronic device 1701 in the proximity check message and send the proximity check message to the electronic device 1701. When the identification information contained in the proximity check message matches the identification information that the electronic device owns, the electronic device 1701 may transmit a proximity check acknowledgement message responsive to the proximity check message to the first external electronic device 1702. Upon receipt of the proximity check message containing the identification information matching the identification information that the electronic device 1701, or the first external electronic device 1702, owns, the electronic device 1701, or the first external electronic device 1702, may determine that the first external electronic device 1502, or the electronic device 1501, having sent the proximity check message, is a device located proximate to the electronic device 1501, or the first external electronic device 1502, and may generate a proximate device list indicating devices discovered by the proximity discovery including the discovered device or add the discovered device to the generated proximate device list.

According to an embodiment of the present disclosure, the proximate device list may be stored in the memory of the electronic device 1501 or the first external electronic device 1502. The proximate device list may be periodically or aperiodically updated based on a result of the proximity discovery.

Figure 18:
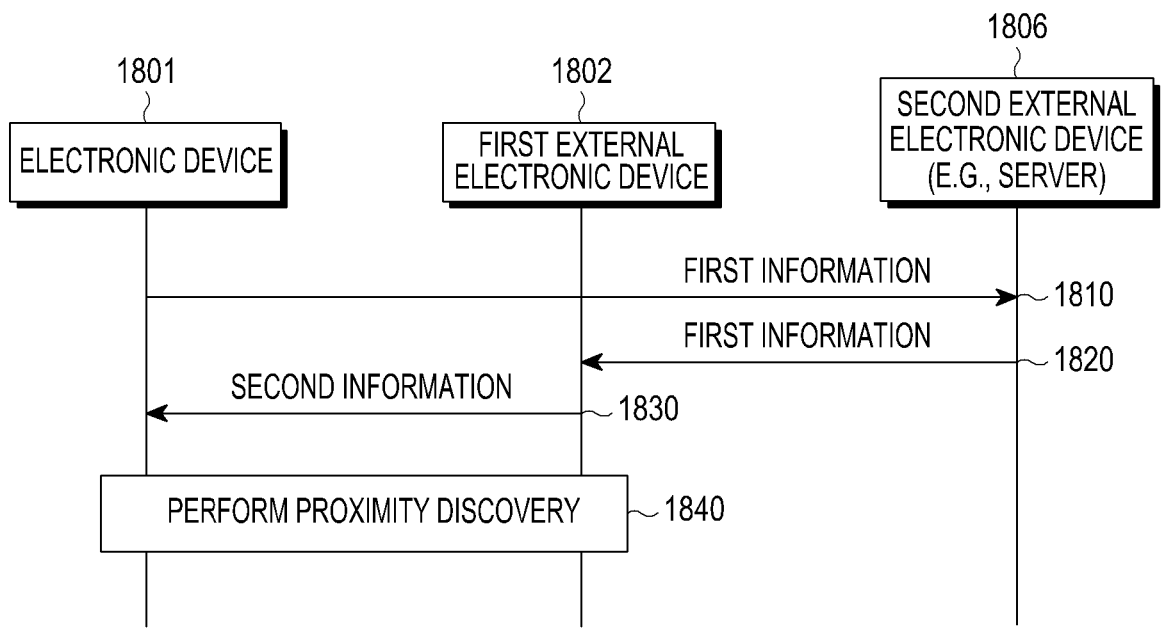
FIG. 18 is a flowchart of a proximity discovery method according to an embodiment.

FIG. 18 is a flowchart of a proximity discovery method according to an embodiment. The proximity discovery method may include operations 1810, 1820, 1830, and 1840. The electronic device 1801 may be a device requesting proximity paging for proximity discovery, the first external electronic device 1802 may be a device to receive a proximity paging request for proximity discovery, which is a target device to be discovered by the proximity discovery, and the second external electronic device 1806 may be a server (e.g., a PPS) to which the electronic device 1801 and the first external electronic device 1802 subscribe and which provides a proximity discovery service.

Referring to FIG. 18, in operation 1810, for example, the electronic device 1801 may transmit first information related to the proximity discovery of the electronic device 1801 to the second external electronic device 1806 (e.g., a server, such as a PPS) through a first communication interface of the electronic device 1801. For example, unless the first external electronic device 1802 is designated, if an input or application related to performing the proximity discovery is selected through the input/output interface of the electronic device 1801 or the display of the electronic device 1801, the electronic device 1801 may transmit the first information related to the proximity discovery of the electronic device 1801 through the first communication interface of the electronic device 1801 to the second external electronic device 1806. For example, the electronic device 1801 may include the first information in the request message to request the proximity paging for the proximity discovery and automatically send the request message to the second external electronic device 1806

In operation 1820, for example, the second external electronic device 1806 (e.g., a server, such as a PPS) may transmit the first information to the selected first external electronic device 1802 through a predetermined communication interface connecting to a preset communication network (e.g., a WAN (e.g., the Internet)). For example, the second external electronic device 1806 may select the first external electronic device 1802 to which to send the first information based on the subscription information or context information stored in the second external electronic device 1806 or the first information. The second external electronic device 1806 may transmit the first information to the selected first external electronic device 1802 through the communication interface of the second external electronic device 1806. The first external electronic device 1802 receiving the first information may activate the second communication interface of the first external electronic device 1802 to be used for the proximity discovery based on the first information.

In operation 1830, for example, the first external electronic device 1802 may transmit second information related to the proximity discovery of the first external electronic device 1802 corresponding to the first information to the electronic device 1801 through the first communication interface of the first external electronic device 1802. For example, in response to the receipt of the request message, the first external electronic device 1802 may transmit a response message containing the second information to the electronic device 1801 through the first communication interface of the first external electronic device 1802. The electronic device 1801 may receive the second information contained in the response message from the first external electronic device 1802 through the first communication interface of the electronic device 1801.

According to an embodiment of the present disclosure, the first external electronic device 1802 may transmit the response message through the first communication interface of the electronic device 1801 to the electronic device 1801, in the form of a text message (e.g., an SMS, an LMA, or an MMS message), an IM, an email, an IMS message, or a pre-defined application layer message, based on the contact information (e.g., a phone number or an email address) about the electronic device 1801.

According to an embodiment of the present disclosure, the first external electronic device 1802 may transmit the response message through the first communication interface of the first external electronic device 1802 to the electronic device 1801 based on the identification information, or identification code temporarily assigned, about the electronic device 1801 (e.g., network address information (e.g., an IP address, an MAC address, or a URL address)). The first external electronic device 1802 may transmit the response message through the first communication interface of the electronic device 1801 to the electronic device 1801, in the form of a text message (e.g., an SMS, an LMA, or an MMS message), an IM, an email, an IMS message, or a pre-defined application layer message, based on the contact information (e.g., a phone number or an email address) or identification information (e.g., network address information (e.g., an IP address, an MAC address, or a URL address) or identification code temporarily assigned) about the electronic device 1801. In operation 1840, for example, the electronic device 1801 and the first external electronic device 1802 may perform proximity discovery through their respective second communication interfaces based on the first information and the second information.

The operations of the electronic device 1801 and the first external electronic device 1802 in operation 1840 are the same as the operations of the electronic device 1701 and the first external electronic device 1702 in operation 1730 of FIG. 17. Thus, the above description may apply to operation 1840.

Figure 19:
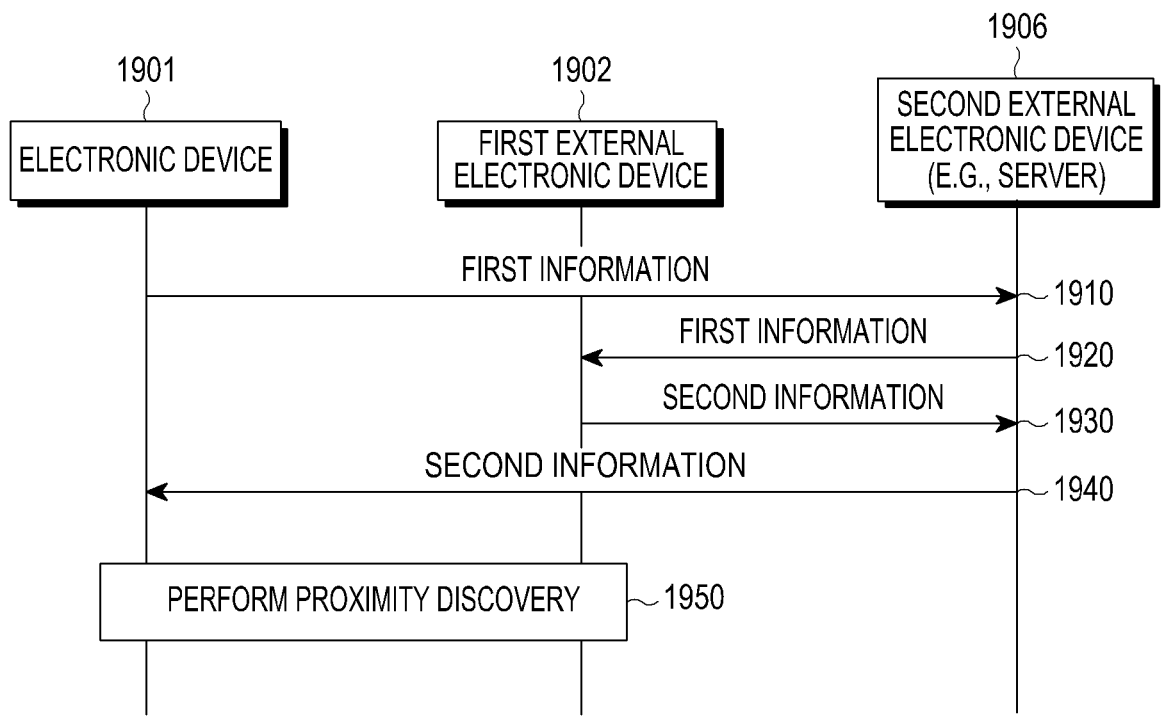
FIG. 19 is a flowchart of a proximity discovery method according to an embodiment.

FIG. 19 is a flowchart of a proximity discovery method according to an embodiment. The proximity discovery method may include operations 1910, 1920, 1930, 1940, and 1950. The electronic device 1901 may be a device requesting proximity paging for proximity discovery, the first external electronic device 1902 may be a device to receive a proximity paging request for proximity discovery, which is a target device to be discovered by the proximity discovery, and the second external electronic device 1906 may be a server (e.g., a PPS) to which the electronic device 1901 and the first external electronic device 1902 subscribe and which provides a proximity discovery service.

Referring to FIG. 19, in operation 1910, for example, the electronic device 1910 may transmit first information related to the proximity discovery of the electronic device 1910 to the second external electronic device 1906 (e.g., a server, such as a PPS) through a first communication interface of the electronic device 1901. For example, unless the first external electronic device 1902 is designated, if an input or application related to performing the proximity discovery is selected through the input/output interface of the electronic device 1901 or the display of the electronic device 1901, the electronic device 1901 may transmit the first information related to the proximity discovery of the electronic device 1901 through the first communication interface of the electronic device 1901 to the second external electronic device 1906. For example, the electronic device 1901 may include the first information in the request message to request the proximity paging for the proximity discovery and automatically send the request message to the second external electronic device 1906.

According to an embodiment of the present disclosure, the second external electronic device 1906 may transmit the first information to the first external electronic device 1901 through a predetermined communication interface connecting to a preset communication network (e.g., a WAN (e.g., the Internet)). The first external electronic device 1901 may activate the second communication interface to be used for the proximity discovery based on the first information.

In operation 1920, for example, the second external electronic device 1906 (e.g., a server, such as a PPS) may transmit the first information to the selected first external electronic device 1902 through a predetermined communication interface connecting to a preset communication network (e.g., a WAN (e.g., the Internet)). For example, the second external electronic device 1906 may select the first external electronic device 1902 to which to send the first information based on the subscription information or context information stored in the second external electronic device 1906 or the first information. The second external electronic device 1906 may transmit the first information to the selected first external electronic device 1902 through the communication interface of the second external electronic device 1906. For example, the second external electronic device 1906 may transmit the request message containing the first information to the selected first external electronic device 1902. The first external electronic device 1902 receiving the first information may activate the second communication interface of the first external electronic device 1902 to be used for the proximity discovery based on the first information.

In operation 1930, for example, the first external electronic device 1902 may transmit second information related to the proximity discovery of the first external electronic device 1902 corresponding to the first information to the second external electronic device 1906 (e.g., a server such as a PPS) through the first communication interface of the first external electronic device 1902. For example, the first external electronic device 1902 may receive the request message containing the first information from the second external electronic device 1906 through the first communication interface of the first external electronic device 1902. Unless the first information in the request message contains the identification information or contact information about the electronic device 1901, the first external electronic device 1902 may transmit a response message containing the second information corresponding to the first information to the second external electronic device 1906 through the first communication interface of the first external electronic device 1902.

In operation 1940, for example, the second external electronic device 1906 (e.g., a server, such as a PPS) may transmit the second information to the electronic device 1901 through the communication interface of the second external electronic device 1906. For example, the second external electronic device 1906 may transmit the response message containing the second information to the electronic device 1901. The electronic device 1901 may receive second information related to the proximity discovery of the first external electronic device 1901 corresponding to the first information from the second external electronic device 1906 through the first communication interface of the electronic device 1901. For example, the second external electronic device 1906 may transmit the response message through the communication interface of the second external electronic device 1906 to the electronic device 1901 based on the identification information (e.g., network address information (e.g., an IP address, an MAC address, or a URL address) or identification code temporarily assigned) or contact information (e.g., a phone number or an email address) about the electronic device 1901 contained in the first information. The electronic device 1901 may receive the second information contained in the response message from the second external electronic device 1906 through the first communication interface of the electronic device 1901.

According to an embodiment of the present disclosure, the second external electronic device 1906 (e.g., a server such as a PPS) may transmit the response message through the first communication interface of the second external electronic device 1906 to the electronic device 1901 based on the identification information (e.g., network address information (e.g., an IP address, an MAC address, or a URL address)), or identification code temporarily assigned, about the electronic device 1901 contained in the first information.

According to an embodiment of the present disclosure, the second external electronic device 1906 (e.g., a server, such as a PPS) may transmit the response message through the communication interface of the second external electronic device 1906 to the electronic device 1901, in the form of a text message (e.g., an SMS, an LMA, or an MMS message), an IM, an email, an IMS message, or a pre-defined application layer message, based on the contact information (e.g., a phone number or an email address) about the electronic device 1901.

In operation 1950, for example, the electronic device 1901 and the first external electronic device 1902 may perform proximity discovery through their respective second communication interfaces based on the first information and the second information.

The operations of the electronic device 1901 and the first external electronic device 1902 in operation 1950 are the same as the operations of the electronic device 1701 and the first external electronic device 1702 in operation 1730 of FIG. 17. Thus, the above description may apply to operation 1950.

Figure 20:
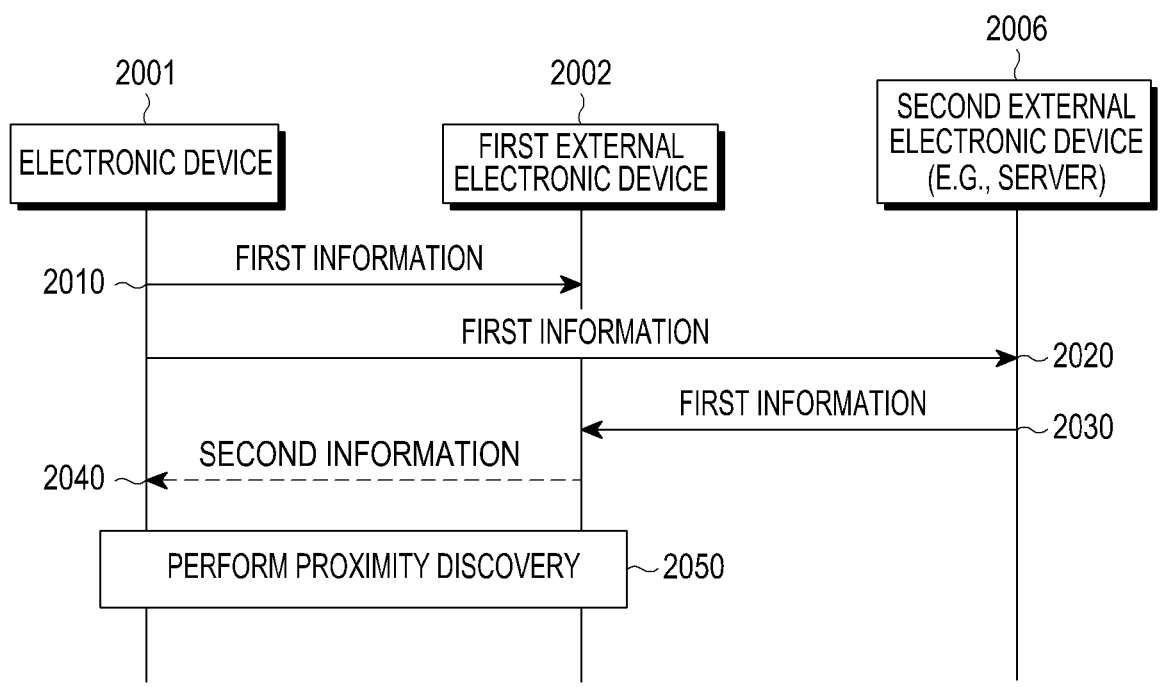
FIG. 20 is a flowchart of a proximity discovery method according to an embodiment.

FIG. 20 is a flowchart of a proximity discovery method according to an embodiment. The proximity discovery method may include operations 2010, 2020, 2030, 2040, and 2050. The electronic device 2001 may be a device requesting proximity paging for proximity discovery, the first external electronic device 2002 may be a device to receive a proximity paging request for proximity discovery, which is a target device to be discovered by the proximity discovery, and the second external electronic device 2006 may be a server (e.g., a PPS) to which the electronic device 2001 and the first external electronic device 2002 subscribe and which provides a proximity discovery service.

Referring to FIG. 20, in operations 2010 and 2020, for example, the electronic device 2001 may transmit first information related to the proximity discovery of the electronic device 2001 to the first external electronic device 2002 or the second external electronic device 2006 (e.g., a server, such as a PPS) through a first communication interface of the electronic device 2001.

The operation 2010 is the same as operation 1510 of FIG. 15 or operation 1710 of FIG. 17, and thus, the above description may apply to operation 2010. Operation 2020 is the same as operation 1610 of FIG. 16, operation 1810 of FIG. 18, or operation 1910 of FIG. 19, and thus, the above description may apply to operation 2020.

In operation 2030, for example, the second external electronic device 2006 (e.g., a server, such as a PPS) may transmit the first information to the selected first external electronic device 2002 through a predetermined communication interface connecting to a preset communication network (e.g., a WAN (e.g., the Internet)).

In operation 2040, for example, the first external electronic device 2002 may transmit second information related to the proximity discovery of the first external electronic device 2002 corresponding to the first information to the electronic device 2001 through the second communication interface of the first external electronic device 2002. For example, the first external electronic device 2002 may activate the second communication interface of the first external electronic device 2002 to be used for the proximity discovery based on the first information. In response to the receipt of the request message, the first external electronic device 2002 may transmit a response message containing the second information to the electronic device 2001 through the activated second communication interface of the first external electronic device 2002. The electronic device 2001 may receive the second information contained in the response message from the first external electronic device 2002 through the second communication interface of the electronic device 2001.

In operation 2050, for example, the electronic device 2001 and the first external electronic device 2002 may perform proximity discovery through their respective second communication interfaces based on the first information and the second information.

The operations of the electronic device 2001 and the first external electronic device 2002 in operation 2050 are the same as the operations of the electronic device 1701 and the first external electronic device 1702 in operation 1730 of FIG. 17. Thus, the above description may apply to operation 2050.

Figure 21A:
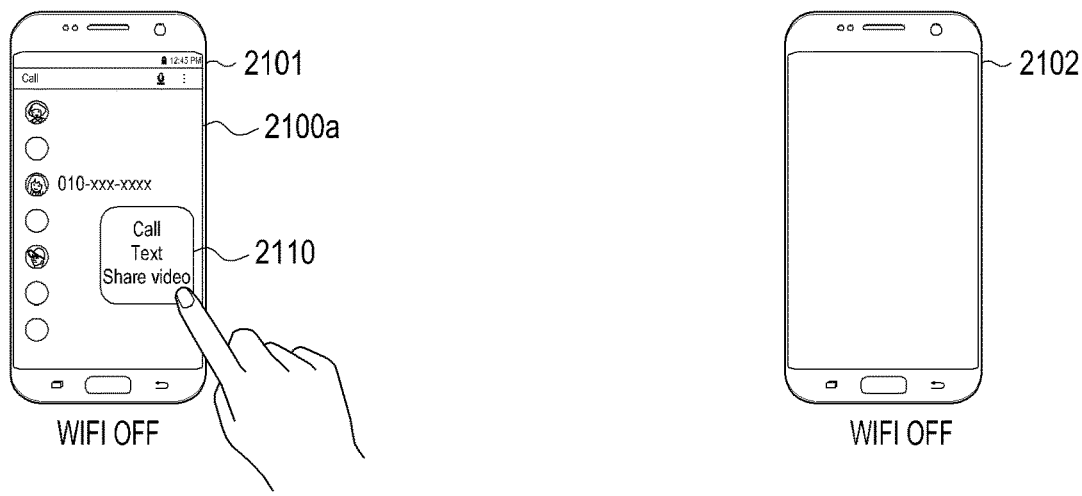
FIGS. 21A, 21B, and 21C are illustrations of a user interface (UI) for proximity discovery according to an embodiment.
Figure 21B:
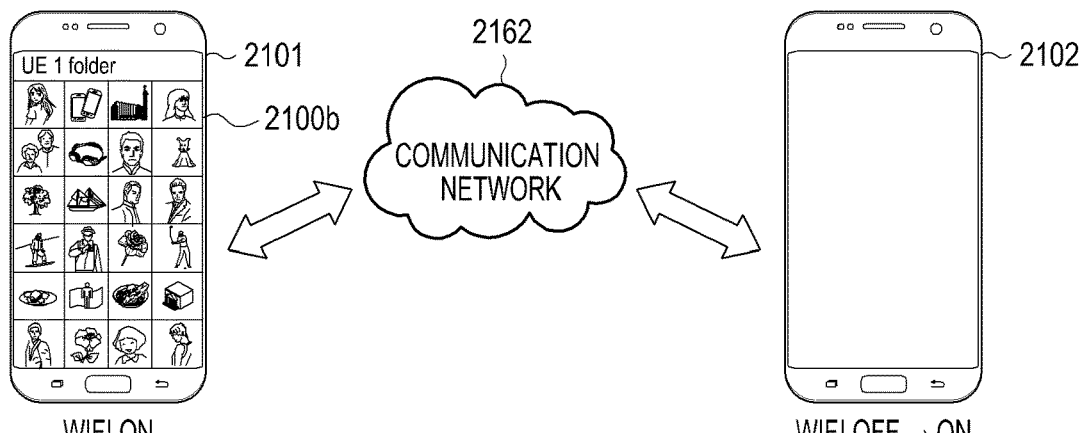
Figure 21C:
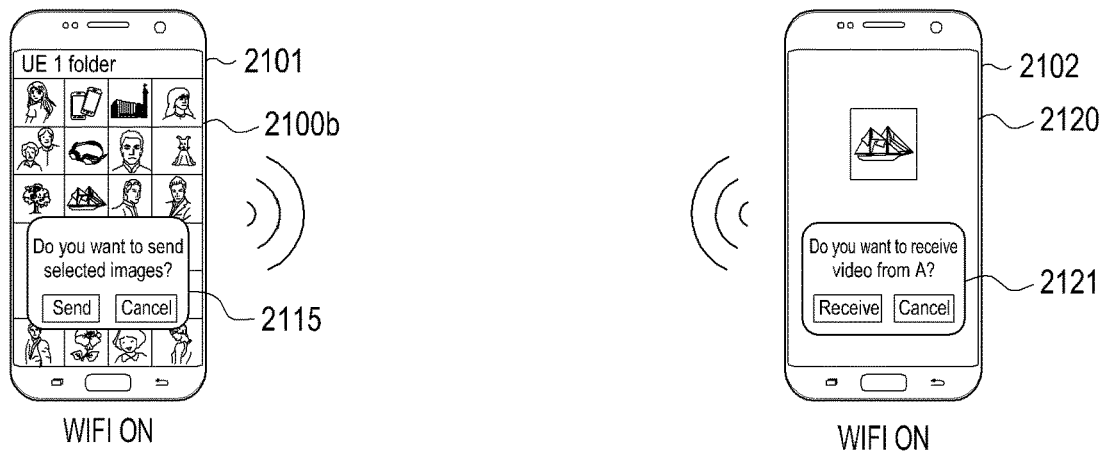

FIGS. 21A, 21B, and 21C are illustrations of a UI for proximity discovery according to an embodiment.

Referring to FIGS. 21A, 21B, and 21C, the electronic device 2101, as a device to send a proximity paging request for proximity discovery, may include all or some of the components of the electronic device 201 of FIG. 2. The external electronic device 2102, as a target device discoverable by performing proximity discovery, may be a device to receive the proximity paging request for proximity discovery and may include all or some of the components of the electronic device 201.

The electronic device 2101 may display contacts stored in the electronic device 2101 on the display screen 2100a according to a user input. The user of the electronic device 2101 may display an application 2110 (e.g., video sharing) related to performing the proximity discovery on the display screen 2100a based on the contact information stored in the electronic device 2101. For example, upon selecting a contact corresponding to the external electronic device intended for proximity discovery, the application 2110 (e.g., video sharing) may be popped up on the display screen 2100a.

The second communication interface (e.g., WiFi) to be used for the proximity discovery of the electronic device 2101 and the second communication interface (e.g., WiFi) to be used for the proximity discovery of the external electronic device 2102 may both remain inactive.

When the user of the electronic device 2101 selects the application 2110 (e.g., video sharing), the electronic device 2101 may turn on and activate the second communication interface (e.g., WiFi) to be used for the proximity discovery of the electronic device 2101, and send a proximity paging request message containing information about the second communication interface (e.g., WiFi) to the external electronic device 2102 through the first communication interface connected to a preset communication network 2162 (e.g., WAN). The external electronic device 2102 may receive the request message from the electronic device 2101 through the first communication interface connected with the preset communication network 2162 (e.g., WAN). The external electronic device 2102 may turn on to activate the second communication interface (e.g., WiFi) of the external electronic device 2102 corresponding to the second communication interface (e.g., WiFi) of the electronic device 2101 based on the information about the second communication interface (e.g., WiFi) of the electronic device 2101 contained in the request message.

The electronic device 2101 and the external electronic device 2102 may perform proximity discovery through the activated second communication interface (e.g., WiFi) of the electronic device 2101 and the activated second communication interface (e.g., WiFi) of the external electronic device 2102. When the external electronic device 2102 is discovered as a result of the proximity discovery, the electronic device 2101 may display a pop-up message 2115 to inquire whether to send the selected image from the electronic device 2101 on the display screen 2100b of the electronic device 2101. When the user of the electronic device 2101 selects a send button displayed in the message 2115, the selected image may be transmitted to the discovered external electronic device 2102 through the activated second communication interface (e.g., WiFi) of the electronic device 2101. When the external electronic device 2102 receives the selected image from the electronic device 2101 through the activated second communication interface (e.g., WiFi) of the external electronic device 2102, a message 2121 to inquire whether to receive the image from the electronic device 2101 may be displayed in a pop-up window on the display screen 2120 of the external electronic device 2102. When the user of the external electronic device 2102 selects the receive button in the message 2121, the external electronic device 2102 may download and share the image sent from the electronic device 2101.

Figure 22A:
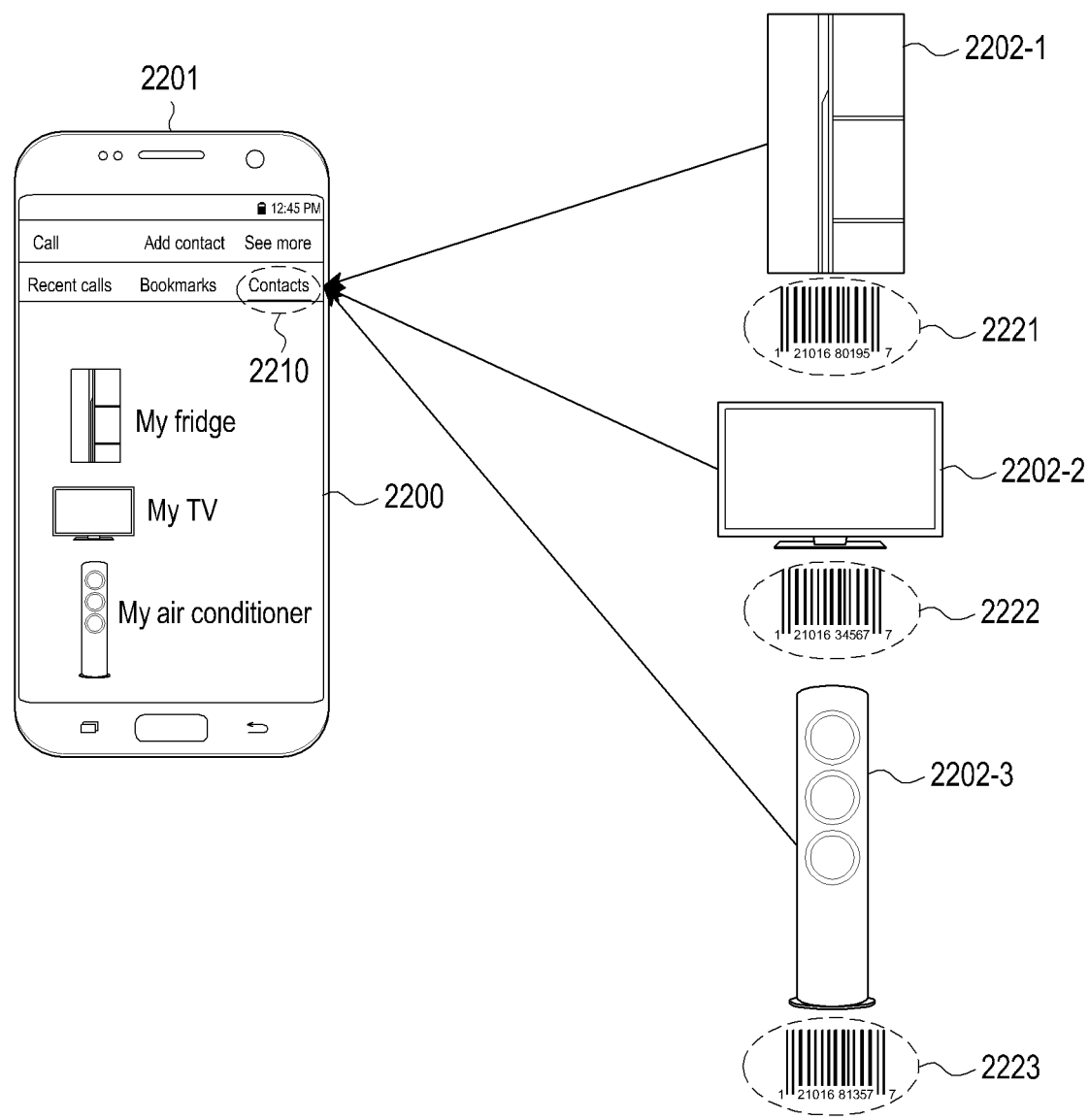
FIGS. 22A, 22B, and 22C are illustrations of a UI for proximity discovery according to an embodiment.
Figure 22B:
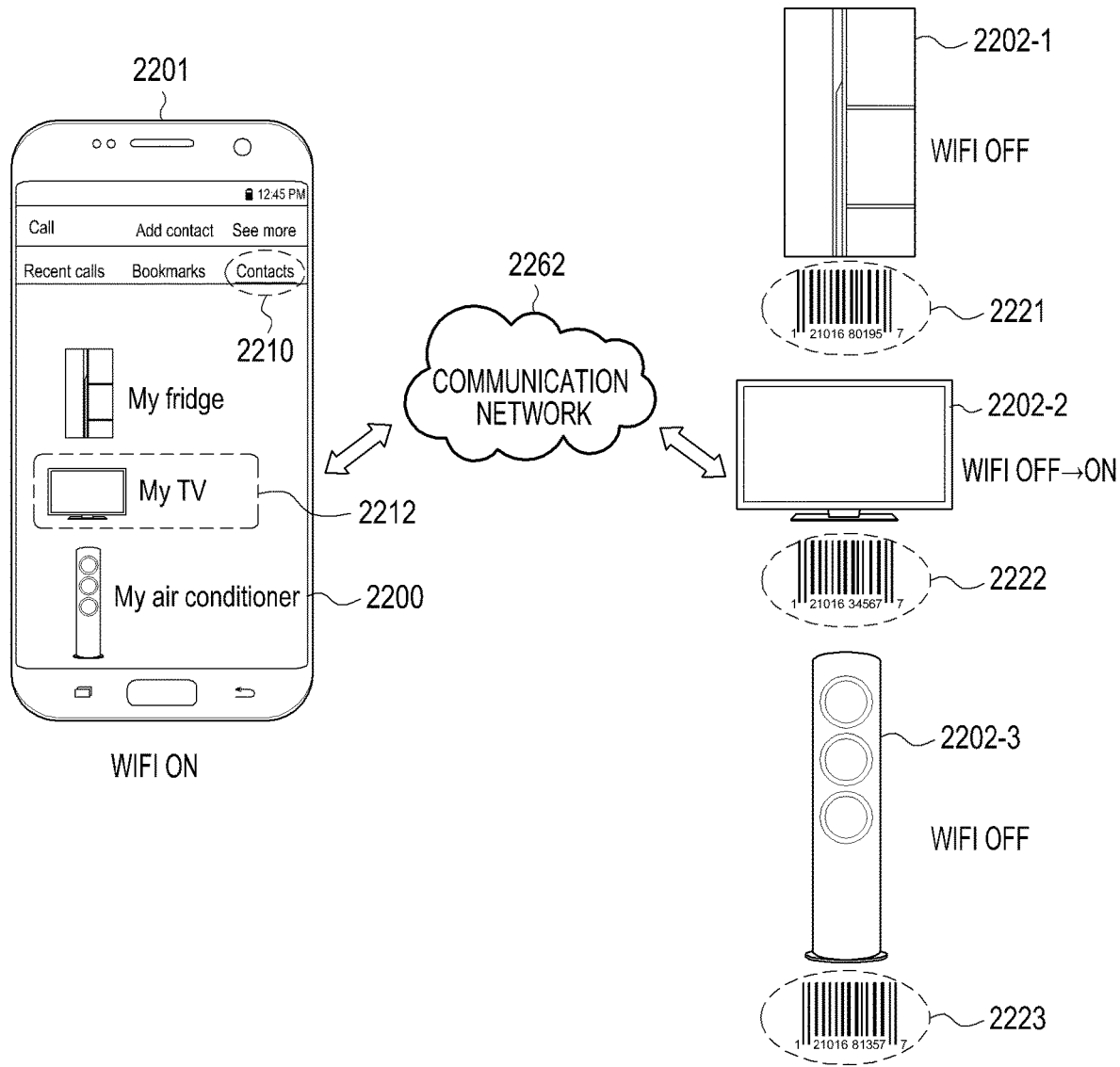
Figure 22C:
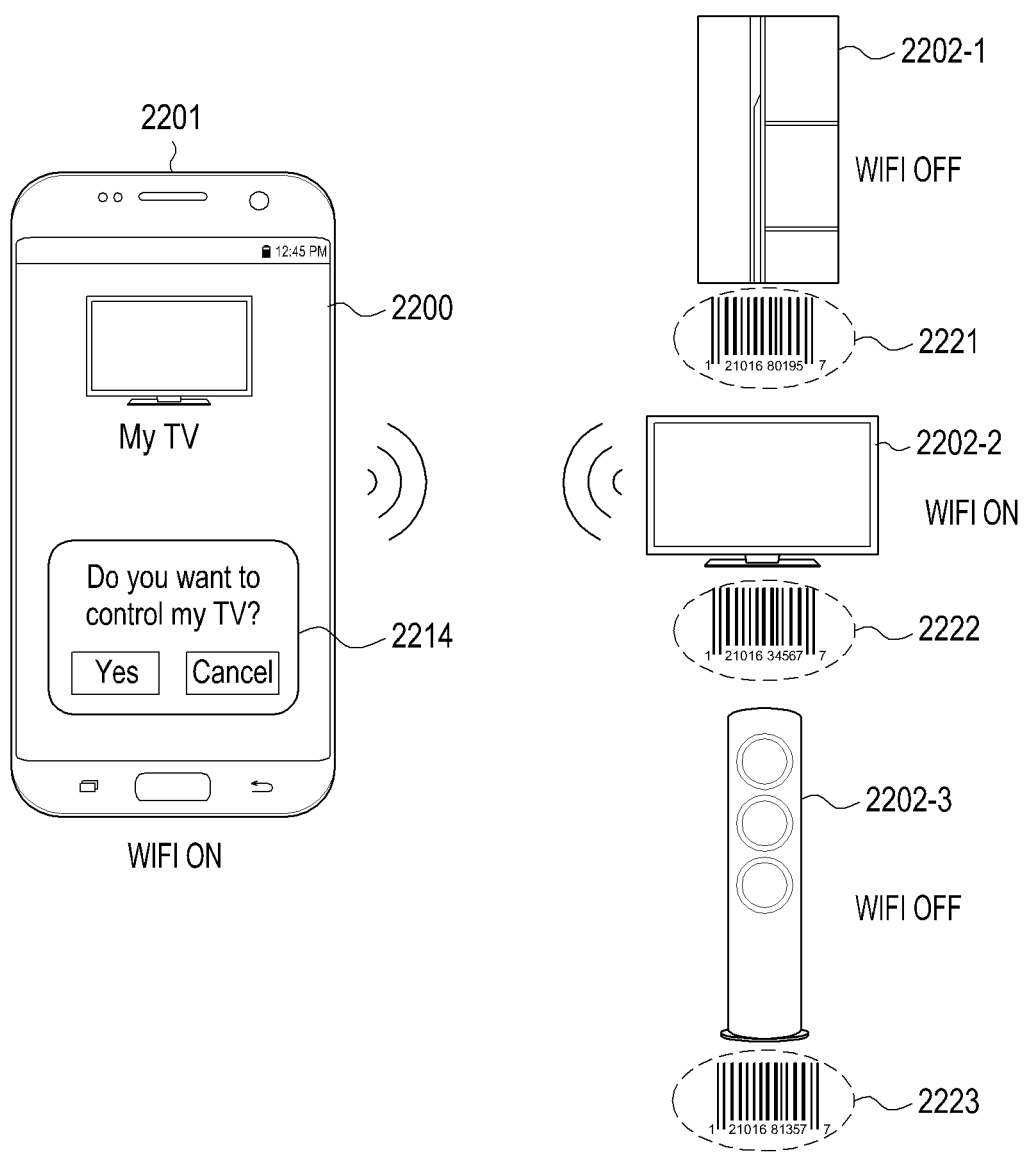

FIGS. 22A, 22B, and 22C are illustrations of a UI for proximity discovery according to an embodiment.

Referring to FIGS. 22A, 22B, and 22C, the electronic device 2201, as a device to send a proximity paging request for proximity discovery, may include all or some of the components of the electronic device 201 of FIG. 2. The external electronic device 2202-1, 2202-2, or 2202-3, as a target device discoverable by performing proximity discovery, may be a device to receive the proximity paging request for proximity discovery and may include all or some of the components of the electronic device 201.

The user of the electronic device 2201 may store various external electronic devices 2202-1, 2202-2, or 2202-3 intended for proximity discovery with the electronic device 2201 in contacts 2210 of the electronic device 2201. For example, the bar code 2221, 2222, and 2223 of each external electronic device 2202-1, 2202-2, and 2202-3, respectively, may be scanned and network address information (e.g., an IP address, an MAC address, or a URL address), or contact information, contained in the identification information about the external electronic device 2202-1, 2202-2, or 2202-3 corresponding to the barcode may be stored in the contacts 2210 of the electronic device 2201.

The user of the electronic device 2201 may search the contacts 2210 for the external electronic device 2202-1, 2202-2, or 2202-3. The user of the electronic device 2201 may display the external electronic device 2202-1, 2202-2, or 2202-3 searched for on the screen 2200 of the electronic device 2201. The user of the electronic device 2201 may select (2212) one (e.g., a TV) to perform proximity discovery among the external electronic devices 2202-1, 2202-2, and 2202-3 searched for.

When the user of the electronic device 2201 selects (2212) the external electronic device 2202-2 to perform proximity discovery based on the contact information stored in the electronic device 2201, the electronic device 2201 may activate the second communication interface (e.g., WiFi) to be used for the proximity discovery of the electronic device 2201, and send a proximity paging request message containing information about the second communication interface (e.g., WiFi) of the electronic device 2201 to the selected external electronic device 2202-2 through the first communication interface connected to a preset communication network 2262 (e.g., WAN). The external electronic device 2202-2 may receive the request message from the electronic device 2201 through the first communication interface connected with the preset communication network 2262 (e.g., WAN). The external electronic device 2202-2 may turn on to activate the second communication interface (e.g., WiFi) of the external electronic device 2202-2 corresponding to the second communication interface (e.g., WiFi) of the electronic device 2201 based on the information about the second communication interface (e.g., WiFi) of the electronic device 2201 contained in the request message.

The electronic device 2201 and the external electronic device 2202-2 may perform proximity discovery through the activated second communication interface (e.g., WiFi) of the electronic device 2201 and the activated second communication interface (e.g., WiFi) of the external electronic device 2202-2. When the external electronic device 2202-2 is discovered as a result of the proximity discovery, the electronic device 2201 may display a pop-up message 2214 to inquire whether to control the discovered external electronic device 2202-2 on the display screen 2200 of the electronic device 2201. When the user of the electronic device 2201 selects a confirm button (e.g., YES) in the message 2214, a signal to control the discovered external electronic device 2202-2 may be transmitted to the external electronic device 2202-2 through the activated second communication interface (e.g., WiFi) of the electronic device 2201. The external electronic device 2202-2 may be controlled by the control signal transmitted from the electronic device 2201 through the activated second communication interface (e.g., WiFi) of the external electronic device 2202-2.

The term "module" may indicate a unit including one of hardware, software, firmware, or a combination thereof. The term "module" may be interchangeably used with the terms "unit," "logic," "logical block," "component," and "circuit." The term "module" may indicate a minimum unit or part of an integrated component. The term "module" may indicate a minimum unit or part of performing one or more functions. The term "module" indicate a device that may be implemented mechanically or electronically. For example, the term "module" may indicate a device that includes at least one of an application specific integrated circuit (ASIC), field programmable gate arrays (FPGAs), or programmable logic arrays (PLAs) that perform some operations, which are known or will be developed in the future.

According to an embodiment of the present disclosure, at least a part of the device (e.g., modules or their functions) or method (e.g., operations) may be implemented as instructions stored in a non-transitory computer-readable storage medium e.g., in the form of a programming circuit. The instructions, when executed by a processor (e.g., the processor 250), may enable the processor to carry out a corresponding function. The non-transitory computer-readable storage medium may be e.g., the memory 230.

The non-transitory computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, and/or the like. Examples of the program commands may include not only machine language code but also high-level language code which are executable by various computing means using an interpreter. The aforementioned hardware devices may be configured to operate as one or more software modules to carry out embodiments of the present disclosure, and vice versa.

Circuits or programming circuits in accordance with various embodiments of the present disclosure may include at least one or more of the aforementioned components, omit some of them, or further include other additional components. Operations performed by circuits, programming circuits or other components in accordance with various embodiments of the present disclosure may be carried out sequentially, simultaneously, repeatedly, or heuristically. Furthermore, some of the operations may be performed in a different order, or omitted, or include other additional operation(s).

As is apparent from the foregoing description, an electronic device requesting proximity discovery may remotely control the operation of a communication interface, to be used for the proximity discovery, of an external electronic device which is a target electronic device for the proximity discovery, using a pre-established communication network (e.g., a WAN).

According to an embodiment of the present disclosure, upon performing proximity discovery through remote control, the communication interface of the electronic device, which is the target electronic device for the proximity discovery, may be activated, and upon completing the proximity discovery, the communication interface may be deactivated, thereby reducing battery consumption.

According to an embodiment of the present disclosure, information necessary for proximity discovery between an electronic device requesting proximity discovery and an external electronic device, a target electronic device for the proximity discovery, may be exchanged and shared through the pre-established communication network (e.g., a WAN), and the proximity discovery may be carried out using the respective short-range wireless communication interfaces of the electronic device and the external electronic device that are activated based on the shared information. Thus, the discovery operation may be simplified and discovery time may be shortened.

The embodiments of the present disclosure are described to facilitate understanding of the present disclosure but is not intended to limit the scope of the present disclosure. Accordingly, the scope of the present disclosure should be interpreted as including all changes or various embodiments based on the scope of the present disclosure as defined by the appended claims and their equivalents.

What is claimed is:

1. An electronic device, comprising:
a first communication interface;
a second communication interface; and
in response to designating a first external electronic device as a target user device for proximity discovery by selecting a contact corresponding to the first external electronic device among a plurality of contacts transmit first information related to the proximity discovery of the electronic device to the first external electronic device through the first communication interface;
receive second information related to the proximity discovery of the first external electronic device from the first external electronic through the first communication interface; and
perform the proximity discovery with the first external electronic device through the second communication interface based on the first information or the second information;
when an input or an application related to performing the proximity discovery is selected, activate the second communication interface to be used for the proximity discovery based on communication state information corresponding to the second communication interface;
generate a request message for the proximity discovery by including information about the activated second communication interface in the first information; and
transmit the generated request message through the first communication interface to the first external electronic device.

2. The electronic device of claim 1, wherein the first information includes identification information, contact information, location information, information about the second communication interface to be used for the proximity discovery, transmission/reception setting information, security information, or a combination thereof of the electronic device.

3. The electronic device of claim 1, wherein the second information includes identification information or contact information of the electronic device, identification information or contact information of the first external electronic device, information about a second communication interface of the first external electronic device to be used for proximity discovery of the first external electronic device activated based on information about the second communication interface to be used for the proximity discovery of the electronic device, transmission/reception setting information, or a combination thereof.

4. The electronic device of claim 1, wherein the processor is further configured to:
determine whether the first external electronic device is, based on a user input, designated as the target user device for the proximity discovery; and
in response to determining that the first external electronic device is designated as the target user device for the proximity discovery, transmit the request message through the first communication interface to the first external electronic device, based on network address information contained in identification information of the first external electronic device.

5. The electronic device of claim 1, wherein the processor is further configured to:
determine whether the first external electronic device is, based on a user input, designated as the target user device for the proximity discovery; and
in response to determining that the first external electronic device is designated as the target user device for the proximity discovery, transmit the request message through the first communication interface to the first external electronic device in a form of a text message, an instant message, an email, an Internet protocol multimedia service (IMS) or a pre-defined application layer message, based on contact information of the first external electronic device.

6. The electronic device of claim 1, wherein the processor is further configured to:
   determine whether the first external electronic device is, based on a user input, designated as the target user device for the proximity discovery; and
   in response to determining that the first external electronic device is not designated as the target user device for the proximity discovery, transmit the request message through the first communication interface to a second external electronic device configured to provide a proximity discovery service between the electronic device and the first external electronic device.

7. The electronic device of claim 1, wherein the processor is further configured to:
   transmit or receive a proximity check message to determine whether the electronic device is located proximate to/from the first external electronic device through the activated second communication interface, based on transmission/reception setting information of the electronic device contained in the first information or transmission/reception setting information of the first external electronic device contained in the second information; and
   receive or transmit a proximity check acknowledgement message responsive to the proximity check message from/to the first external electronic device through the activated second communication interface.

8. The electronic device of claim 7, wherein the proximity check message or the proximity check acknowledgement message received from the first external electronic device is information encrypted based on security information contained in the first information, and the processor is further configured to decrypt the encrypted proximity check message or proximity check acknowledgement message based on security information of the electronic device.

9. The electronic device of claim 1, wherein the processor is further configured to activate the second communication interface in response to receiving the second information from the first external electronic device.

10. The electronic device of claim 1, wherein the second information is, by the first external electronic device, transmitted to the electronic device when the first external electronic device, based on the first information, determines to perform the proximity discovery with the electronic device, and
    wherein the first external device activates a communication interface for performing the proximity discovery with the electronic device in response to determining to perform the proximity discovery with the electronic device.

11. A non-transitory computer readable recording medium recording a program running on a computer, the program including executable commands executed by a processor of an electronic device to enable the processor to:
    in response to designating a first external electronic device as a target user device for proximity discovery by selecting a contact corresponding to the first external electronic device among a plurality of contacts, transmit first information related to the proximity discovery of the electronic device to the first external electronic device through a first communication interface of the electronic device; and
    receive second information related to the proximity discovery of the first external electronic device from the first external electronic through the first communication interface;
    perform the proximity discovery with the first external electronic device through a second communication interface of the electronic device based on the first information or the second information;
    when an input or an application related to performing the proximity discovery is selected, activate the second communication interface to be used for the proximity discovery based on communication state information corresponding to the second communication interface;
    generate a request message for the proximity discovery by including information about the activated second communication interface in the first information; and
    transmit the generated request message through the first communication interface to the first external electronic device.

12. The non-transitory computer readable recording medium of claim 11, wherein the program includes executable commands executed by the processor to further enable the processor to:
    transmit or receive a proximity check message to determine whether the electronic device is located proximate to/from the first external electronic device through the activated second communication interface, based on transmission/reception setting information of the electronic device contained in the first information or transmission/reception setting information of the first external electronic device contained in the second information; and
    receive or transmit a proximity check acknowledgement message responsive to the proximity check message from/to the first external electronic device through the activated second communication interface.

13. The non-transitory computer readable recording medium of claim 12, wherein the program includes executable commands executed by the processor to further enable the processor to:
    set the electronic device as a transmitting device to transmit the proximity check message based on the transmission/reception setting information of the electronic device contained in the first information or the transmission/reception setting information of the first external electronic device contained in the second information;
    transmit the proximity check message through the activated second communication interface to the first external electronic device; and
    in response to the transmission of the proximity check message, receive the proximity check acknowledgement message from the first external electronic device through the activated second communication interface.

14. The non-transitory computer readable recording medium of claim 12, wherein the program includes executable commands executed by the processor to further enable the processor to:
    set the electronic device as a receiving device to receive the proximity check message based on the transmission/reception setting information about the electronic device contained in the first information or the transmission/reception setting information of the first external electronic device contained in the second information;

receive the proximity check message through the activated second communication interface from the first external electronic device; and in response to the reception of the proximity check message, transmit the proximity check acknowledgement message to the first external electronic device through the activated second communication interface.

15. The non-transitory computer readable recording medium of claim 11, wherein the program includes executable commands executed by the processor to further enable the processor to activate the second communication interface in response to receiving the second information from the first external electronic device.

16. The non-transitory computer readable recording medium of claim 11, wherein the second information is, by the first external electronic device, transmitted to the electronic device when the first external electronic device, based on the first information, determines to perform the proximity discovery with the electronic device, and wherein the first external device activates a communication interface for performing the proximity discovery with the electronic device in response to determining to perform the proximity discovery with the electronic device.

* * * * *